US010623156B2

(12) United States Patent
Wu et al.

(10) Patent No.: US 10,623,156 B2
(45) Date of Patent: Apr. 14, 2020

(54) METHODS FOR TRANSMITTING AND RECEIVING CONTROL CHANNEL, BASE STATION, AND USER EQUIPMENT

(71) Applicant: HUAWEI TECHNOLOGIES CO., LTD., Shenzhen, Guangdong (CN)

(72) Inventors: Qiang Wu, Beijing (CN); Chi Gao, Shenzhen (CN); Jianqin Liu, Beijing (CN); Jianghua Liu, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 7 days.

(21) Appl. No.: 16/055,317

(22) Filed: Aug. 6, 2018

(65) Prior Publication Data

US 2018/0343094 A1 Nov. 29, 2018

Related U.S. Application Data

(63) Continuation of application No. 15/491,290, filed on Apr. 19, 2017, now Pat. No. 10,084,580, which is a (Continued)

(51) Int. Cl.
*H04L 5/00* (2006.01)
*H04W 72/04* (2009.01)

(52) U.S. Cl.
CPC .......... *H04L 5/0048* (2013.01); *H04L 5/0053* (2013.01); *H04L 5/0064* (2013.01); (Continued)

(58) Field of Classification Search
CPC ..... H04L 5/001; H04L 5/0048; H04L 5/0053; H04L 5/0058; H04L 5/0064; H04W 72/04; H04W 72/0406
See application file for complete search history.

(56) References Cited

U.S. PATENT DOCUMENTS

2009/0010214 A1 1/2009 Bui
2010/0157922 A1 6/2010 Kim et al.
(Continued)

FOREIGN PATENT DOCUMENTS

CN 101371477 A 2/2009
CN 101605023 A 12/2009
(Continued)

OTHER PUBLICATIONS

Intel Corporation:"On the definition of eCCE/eREG",3GPP TSG RAN WG1 Meeting #69, R1-122652, Prague, Czech Republic, May 21-25, 2012. total 3 pages
(Continued)

*Primary Examiner* — Paul H Masur
(74) *Attorney, Agent, or Firm* — Gregg L. Jansen

(57) ABSTRACT

The present invention provides methods for transmitting and receiving a control channel, a base station, and a user equipment. The method for transmitting a control channel includes: determining m PRB pairs used for transmitting a control channel to be transmitted; when a distributed transmission mode is used for transmission, determining an aggregation level L of the control channel to be transmitted; determining, according to the aggregation level L, a first control channel candidate at the aggregation level L; and placing, on physical resources to which the first control channel candidate is mapped, control information of the control channel to be transmitted, and transmitting the control information. The present invention improves multiplexing efficiency of control channels of different modes.

32 Claims, 25 Drawing Sheets

Related U.S. Application Data continuation of application No. 14/611,999, filed on Feb. 2, 2015, now Pat. No. 9,673,947, which is a continuation of application No. PCT/CN2012/082390, filed on Sep. 28, 2012, and a continuation of application No. PCT/CN2012/079604, filed on Aug. 2, 2012.

(52) U.S. Cl.
CPC ....... *H04W 72/04* (2013.01); *H04W 72/0406* (2013.01); *H04L 5/001* (2013.01)

(56) References Cited

U.S. PATENT DOCUMENTS

| | | | |
|---|---|---|---|
| 2011/0143796 A1 | 6/2011 | Lee et al. | |
| 2013/0039284 A1 | 2/2013 | Marinier et al. | |
| 2013/0039291 A1 | 2/2013 | Blankenship et al. | |
| 2013/0114419 A1 | 5/2013 | Chen et al. | |
| 2013/0242882 A1 | 9/2013 | Blankenship et al. | |
| 2013/0301562 A1 | 11/2013 | Liao et al. | |
| 2014/0050159 A1 | 2/2014 | Frenne et al. | |
| 2015/0055581 A1 | 2/2015 | Janis et al. | |
| 2015/0146670 A1 | 5/2015 | Liu et al. | |
| 2015/0156752 A1* | 6/2015 | Liu | H04W 72/042 370/329 |

FOREIGN PATENT DOCUMENTS

| | | | |
|---|---|---|---|
| CN | 102255841 A | 11/2011 |
| CN | 102612094 A | 7/2012 |
| EP | 2207271 A1 | 7/2010 |
| WO | 2011136957 A1 | 11/2011 |
| WO | 2014019284 A1 | 2/2014 |

OTHER PUBLICATIONS

HTC:“RE mapping for ePDCCH”, 3GPP TSG-RAN WG1 #70, R1-123862, Qingdao, China, Aug. 13-17, 2012. total 7 pages.
3GPP TS 36.213 V10.6.0 (Jun. 2012),3rd Generation Partnership Project;Technical Specification Group Radio Access Network;Evolved Universal Terrestrial Radio Access (E-UTRA);Physical layer procedures(Release 10), Jun. 2012, total 125 pages.
3GPP TS 36.3.31 V10.6.0 (Jun. 2012),3rd Generation Partnership Project;Technical Specification Group Radio Access Network; Evolved Universal Terrestrial Radio Access (E-UTRA);Radio Resource Control (RRC);Protocol specification (Release 10),total 302 pages.
3GPP TS 36.211 V10.3.0 (Sep. 2011),3rd Generation Partnership Project;Technical Specification Group Radio Access Network;Evolved Universal Terrestrial Radio Access (E-UTRA);Physical Channels and Modulation(Release 10), Sep. 2011. total 103 pages.
3GPP TS 36.213 V10.3.0 (Sep. 2011), 3rd Generation Partnership Project;Technical Specification Group Radio Access Network;Evolved Universal Terrestrial Radio Access (E-UTRA);Physical layer procedures(Release 10), total 122 pages.
Fujitsu:“ePDCCH multiplexing efficiency for localised and distributed ePDCCH”, 3GPP TSG RAN WG1 Meeting #69, R1-122070. Prague, Czech Republic, May 21-25, 2012. total 2 pages.
MediaTek Inc:“Physical Structure for DCI Multiplexing in ePDCCH”, 3GPP TSG-RAN WG1 #69, R1-122166, Prague, Czech, May 21-May 25, 2012. total 6 pages.
ZTE Corporation:“Need for multiplexing of localised and distributed ePDCCH parts in same PRBs”, 3GPP TSG RAN WG1 Meeting #69, R1-122108, Prague, Czech Republic, May 21-25, 2012. total 5 pages.
LG Electronics:“On ePDCCH Search Space Design Supporting Localized and Distributed Transmission”,3GPP TSG RAN WG1 Meeting #69, R1-122309, Prague, Czech Republic, May 21-25, 2012. total 11 pages. XP050600572.
Huawei, HiSilicon:“Aggregation levels of ePDCCH for localized and distributed transmission”, 3GPP TSG RAN WG1 Meeting #69, R1-121964, Prague, Czech Republic, May 21-25, 2012. total 2 pages.
NEC Group:“ePDCCH search space design”, 3GPP TSG RAN WG1 Meeting #69, R1-122595. Prague, Czech Republic, May 21-25, 2012. total 10 pages. XP050600781.
Nokia:“Need for multiplexing of localised and distributed ePDCCH parts in same PRBs”, 3GPP TSG RAN WG1 Meeting #69, R1-122425, Prague, Czech Republic, May 21-25, 2012. total 3 pages.
NTT DOCOMO:“Mapping Design for E-PDCCH in Rel-11”, GPP TSG RAN WG1 Meeting #68, R1-120411. Dresden, Germany, Feb. 6-10, 2012. total 7 pages. XP050562901.
Alcatel-Lucent Shanghai Bell:“Multiplexing of Localized and Distributed ePDCCH in same PRBs”, 3GPP TSG RAN WG1 Meeting #69, R1-122499, Prague, Czech Republic, May 21-25, 2012. total 3 pages.
NTT DOCOMO:“Resource Mapping Scheme for E-PDCCH”, 3GPP TSG RAN WG1 Meeting #68bis, R1-121477,Jeju, Korea, Mar. 26-30, 2012. total 6 pages. XP050599758.
3GPP TSG RAN WG1 Meeting #70bis R1-124076,“Mapping of ECCE to EREG for localized and distributed transmission”,Huawei,Oct. 8-12, 2012,total 6 pages.
NEC Group:“ePDCCH transmission schemes and performance evaluations”, 3GPP TSG RAN WG1 Meeting #69, R1-122597. Prague, Czech Republic, May 21-25, 2012. total 7 pages.
Samsung:“Multiplexing Distributed and Localized ePDCCHs”, 3GPP TSG RAN WG1 #69, R1-122256, Prague, Czech Republic, May 21-25, 2012. total 5 pages. XP050600519.
3GPP TSG RAN WG1 Meeting #70bis R1-124078,“Search space design for EPDCCH”,Huawei, HiSilicon,Oct. 8-12, 2012,total 8 pages.
LG Electronics:“Multiplexing of Localised and Distributed ePDCCH parts in same PRBs”, 3GPP TSG RAN WG1 Meeting #69, R1-122310, Prague, Czech Republic, May 21-25, 2012. total 3 pages.
3GPP TSG RAN WG1 Meeting #70bis R1-124162,“EPDCCH resource allocation”,Huawei, HiSilicon,Oct. 8-12, 2012,total 4 pages.
3GPP TS 36.211 V10.5.0 (Jun. 2012), 3rd Generation Partnership Project;Technical Specification Group Radio Access Network;Evolved Universal Terrestrial Radio Access (E-UTRA);Physical Channels and Modulation(Release 10), Jun. 2012. total 101 pages.

* cited by examiner

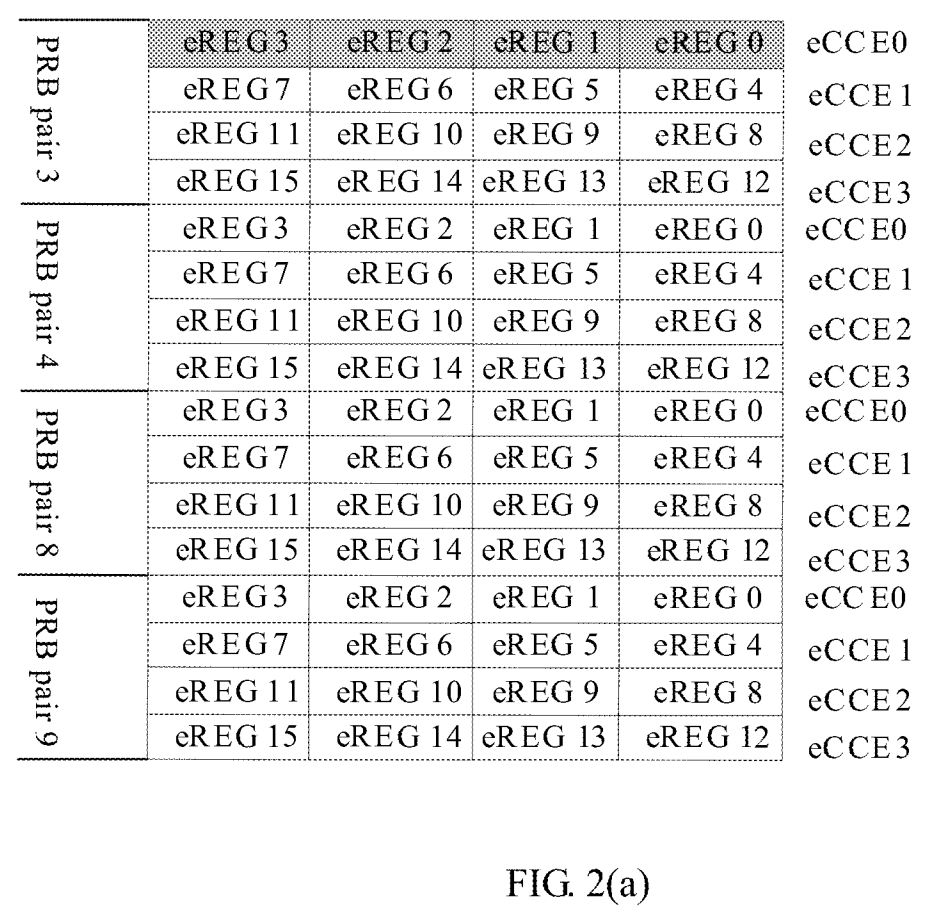

| | | | | | |
|---|---|---|---|---|---|
| PRB pair 3 | eREG3 | eREG2 | eREG 1 | eREG 0 | eCCE0 |
| | eREG7 | eREG6 | eREG 5 | eREG 4 | eCCE 1 |
| | eREG 11 | eREG 10 | eREG 9 | eREG 8 | eCCE2 |
| | eREG 15 | eREG 14 | eREG 13 | eREG 12 | eCCE3 |
| PRB pair 4 | eREG3 | eREG 2 | eREG 1 | eREG 0 | eCCE0 |
| | eREG7 | eREG 6 | eREG 5 | eREG 4 | eCCE 1 |
| | eREG 11 | eREG 10 | eREG 9 | eREG 8 | eCCE2 |
| | eREG 15 | eREG 14 | eREG 13 | eREG 12 | eCCE3 |
| PRB pair 8 | eREG3 | eREG 2 | eREG 1 | eREG 0 | eCCE0 |
| | eREG7 | eREG 6 | eREG 5 | eREG 4 | eCCE 1 |
| | eREG 11 | eREG 10 | eREG 9 | eREG 8 | eCCE2 |
| | eREG 15 | eREG 14 | eREG 13 | eREG 12 | eCCE3 |
| PRB pair 9 | eREG3 | eREG 2 | eREG 1 | eREG 0 | eCCE0 |
| | eREG7 | eREG 6 | eREG 5 | eREG 4 | eCCE 1 |
| | eREG 11 | eREG 10 | eREG 9 | eREG 8 | eCCE2 |
| | eREG 15 | eREG 14 | eREG 13 | eREG 12 | eCCE3 |

FIG. 2(a)

| eREG 0 | eREG 4 | eREG 8 | eREG 12 | eREG 0 | eREG 4 | eREG 8 | eREG 12 | eREG 0 | eREG 4 | eREG 8 | eREG 12 | eREG 0 | eREG 4 | eREG 8 | eREG 12 |
|---|---|---|---|---|---|---|---|---|---|---|---|---|---|---|---|
| eREG 1 | eREG 5 | eREG 9 | eREG 13 | eREG 1 | eREG 5 | eREG 9 | eREG 13 | eREG 1 | eREG 5 | eREG 9 | eREG 13 | eREG 1 | eREG 5 | eREG 9 | eREG 13 |
| eREG 2 | eREG 6 | eREG 10 | eREG 14 | eREG 2 | eREG 6 | eREG 10 | eREG 14 | eREG 2 | eREG 6 | eREG 10 | eREG 14 | eREG 2 | eREG 6 | eREG 10 | eREG 14 |
| eREG 3 | eREG 7 | eREG 11 | eREG 15 | eREG 3 | eREG 7 | eREG 11 | eREG 15 | eREG 3 | eREG 7 | eREG 11 | eREG 15 | eREG 3 | eREG 7 | eREG 11 | eREG 15 |
| PRB pair 3 | | | | PRB pair 4 | | | | PRB pair 8 | | | | PRB pair 9 | | | |

| Aggregation Level 2 | | | |
|---|---|---|---|
| Centralized eCCE 3 | eREG group 27 | eREG group 31 | PRB pair 9 |
| Centralized eCCE 2 | eREG group 19 | eREG group 23 | |
| Centralized eCCE 1 | eREG group 11 | eREG group 15 | |
| Centralized eCCE 0 | eREG group 3 | eREG group 7 | |
| Centralized eCCE 3 | eREG group 26 | eREG group 30 | PRB pair 8 |
| Centralized eCCE 2 | eREG group 18 | eREG group 22 | |
| Centralized eCCE 1 | eREG group 10 | eREG group 14 | |
| Centralized eCCE 0 | eREG group 2 | eREG group 6 | |
| Centralized eCCE 3 | eREG group 25 | eREG group 29 | PRB pair 4 |
| Centralized eCCE 2 | eREG group 17 | eREG group 21 | |
| Centralized eCCE 1 | eREG group 9 | eREG group 13 | |
| Centralized eCCE 0 | eREG group 1 | eREG group 5 | |
| Centralized eCCE 3 | eREG group 24 | eREG group 28 | PRB pair 3 |
| Centralized eCCE 2 | eREG group 16 | eREG group 20 | |
| Centralized eCCE 1 | eREG group 8 | eREG group 12 | |
| Centralized eCCE 0 | eREG group 0 | eREG group 4 | |

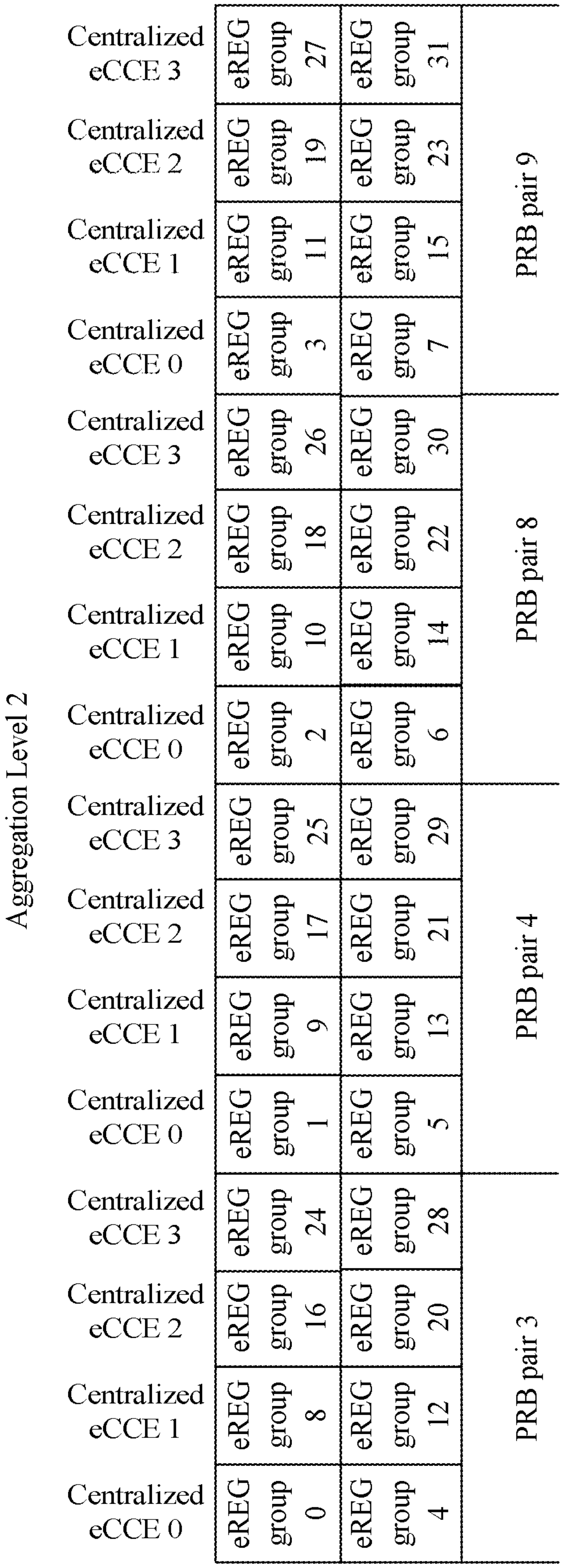

FIG. 6

| Aggregation Level 2 | Centralized eCCE 3 | eREG group 27 | eREG group 31 | PRB pair 9 |
|---|---|---|---|---|
| | Centralized eCCE 2 | eREG group 19 | eREG group 23 | |
| | Centralized eCCE 1 | eREG group 11 | eREG group 15 | |
| | Centralized eCCE 0 | eREG group 3 | eREG group 7 | |
| | Centralized eCCE 3 | eREG group 26 | eREG group 30 | PRB pair 8 |
| | Centralized eCCE 2 | eREG group 18 | eREG group 22 | |
| | Centralized eCCE 1 | eREG group 10 | eREG group 14 | |
| | Centralized eCCE 0 | eREG group 2 | eREG group 6 | |
| | Centralized eCCE 3 | eREG group 25 | eREG group 29 | PRB pair 4 |
| | Centralized eCCE 2 | eREG group 17 | eREG group 21 | |
| | Centralized eCCE 1 | eREG group 9 | eREG group 13 | |
| | Centralized eCCE 0 | eREG group 1 | eREG group 5 | |
| | Centralized eCCE 3 | eREG group 24 | eREG group 28 | PRB pair 3 |
| | Centralized eCCE 2 | eREG group 16 | eREG group 20 | |
| | Centralized eCCE 1 | eREG group 8 | eREG group 12 | |
| | Centralized eCCE 0 | eREG group 0 | eREG group 4 | |

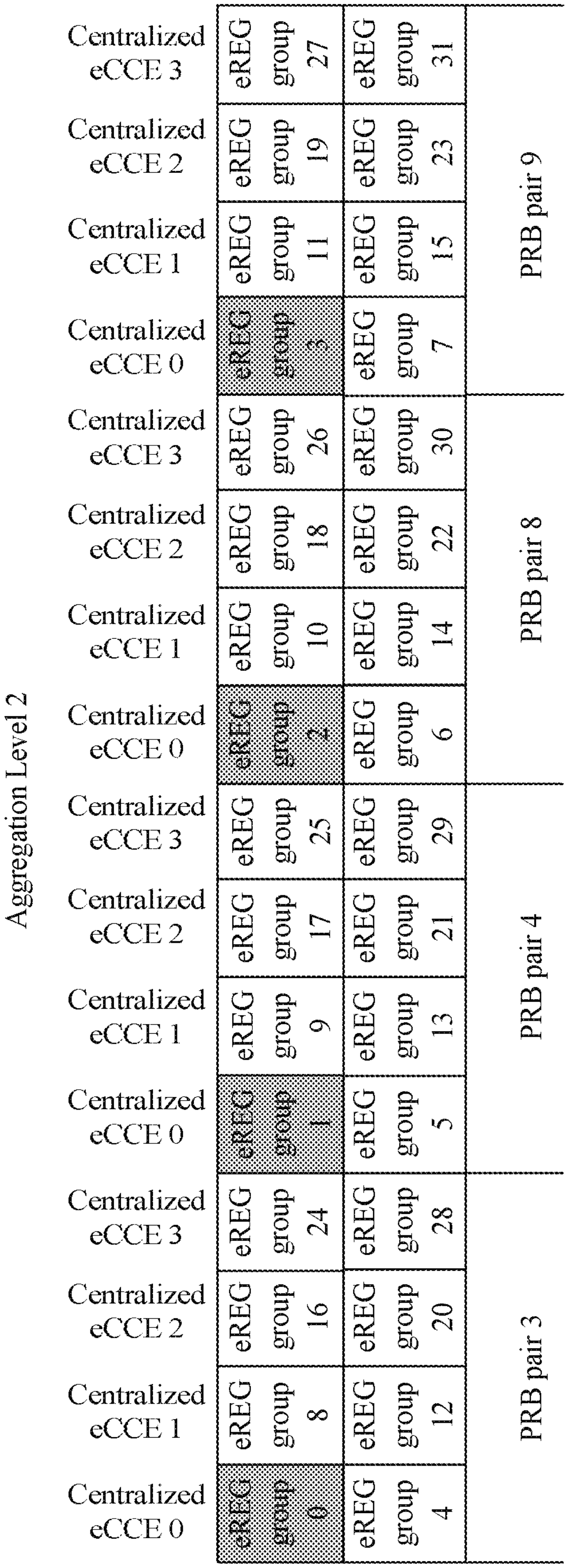

FIG. 7

| | 0 | 1 | 2 | 3 | 4 | 5 | 6 | 7 | 8 | 9 | 10 | 11 | 12 | 13 |
|---|---|---|---|---|---|---|---|---|---|---|---|---|---|---|
| 0 | 0 | 12 | 8 | 4 | 0 | | | 8 | 4 | 0 | 12 | 8 | | |
| 1 | 1 | 13 | 9 | 5 | 1 | | | 9 | 5 | 1 | 13 | 9 | | |
| 2 | 2 | 14 | 10 | 6 | 2 | 12 | 2 | 10 | 6 | 2 | 14 | 10 | 4 | 10 |
| 3 | 3 | 15 | 11 | 7 | 3 | 13 | 3 | 11 | 7 | 3 | 15 | 11 | 5 | 11 |
| 4 | 4 | 0 | 12 | 8 | 4 | 14 | 4 | 12 | 8 | 4 | 0 | 12 | 6 | 12 |
| 5 | 5 | 1 | 13 | 9 | 5 | | | 13 | 9 | 5 | 1 | 13 | | |
| 6 | 6 | 2 | 14 | 10 | 6 | | | 14 | 10 | 6 | 2 | 14 | | |
| 7 | 7 | 3 | 15 | 11 | 7 | 15 | 5 | 15 | 11 | 7 | 3 | 15 | 7 | 13 |
| 8 | 8 | 4 | 0 | 12 | 8 | 0 | 6 | 0 | 12 | 8 | 4 | 0 | 8 | 14 |
| 9 | 9 | 5 | 1 | 13 | 9 | 1 | 7 | 1 | 13 | 9 | 5 | 1 | 9 | 15 |
| 10 | 10 | 6 | 2 | 14 | 10 | | | 2 | 14 | 10 | 6 | 2 | | |
| 11 | 11 | 7 | 3 | 15 | 11 | | | 3 | 15 | 11 | 7 | 3 | | |

| AL=1 | | | | | | | |
|---|---|---|---|---|---|---|---|
| eREG 0 | eREG 4 | eREG 8 | eREG12 | eREG 0 | eREG 4 | eREG 8 | eREG12 |
| eREG 1 | eREG 5 | eREG 9 | eREG13 | eREG 1 | eREG 5 | eREG 9 | eREG13 |
| eREG 2 | eREG 6 | eREG 10 | eREG14 | eREG 2 | eREG 6 | eREG 10 | eREG14 |
| eREG 3 | eREG 7 | eREG 11 | eREG15 | eREG 3 | eREG 7 | eREG 11 | eREG15 |
| PRB pair 1 | | | | PRB pair 2 | | | |
| Al=2 | | | | | | | |
| eREG 0 | eREG 4 | eREG 8 | eREG12 | eREG 0 | eREG 4 | eREG 8 | eREG12 |
| eREG 1 | eREG 5 | eREG 9 | eREG13 | eREG 1 | eREG 5 | eREG 9 | eREG13 |
| eREG 2 | eREG 6 | eREG 10 | eREG14 | eREG 2 | eREG 6 | eREG 10 | eREG14 |
| eREG 3 | eREG 7 | eREG 11 | eREG15 | eREG 3 | eREG 7 | eREG 11 | eREG15 |
| PRB pair 1 | | | | PRB pair 2 | | | |

| | | | | | | | | | | | | | | | |
|---|---|---|---|---|---|---|---|---|---|---|---|---|---|---|---|
| eREG 0 | eREG 4 | eREG 8 | eREG 12 | eREG 0 | eREG 4 | eREG 8 | eREG 12 | eREG 0 | eREG 4 | eREG 8 | eREG 12 | eREG 0 | eREG 4 | eREG 8 | eREG 12 |
| eREG 1 | eREG 5 | eREG 9 | eREG 13 | eREG 1 | eREG 5 | eREG 9 | eREG 13 | eREG 1 | eREG 5 | eREG 9 | eREG 13 | eREG 1 | eREG 5 | eREG 9 | eREG 13 |
| eREG 2 | eREG 6 | eREG 10 | eREG 14 | eREG 2 | eREG 6 | eREG 10 | eREG 14 | eREG 2 | eREG 6 | eREG 10 | eREG 14 | eREG 2 | eREG 6 | eREG 10 | eREG 14 |
| eREG 3 | eREG 7 | eREG 11 | eREG 15 | eREG 3 | eREG 7 | eREG 11 | eREG 15 | eREG 3 | eREG 7 | eREG 11 | eREG 15 | eREG 3 | eREG 7 | eREG 11 | eREG 15 |
| PRB pair 1 | | | | PRB pair 2 | | | | PRB pair 3 | | | | PRB pair 4 | | | |

AL=2

| | | | | | | | | | | | | | | | |
|---|---|---|---|---|---|---|---|---|---|---|---|---|---|---|---|
| eREG 0 | eREG 4 | eREG 8 | eREG 12 | eREG 0 | eREG 4 | eREG 8 | eREG 12 | eREG 0 | eREG 4 | eREG 8 | eREG 12 | eREG 0 | eREG 4 | eREG 8 | eREG 12 |
| eREG 1 | eREG 5 | eREG 9 | eREG 13 | eREG 1 | eREG 5 | eREG 9 | eREG 13 | eREG 1 | eREG 5 | eREG 9 | eREG 13 | eREG 1 | eREG 5 | eREG 9 | eREG 13 |
| eREG 2 | eREG 6 | eREG 10 | eREG 14 | eREG 2 | eREG 6 | eREG 10 | eREG 14 | eREG 2 | eREG 6 | eREG 10 | eREG 14 | eREG 2 | eREG 6 | eREG 10 | eREG 14 |
| eREG 3 | eREG 7 | eREG 11 | eREG 15 | eREG 3 | eREG 7 | eREG 11 | eREG 15 | eREG 3 | eREG 7 | eREG 11 | eREG 15 | eREG 3 | eREG 7 | eREG 11 | eREG 15 |
| PRB pair 1 | | | | PRB pair 2 | | | | PRB pair 3 | | | | PRB pair 4 | | | |

AL=4

| | | | | | | | | | | | | | | | |
|---|---|---|---|---|---|---|---|---|---|---|---|---|---|---|---|
| eREG 0 | eREG 4 | eREG 8 | eREG 12 | eREG 0 | eREG 4 | eREG 8 | eREG 12 | eREG 0 | eREG 4 | eREG 8 | eREG 12 | eREG 0 | eREG 4 | eREG 8 | eREG 12 |
| eREG 1 | eREG 5 | eREG 9 | eREG 13 | eREG 1 | eREG 5 | eREG 9 | eREG 13 | eREG 1 | eREG 5 | eREG 9 | eREG 13 | eREG 1 | eREG 5 | eREG 9 | eREG 13 |
| eREG 2 | eREG 6 | eREG 10 | eREG 14 | eREG 2 | eREG 6 | eREG 10 | eREG 14 | eREG 2 | eREG 6 | eREG 10 | eREG 14 | eREG 2 | eREG 6 | eREG 10 | eREG 14 |
| eREG 3 | eREG 7 | eREG 11 | eREG 15 | eREG 3 | eREG 7 | eREG 11 | eREG 15 | eREG 3 | eREG 7 | eREG 11 | eREG 15 | eREG 3 | eREG 7 | eREG 11 | eREG 15 |
| PRB pair 1 | | | | PRB pair 2 | | | | PRB pair 3 | | | | PRB pair 4 | | | |

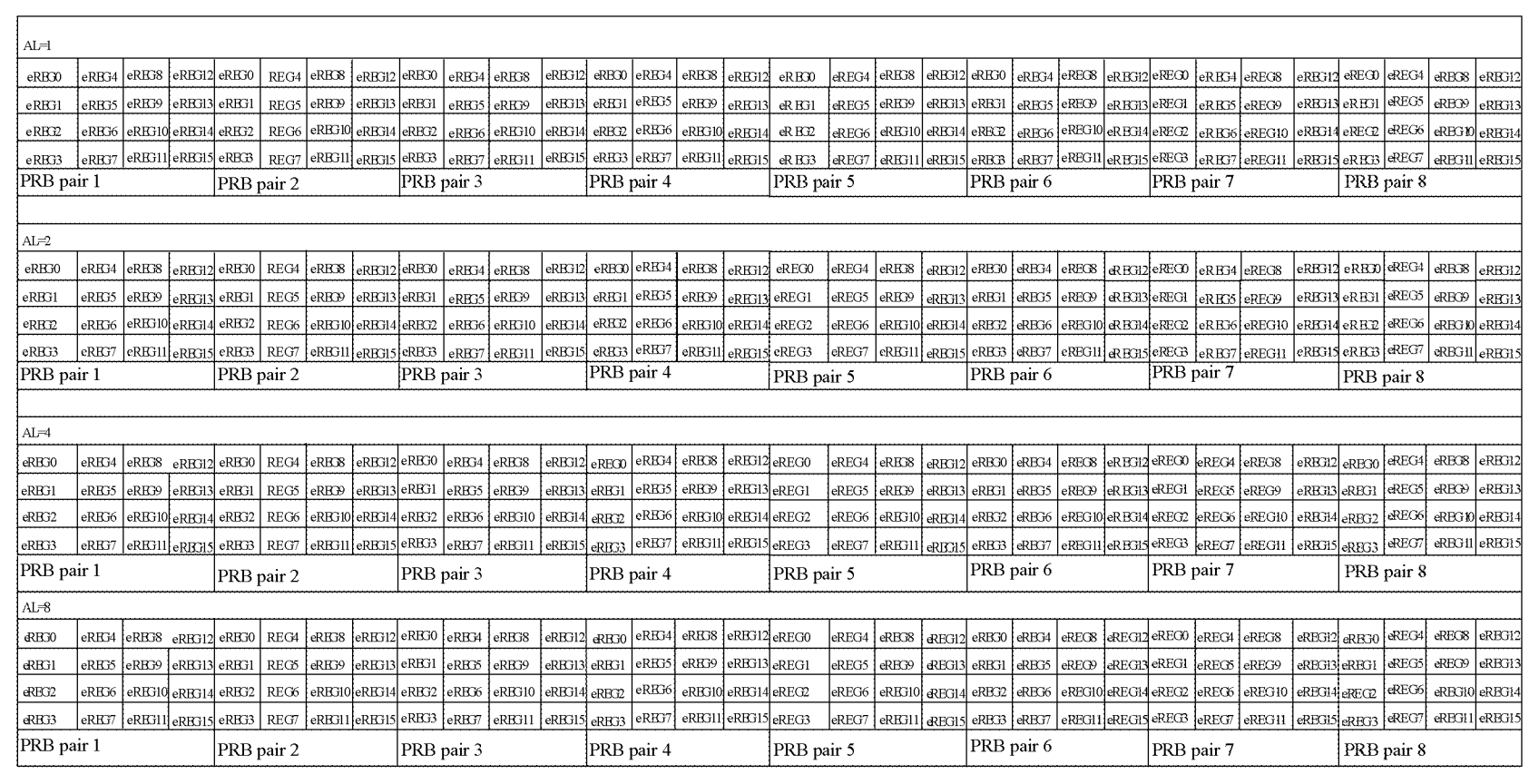

| | | | | | | | | | | | | | | | | | | | | | | | | | | | | | | | |
|---|---|---|---|---|---|---|---|---|---|---|---|---|---|---|---|---|---|---|---|---|---|---|---|---|---|---|---|---|---|---|---|
| eREG0 | eREG4 | eREG8 | eREG12 | eREG0 | REG4 | eREG8 | eREG12 | eREG0 | eREG4 | eREG8 | eREG12 | eREG0 | eREG4 | eREG8 | eREG12 | eREG0 | eREG4 | eREG8 | eREG12 | eREG0 | eREG4 | eREG8 | eREG12 | eREG0 | eREG4 | eREG8 | eREG12 | eREG0 | eREG4 | eREG8 | eREG12 |
| eREG1 | eREG5 | eREG9 | eREG13 | eREG1 | REG5 | eREG9 | eREG13 | eREG1 | eREG5 | eREG9 | eREG13 | eREG1 | eREG5 | eREG9 | eREG13 | eREG1 | eREG5 | eREG9 | eREG13 | eREG1 | eREG5 | eREG9 | eREG13 | eREG1 | eREG5 | eREG9 | eREG13 | eREG1 | eREG5 | eREG9 | eREG13 |
| eREG2 | eREG6 | eREG10 | eREG14 | eREG2 | REG6 | eREG10 | eREG14 | eREG2 | eREG6 | eREG10 | eREG14 | eREG2 | eREG6 | eREG10 | eREG14 | eREG2 | eREG6 | eREG10 | eREG14 | eREG2 | eREG6 | eREG10 | eREG14 | eREG2 | eREG6 | eREG10 | eREG14 | eREG2 | eREG6 | eREG10 | eREG14 |
| eREG3 | eREG7 | eREG11 | eREG15 | eREG3 | REG7 | eREG11 | eREG15 | eREG3 | eREG7 | eREG11 | eREG15 | eREG3 | eREG7 | eREG11 | eREG15 | eREG3 | eREG7 | eREG11 | eREG15 | eREG3 | eREG7 | eREG11 | eREG15 | eREG3 | eREG7 | eREG11 | eREG15 | eREG3 | eREG7 | eREG11 | eREG15 |
| PRB pair 1 | | | | PRB pair 2 | | | | PRB pair 3 | | | | PRB pair 4 | | | | PRB pair 5 | | | | PRB pair 6 | | | | PRB pair 7 | | | | PRB pair 8 | | | |

AL=2

| | | | | | | | | | | | | | | | | | | | | | | | | | | | | | | | |
|---|---|---|---|---|---|---|---|---|---|---|---|---|---|---|---|---|---|---|---|---|---|---|---|---|---|---|---|---|---|---|---|
| eREG0 | eREG4 | eREG8 | eREG12 | eREG0 | REG4 | eREG8 | eREG12 | eREG0 | eREG4 | eREG8 | eREG12 | eREG0 | eREG4 | eREG8 | eREG12 | eREG0 | eREG4 | eREG8 | eREG12 | eREG0 | eREG4 | eREG8 | eREG12 | eREG0 | eREG4 | eREG8 | eREG12 | eREG0 | eREG4 | eREG8 | eREG12 |
| eREG1 | eREG5 | eREG9 | eREG13 | eREG1 | REG5 | eREG9 | eREG13 | eREG1 | eREG5 | eREG9 | eREG13 | eREG1 | eREG5 | eREG9 | eREG13 | eREG1 | eREG5 | eREG9 | eREG13 | eREG1 | eREG5 | eREG9 | eREG13 | eREG1 | eREG5 | eREG9 | eREG13 | eREG1 | eREG5 | eREG9 | eREG13 |
| eREG2 | eREG6 | eREG10 | eREG14 | eREG2 | REG6 | eREG10 | eREG14 | eREG2 | eREG6 | eREG10 | eREG14 | eREG2 | eREG6 | eREG10 | eREG14 | eREG2 | eREG6 | eREG10 | eREG14 | eREG2 | eREG6 | eREG10 | eREG14 | eREG2 | eREG6 | eREG10 | eREG14 | eREG2 | eREG6 | eREG10 | eREG14 |
| eREG3 | eREG7 | eREG11 | eREG15 | eREG3 | REG7 | eREG11 | eREG15 | eREG3 | eREG7 | eREG11 | eREG15 | eREG3 | eREG7 | eREG11 | eREG15 | eREG3 | eREG7 | eREG11 | eREG15 | eREG3 | eREG7 | eREG11 | eREG15 | eREG3 | eREG7 | eREG11 | eREG15 | eREG3 | eREG7 | eREG11 | eREG15 |
| PRB pair 1 | | | | PRB pair 2 | | | | PRB pair 3 | | | | PRB pair 4 | | | | PRB pair 5 | | | | PRB pair 6 | | | | PRB pair 7 | | | | PRB pair 8 | | | |

AL=4

| | | | | | | | | | | | | | | | | | | | | | | | | | | | | | | | |
|---|---|---|---|---|---|---|---|---|---|---|---|---|---|---|---|---|---|---|---|---|---|---|---|---|---|---|---|---|---|---|---|
| eREG0 | eREG4 | eREG8 | eREG12 | eREG0 | REG4 | eREG8 | eREG12 | eREG0 | eREG4 | eREG8 | eREG12 | eREG0 | eREG4 | eREG8 | eREG12 | eREG0 | eREG4 | eREG8 | eREG12 | eREG0 | eREG4 | eREG8 | eREG12 | eREG0 | eREG4 | eREG8 | eREG12 | eREG0 | eREG4 | eREG8 | eREG12 |
| eREG1 | eREG5 | eREG9 | eREG13 | eREG1 | REG5 | eREG9 | eREG13 | eREG1 | eREG5 | eREG9 | eREG13 | eREG1 | eREG5 | eREG9 | eREG13 | eREG1 | eREG5 | eREG9 | eREG13 | eREG1 | eREG5 | eREG9 | eREG13 | eREG1 | eREG5 | eREG9 | eREG13 | eREG1 | eREG5 | eREG9 | eREG13 |
| eREG2 | eREG6 | eREG10 | eREG14 | eREG2 | REG6 | eREG10 | eREG14 | eREG2 | eREG6 | eREG10 | eREG14 | eREG2 | eREG6 | eREG10 | eREG14 | eREG2 | eREG6 | eREG10 | eREG14 | eREG2 | eREG6 | eREG10 | eREG14 | eREG2 | eREG6 | eREG10 | eREG14 | eREG2 | eREG6 | eREG10 | eREG14 |
| eREG3 | eREG7 | eREG11 | eREG15 | eREG3 | REG7 | eREG11 | eREG15 | eREG3 | eREG7 | eREG11 | eREG15 | eREG3 | eREG7 | eREG11 | eREG15 | eREG3 | eREG7 | eREG11 | eREG15 | eREG3 | eREG7 | eREG11 | eREG15 | eREG3 | eREG7 | eREG11 | eREG15 | eREG3 | eREG7 | eREG11 | eREG15 |
| PRB pair 1 | | | | PRB pair 2 | | | | PRB pair 3 | | | | PRB pair 4 | | | | PRB pair 5 | | | | PRB pair 6 | | | | PRB pair 7 | | | | PRB pair 8 | | | |

AL=8

| | | | | | | | | | | | | | | | | | | | | | | | | | | | | | | | |
|---|---|---|---|---|---|---|---|---|---|---|---|---|---|---|---|---|---|---|---|---|---|---|---|---|---|---|---|---|---|---|---|
| eREG0 | eREG4 | eREG8 | eREG12 | eREG0 | REG4 | eREG8 | eREG12 | eREG0 | eREG4 | eREG8 | eREG12 | eREG0 | eREG4 | eREG8 | eREG12 | eREG0 | eREG4 | eREG8 | eREG12 | eREG0 | eREG4 | eREG8 | eREG12 | eREG0 | eREG4 | eREG8 | eREG12 | eREG0 | eREG4 | eREG8 | eREG12 |
| eREG1 | eREG5 | eREG9 | eREG13 | eREG1 | REG5 | eREG9 | eREG13 | eREG1 | eREG5 | eREG9 | eREG13 | eREG1 | eREG5 | eREG9 | eREG13 | eREG1 | eREG5 | eREG9 | eREG13 | eREG1 | eREG5 | eREG9 | eREG13 | eREG1 | eREG5 | eREG9 | eREG13 | eREG1 | eREG5 | eREG9 | eREG13 |
| eREG2 | eREG6 | eREG10 | eREG14 | eREG2 | REG6 | eREG10 | eREG14 | eREG2 | eREG6 | eREG10 | eREG14 | eREG2 | eREG6 | eREG10 | eREG14 | eREG2 | eREG6 | eREG10 | eREG14 | eREG2 | eREG6 | eREG10 | eREG14 | eREG2 | eREG6 | eREG10 | eREG14 | eREG2 | eREG6 | eREG10 | eREG14 |
| eREG3 | eREG7 | eREG11 | eREG15 | eREG3 | REG7 | eREG11 | eREG15 | eREG3 | eREG7 | eREG11 | eREG15 | eREG3 | eREG7 | eREG11 | eREG15 | eREG3 | eREG7 | eREG11 | eREG15 | eREG3 | eREG7 | eREG11 | eREG15 | eREG3 | eREG7 | eREG11 | eREG15 | eREG3 | eREG7 | eREG11 | eREG15 |
| PRB pair 1 | | | | PRB pair 2 | | | | PRB pair 3 | | | | PRB pair 4 | | | | PRB pair 5 | | | | PRB pair 6 | | | | PRB pair 7 | | | | PRB pair 8 | | | |

FIG. 22

| eREG0 | eREG4 | eREG8 | eREG12 | eREG0 | eREG4 | eREG8 | eREG12 | eREG0 | eREG4 | eREG8 | eREG12 | eREG0 | eREG4 | eREG8 | eREG12 |
|---|---|---|---|---|---|---|---|---|---|---|---|---|---|---|---|
| eREG1 | eREG5 | eREG9 | eREG13 | eREG1 | eREG5 | eREG9 | eREG13 | eREG1 | eREG5 | eREG9 | eREG13 | eREG1 | eREG5 | eREG9 | eREG13 |
| eREG2 | eREG6 | eREG10 | eREG14 | eREG2 | eREG6 | eREG10 | eREG14 | eREG2 | eREG6 | eREG10 | eREG14 | eREG2 | eREG6 | eREG10 | eREG14 |
| eREG3 | eREG7 | eREG11 | eREG15 | eREG3 | eREG7 | eREG11 | eREG15 | eREG3 | eREG7 | eREG11 | eREG15 | eREG3 | eREG7 | eREG11 | eREG15 |
| PRB pair 1 | | | | PRB pair 2 | | | | PRB pair 3 | | | | PRB pair 4 | | | |

| eCCE0 | eCCE2 | eCCE3 | eCCE1 | eCCE3 | eCCE2 | eCCE1 | eCCE0 | eCCE1 | eCCE2 | eCCE3 | eCCE0 | eCCE0 | eCCE2 | eCCE3 | eCCE0 |

| eCCE0 | eCCE2 | eCCE3 | eCCE1 | eCCE3 | eCCE2 | eCCE1 | eCCE0 | eCCE1 | eCCE2 | eCCE3 | eCCE0 | eCCE1 | eCCE2 | eCCE3 | eCCE0 |
|---|---|---|---|---|---|---|---|---|---|---|---|---|---|---|---|
| eCCE4 | eCCE5 | eCCE6 | eCCE7 | eCCE7 | eCCE6 | eCCE5 | eCCE4 | eCCE7 | eCCE6 | eCCE5 | eCCE4 | eCCE5 | eCCE6 | eCCE7 | eCCE4 |
| eCCE8 | eCCE9 | eCCE10 | eCCE11 | eCCE11 | eCCE10 | eCCE9 | eCCE8 | eCCE11 | eCCE10 | eCCE9 | eCCE8 | eCCE9 | eCCE10 | eCCE11 | eCCE8 |
| eCCE12 | eCCE13 | eCCE14 | eCCE15 | eCCE15 | eCCE14 | eCCE13 | eCCE12 | eCCE15 | eCCE14 | eCCE13 | eCCE12 | eCCE13 | eCCE14 | eCCE15 | eCCE12 |
| PRB pair 1 | | | | PRB pair 2 | | | | PRB pair 3 | | | | PRB pair 4 | | | |

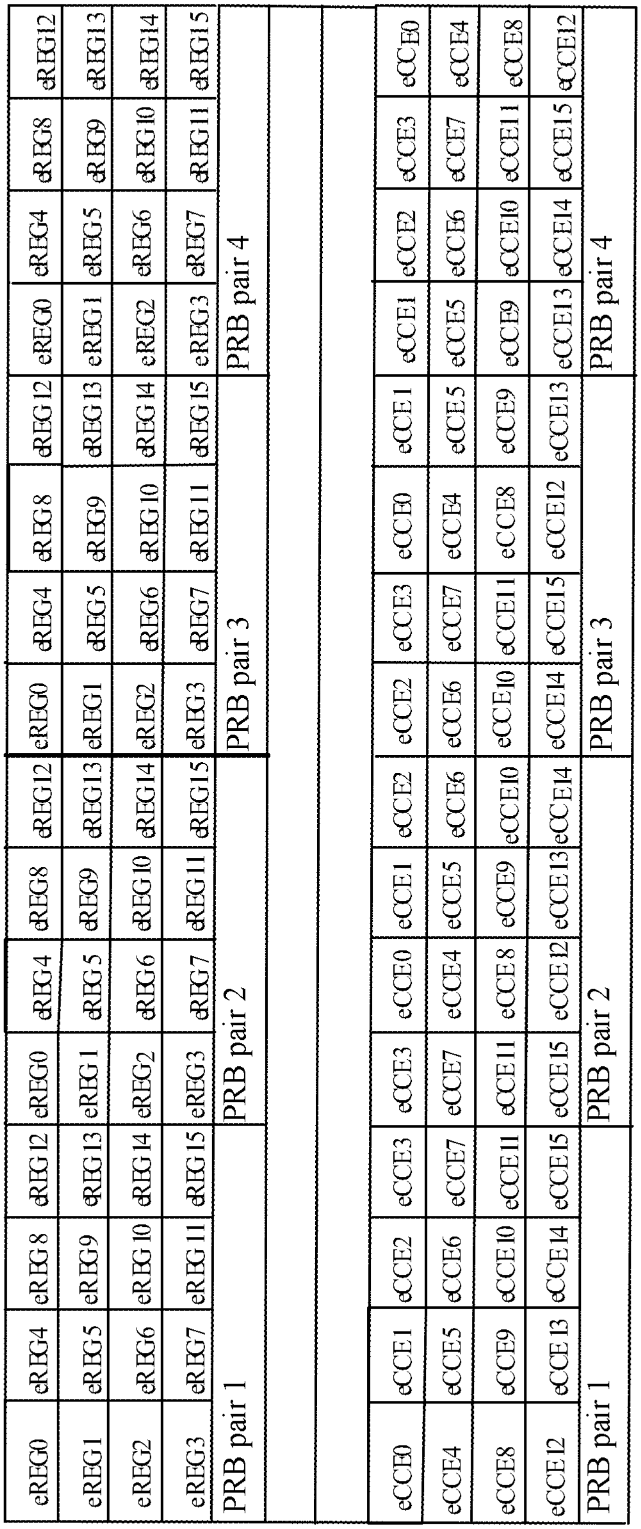

FIG. 23

| | | | | | | | | | | | | | | | |
|---|---|---|---|---|---|---|---|---|---|---|---|---|---|---|---|
| eCCE0 | eCCE1 | eCCE2 | eCCE3 | eCCE3 | eCCE0 | eCCE1 | eCCE2 | eCCE2 | eCCE3 | eCCE0 | eCCE1 | eCCE1 | eCCE2 | eCCE3 | eCCE0 |
| eCCE4 | eCCE5 | eCCE6 | eCCE7 | eCCE7 | eCCE4 | eCCE5 | eCCE6 | eCCE6 | eCCE7 | eCCE4 | eCCE5 | eCCE5 | eCCE6 | eCCE7 | eCCE4 |
| eCCE8 | eCCE9 | eCCE10 | eCCE11 | eCCE11 | eCCE8 | eCCE9 | eCCE10 | eCCE10 | eCCE11 | eCCE8 | eCCE9 | eCCE9 | eCCE10 | eCCE11 | eCCE8 |
| eCCE12 | eCCE13 | eCCE14 | eCCE15 | eCCE15 | eCCE12 | eCCE13 | eCCE14 | eCCE14 | eCCE15 | eCCE12 | eCCE13 | eCCE13 | eCCE14 | eCCE15 | eCCE12 |
| PRB pair 1 | | | | PRB pair 2 | | | | PRB pair 3 | | | | PRB pair 4 | | | |
| | | | | | | | | | | | | | | | |
| eCCE16 | eCCE17 | eCCE18 | eCCE19 | eCCE19 | eCCE16 | eCCE17 | eCCE18 | eCCE18 | eCCE19 | eCCE16 | eCCE17 | eCCE17 | eCCE18 | eCCE19 | eCCE16 |
| eCCE20 | eCCE21 | eCCE22 | eCCE23 | eCCE23 | eCCE20 | eCCE21 | eCCE22 | eCCE22 | eCCE23 | eCCE20 | eCCE21 | eCCE21 | eCCE22 | eCCE23 | eCCE20 |
| eCCE24 | eCCE25 | eCCE26 | eCCE27 | eCCE27 | eCCE24 | eCCE25 | eCCE26 | eCCE26 | eCCE27 | eCCE24 | eCCE25 | eCCE25 | eCCE26 | eCCE27 | eCCE24 |
| eCCE28 | eCCE29 | eCCE30 | eCCE31 | eCCE31 | eCCE28 | eCCE29 | eCCE30 | eCCE30 | eCCE31 | eCCE28 | eCCE29 | eCCE29 | eCCE30 | eCCE31 | eCCE28 |
| PRB pair 5 | | | | PRB pair 6 | | | | PRB pair 7 | | | | PRB pair 8 | | | |

FIG. 25

| | | | | | | | | | | | | | | | |
|---|---|---|---|---|---|---|---|---|---|---|---|---|---|---|---|
| eCCE0 | eCCE1 | eCCE2 | eCCE3 | eCCE3 | eCCE0 | eCCE1 | eCCE2 | eCCE2 | eCCE3 | eCCE0 | eCCE1 | eCCE1 | eCCE2 | eCCE3 | eCCE0 |
| eCCE4 | eCCE5 | eCCE6 | eCCE7 | eCCE7 | eCCE4 | eCCE5 | eCCE6 | eCCE6 | eCCE7 | eCCE4 | eCCE5 | eCCE5 | eCCE6 | eCCE7 | eCCE4 |
| eCCE8 | eCCE9 | eCCE10 | eCCE11 | eCCE11 | eCCE8 | eCCE9 | eCCE10 | eCCE10 | eCCE11 | eCCE8 | eCCE9 | eCCE9 | eCCE10 | eCCE11 | eCCE8 |
| eCCE12 | eCCE13 | eCCE14 | eCCE15 | eCCE15 | eCCE12 | eCCE13 | eCCE14 | eCCE14 | eCCE15 | eCCE12 | eCCE13 | eCCE13 | eCCE14 | eCCE15 | eCCE12 |
| PRB pair 1 | | | | PRB pair 2 | | | | PRB pair 3 | | | | PRB pair 4 | | | |
| | | | | | | | | | | | | | | | |
| eCCE16 | eCCE17 | eCCE18 | eCCE19 | eCCE19 | eCCE16 | eCCE17 | eCCE18 | eCCE18 | eCCE19 | eCCE16 | eCCE17 | eCCE17 | eCCE18 | eCCE19 | eCCE16 |
| eCCE20 | eCCE21 | eCCE22 | eCCE23 | eCCE23 | eCCE20 | eCCE21 | eCCE22 | eCCE22 | eCCE23 | eCCE20 | eCCE21 | eCCE21 | eCCE22 | eCCE23 | eCCE20 |
| eCCE24 | eCCE25 | eCCE26 | eCCE27 | eCCE27 | eCCE24 | eCCE25 | eCCE26 | eCCE26 | eCCE27 | eCCE24 | eCCE25 | eCCE25 | eCCE26 | eCCE27 | eCCE24 |
| eCCE28 | eCCE29 | eCCE30 | eCCE31 | eCCE31 | eCCE28 | eCCE29 | eCCE30 | eCCE30 | eCCE31 | eCCE28 | eCCE29 | eCCE29 | eCCE30 | eCCE31 | eCCE28 |
| PRB pair 5 | | | | PRB pair 6 | | | | PRB pair 7 | | | | PRB pair 8 | | | |

FIG. 26

METHODS FOR TRANSMITTING AND RECEIVING CONTROL CHANNEL, BASE STATION, AND USER EQUIPMENT

CROSS-REFERENCE TO RELATED APPLICATION

This application is a continuation of U.S. patent application Ser. No. 15/491,290, filed on Apr. 19, 2017, which is a continuation of U.S. patent application Ser. No. 14/611,999, filed on Feb. 2, 2015, now U.S. Pat. No. 9,673,947, which is a continuation of International Application No. PCT/CN2012/082390, filed on Sep. 28, 2012, and a continuation of International Patent Application No. PCT/CN2012/079604, filed on Aug. 2, 2012. All of the afore-mentioned patent applications are hereby incorporated by reference in their entireties.

TECHNICAL FIELD

The present invention relates to a communications technology, and in particular, to methods for transmitting and receiving a control channel, a base station, and a user equipment.

BACKGROUND

In a 3rd Generation Partnership Project (3rd Generation Partnership Project, 3GPP for short below) long term evolution (Long Term Evolution, LTE for short below) or long term evolution advanced (LTE-advanced, LTE-A for short below) system, an orthogonal frequency division multiple access (Orthogonal Frequency Division Multiple Access, OFDMA for short below) manner is generally used as a downlink multiple access mode. Downlink resources of the system are divided into orthogonal frequency division multiplexing (Orthogonal Frequency Division Multiplexing, OFDM for short below) symbols in terms of time, and are divided into subcarriers in terms of frequencies.

According to an LTE release 8, 9, or 10 (LTE Release 8/9/10) standard, one normal downlink subframe includes two timeslots (slots), where a timeslot includes 7 OFDM symbols, and a normal downlink subframe includes 14 or 12 OFDM symbols in total. In addition, the LTE Release 8/9/10 standard defines the size of a resource block (Resource Block, RB for short below). One RB includes 12 subcarriers in a frequency domain, and includes one half of a subframe duration in a time domain (one timeslot), that is, it includes 7 or 6 OFDM symbols. A subcarrier in an OFDM symbol is referred to as a resource element (Resource Element, RE for short below). Therefore, one RB includes 84 or 72 REs. In a subframe, a pair of RBs in two timeslots is referred to as a resource block pair (RB pair, RB pair for short below). In actual transmission, a resource block pair used for physical resources (physical RB pair) is also referred to as a physical resource block pair (Physical RB pair, PRB pair for short below). The PRB pair is generally briefed as a PRB. Therefore, the PRB, PRB pair, physical resource block, and physical resource block pair in the following description all refer to a PRB pair.

Data of all types borne in a subframe is organized and mapped onto various physical channels based on division of physical time-frequency resources in the subframe. Various physical channels may be generally classified into two types: control channels and traffic channels. Correspondingly, data borne in a control channel may be referred to as control data (or control information), and data borne in a traffic channel may be referred to as service data. An ultimate purpose of communication is to transmit service data. A function of the control channel is to provide assistance in transmission of service data.

A complete physical downlink control channel (Physical Downlink Control Channel, PDCCH) is formed by one or more control channel elements (Control Channel Element, CCE for short below), and one CCE is formed by 9 resource element groups (Resource Element Group, REG for short below), where one REG occupies 4 REs. According to LTE Release 8/9/10, one PDCCH may be formed by 1, 2, 4, or 8 CCEs, respectively corresponding to aggregation level 1, 2, 4, or 8.

In the LTE system, due to introduction of technologies such as multiple input multiple output (Multiple Input Multiple Output, MIMO for short below) and coordinated multiple points (Coordinated Multiple Points, CoMP for short below), the capacity of a control channel is limited. Therefore, an enhanced physical downlink control channel (Enhanced PDCCH, E-PDCCH for short below) transmitted based on a MIMO precoding mode is introduced. The E-PDCCH may be demodulated based on a UE-specific reference signal—demodulation reference signal (Demodulation Reference Signal, DMRS for short below).

For the E-PDCCH, there are N enhanced control channel elements (Enhanced Control Channel Element, eCCE for short below) in one PRB pair, where N is a positive integer.

According to different transmission modes, E-PDCCHs may be classified into localized (localized) E-PDCCHs and distributed (distributed) E-PDCCHs, where a localized E-PDCCH is transmitted by using a localized transmission mode, and a distributed E-PDCCH is transmitted by using a distributed transmission mode. For the localized E-PDCCH, one control channel is generally located in one PRB pair. For the distributed E-PDCCH, one eCCE is further divided into at least one enhanced resource element group (Enhanced Resource Element Group, eREG for short below). The at least one eREG may be distributed in multiple PRB pairs, so that a frequency diversity gain is obtained.

For the distributed E-PDCCH, interleaving is performed in units of eREGs in the prior art to obtain the position of one distributed E-PDCCH in a PRB pair. It is assumed that a PRB pair includes 4 eCCEs, and that an eCCE includes 4 eREGs. It is assumed that the E-PDCCH of UE1 uses the distributed transmission mode, and is located in 4 PRB pairs with index numbers 3, 4, 8, and 9. If mapping is performed in units of eREGs, 16 eREGs to which an E-PDCCH at aggregation level 4 is mapped may be located in 16 different eCCEs, and 8 eREGs to which an E-PDCCH at aggregation level 2 is mapped may be located in 8 different eCCEs.

A base station (evolved NodeB, eNB for short below) needs to transmit E-PDCCHs to multiple UEs, where some UEs use distributed E-PDCCHs, and some UEs use localized E-PDCCHs. Using an E-PDCCH at aggregation level 4 as an example, according to the mapping mode, in the 4 PRB pairs with index numbers 3, 4, 8, and 9, a part of eREGs on each eCCE are occupied by the E-PDCCH of UE1. If the eNB transmits the E-PDCCH to UE1 according to the mapping mode, the eNB cannot transmit a localized E-PDCCH in the 4 PRB pairs. Therefore, the E-PDCCH multiplexing efficiency is relatively low.

SUMMARY

The present invention provides methods for transmitting and receiving a control channel, a base station, and a user equipment, so as to improve multiplexing efficiency of E-PDCCHs of different modes.

A first aspect of the present invention provides a method for transmitting a control channel, including:

determining m physical resource block pairs used for transmitting a control channel to be transmitted, where an $i^{th}$ physical resource block pair includes $n_i$ first physical resource elements, the $i^{th}$ physical resource block pair includes $k_i$ second physical resource elements, and the second physical resource elements included in the m physical resource block pairs form multiple second physical resource element groups, where the first physical resource elements are used for transmitting the control channel to be transmitted by using a localized transmission mode, the second physical resource elements are used for transmitting the control channel to be transmitted by using a distributed transmission mode, and one of the first physical resource elements includes at least two second physical resource elements, where $m \geq 1$, $n_i \geq 1$, $k_i \geq 1$, $0 \leq i \leq m-1$, and m, i, $n_i$, and $k_i$ are all integers;

when the control channel to be transmitted is transmitted by using the distributed transmission mode, determining an aggregation level L of the control channel to be transmitted, where $L \geq 1$, and L is an integer;

determining, according to the aggregation level L, the number $G_L$ of second physical resource elements included in each of the second physical resource element groups, where the $G_L$ second physical resource elements included in each of the second physical resource element groups are located in $\lceil G_L/q \rceil$ first physical resource elements in the m physical resource block pairs, where q indicates the number of second physical resource elements included in one first physical resource element, $\lceil G_L/q \rceil$ indicates roundup of $G_L/q$, $G_L \geq 1$, and $G_L$ is an integer;

determining, according to the aggregation level L, a first control channel candidate at the aggregation level L, where the first control channel candidate corresponds to $N_L$ second physical resource element groups, where $N_L \geq 1$, and $N_L$ is an integer; and placing, on physical resources to which the first control channel candidate is mapped, control information of the control channel to be transmitted, and transmitting the control information.

A second aspect of the present invention provides a method for receiving a control channel, including:

determining m physical resource block pairs used for transmitting a control channel, where an $i^{th}$ physical resource block pair includes $n_i$ first physical resource elements, the $i^{th}$ physical resource block pair includes $k_i$ second physical resource elements, and the second physical resource elements included in the m physical resource block pairs form multiple second physical resource element groups, where the first physical resource elements are used for transmitting the control channel to be transmitted by using a localized transmission mode, the second physical resource elements are used for transmitting the control channel to be transmitted by using a distributed transmission mode, and one of the first physical resource elements includes at least two second physical resource elements, where $m \geq 1$, $n_i \geq 1$, $k_i \geq 1$, $0 \leq i \leq m-1$, and m, i, $n_i$, and $k_i$ are all integers;

determining, according to an aggregation level L of the control channel, the number $G_L$ of second physical resource elements included in each of the second physical resource element groups, where the $G_L$ second physical resource elements included in each of the second physical resource element groups are located in $\lceil G_L/q \rceil$ first physical resource elements in the m physical resource block pairs, where q indicates the number of second physical resource elements included in one first physical resource element, $\lceil G_L/q \rceil$ indicates roundup of $G_L/q$, $G_L \geq 1$, $L \geq 1$, and $G_L$ and L are both integers;

determining, according to the aggregation level L, M control channel candidates at the aggregation level L, where each of the control channel candidates corresponds to $N_L$ second physical resource element groups, where $M \geq 1$, $N_L \geq 1$, and M and $N_L$ are both integers; and detecting the M control channel candidates.

A third aspect of the present invention provides a base station, including:

a processor, configured to: determine m physical resource block pairs used for transmitting a control channel to be transmitted, where an $i^{th}$ physical resource block pair includes $n_i$ first physical resource elements, the $i^{th}$ physical resource block pair includes $k_i$ second physical resource elements, and the second physical resource elements included in the m physical resource block pairs form multiple second physical resource element groups, where the first physical resource elements are used for transmitting the control channel to be transmitted by using a localized transmission mode, the second physical resource elements are used for transmitting the control channel to be transmitted by using a distributed transmission mode, and one of the first physical resource elements includes at least two second physical resource elements, where $m \geq 1$, $n_i \geq 1$, $k_i \geq 1$, $0 \leq i \leq m-1$, and m, i, $n_i$, and $k_i$ are all integers; when the control channel to be transmitted is transmitted by using the distributed transmission mode, determine an aggregation level L of the control channel to be transmitted, where $L \geq 1$, and L is an integer; determine, according to the aggregation level L, the number $G_L$ of second physical resource elements included in each of the second physical resource element groups, where the $G_L$ second physical resource elements included in each of the second physical resource element groups are located in $\lceil G_L/q \rceil$ first physical resource elements in the m physical resource block pairs, where q indicates the number of second physical resource elements included in one first physical resource element, $\lceil G_L/q \rceil$ indicates roundup of $G_L/q$, $G_L \geq 1$, and $G_L$ is an integer; and determine, according to the aggregation level L, a first control channel candidate at the aggregation level L, where the first control channel candidate corresponds to $N_L$ second physical resource element groups, where $N_L \geq 1$ and $N_L$ is an integer; and a transmitter, configured to place, on physical resources to which the first control channel candidate is mapped, control information of the control channel to be transmitted, and transmit the control information.

A fourth aspect of the present invention provides a user equipment, including:

a processor, configured to: determine m physical resource block pairs used for transmitting a control channel, where an $i^{th}$ physical resource block pair includes $n_i$ first physical resource elements, the $i^{th}$ physical resource block pair includes $k_i$ second physical resource elements, and the second physical resource elements included in the m physical resource block pairs form multiple second physical resource element groups, where the first physical resource elements are used for transmitting the control channel to be transmitted by using a localized transmission mode, the second physical resource elements are used for transmitting the control channel to be transmitted by using a distributed transmission mode, and one of the first physical resource elements includes at least two second physical resource elements, where $m \ge 1$, $n_i \ge 1$, $k_i \ge 1$, $0 \le i \approx m-1$, and m, i, $n_i$, and $k_i$ are all integers; determine, according to an aggregation level L of the control channel, the number $G_L$ of second physical resource elements included in each of the second physical resource element groups, where the $G_L$ second physical resource elements included in each of the second physical resource element groups are located in $\lceil G_L/q \rceil$ first physical resource elements in the m physical resource block pairs, where q indicates the number of second physical resource elements included in one first physical resource element, $\lceil G_L/q \rceil$ indicates roundup of $G_L/q$, $G_L \ge 1$, $L \ge 1$, and $G_L$ and L are both integers; and determine, according to the aggregation level L, M control channel candidates at the aggregation level L, where each of the control channel candidates corresponds to $N_L$ second physical resource element groups, where $M \ge 1$, $N_L \ge 1$, and M and $N_L$ are both integers; and the receiver, configured to detect the M control channel candidates.

A fifth aspect of the present invention provides a base station, including:

a first determining module, configured to: determine m physical resource block pairs used for transmitting a control channel to be transmitted, where an $i^{th}$ physical resource block pair includes $n_i$ first physical resource elements, the $i^{th}$ physical resource block pair includes $k_i$ second physical resource elements, and the second physical resource elements included in the m physical resource block pairs form multiple second physical resource element groups, where the first physical resource elements are used for transmitting the control channel to be transmitted by using a localized transmission mode, the second physical resource elements are used for transmitting the control channel to be transmitted by using a distributed transmission mode, and one of the first physical resource elements includes at least two second physical resource elements, where $m \ge 1$, $n_i \ge 1$, $k_i \ge 1$, $0 \le i \le m-1$, and m, i, $n_i$, and $k_i$ are all integers; when the control channel to be transmitted is transmitted by using the distributed transmission mode, determine an aggregation level L of the control channel to be transmitted, where $L \ge 1$, and L is an integer; determine, according to the aggregation level L, the number $G_L$ of second physical resource elements included in each of the second physical resource element groups, where the $G_L$ second physical resource elements included in each of the second physical resource element groups are located in $\lceil G_L/q \rceil$ first physical resource elements in the m physical resource block pairs, where q indicates the number of second physical resource elements included in one first physical resource element, $\lceil G_L/q \rceil$ indicates roundup of $G_L/q$, $G_L \ge 1$, and $G_L$ is an integer; determine, according to the aggregation level L, a first control channel candidate at the aggregation level L, where the first control channel candidate corresponds to $N_L$ second physical resource element groups, where $N_L \ge 1$ and $N_L$ is an integer; and transfer, to a transmitting module, physical resources to which the first control channel candidate is mapped; and the transmitting module, configured to: receive, from the first determining module, the physical resources to which the first control channel candidate is mapped; and place, on the physical resources to which the first control channel candidate is mapped, control information of the control channel to be transmitted, and transmit the control information.

A sixth aspect of the present invention provides a user equipment, including:

a second determining module, configured to: determine m physical resource block pairs used for transmitting a control channel, where an $i^{th}$ physical resource block pair includes $n_i$ first physical resource elements, the $i^{th}$ physical resource block pair includes $k_i$ second physical resource elements, and the second physical resource elements included in the m physical resource block pairs form multiple second physical resource element groups, where the first physical resource elements are used for transmitting the control channel to be transmitted by using a localized transmission mode, the second physical resource elements are used for transmitting the control channel to be transmitted by using a distributed transmission mode, and one of the first physical resource elements includes at least two second physical resource elements, where $m \ge 1$, $n_i \ge 1$, $k_i \ge 1$, $0 \le i \le m-1$, and m, i, $n_i$, and $k_i$ are all integers; determine, according to an aggregation level L of the control channel, the number $G_L$ of second physical resource elements included in each of the second physical resource element groups, where the $G_L$ second physical resource elements included in each of the second physical resource element groups are located in $\lceil G_L/q \rceil$ first physical resource elements in the m physical resource block pairs, where q indicates the number of second physical resource elements included in one first physical resource element, $\lceil G_L/q \rceil$ indicates roundup of $G_L/q$, $G_L \ge 1$, $L \ge 1$, and $G_L$ and L are both integers; and determine, according to the aggregation level L, M control channel candidates at the aggregation level L, where each of the control channel candidates corresponds to $N_L$ second physical resource element groups, where $M \ge 1$, $N_L \ge 1$, and M and $N_L$ are both integers; and a receiving module, configured to detect the M control channel candidates determined by the second determining module.

A seventh aspect of the present invention provides a method for transmitting a control channel, including:

determining m physical resource block pairs used for transmitting a control channel to be transmitted, where the m physical resource block pairs include m×n first physical resource elements, the number of resource elements occupied by each physical resource block pair is equal to the number of resource elements occupied by n first physical resource elements, and each of the first physical resource elements includes q second physical resource elements, where $m \ge 1$, $n \ge 1$, $q \ge 2$, and m, n, and q are all integers;

determining an aggregation level L of the control channel to be transmitted, where $L \ge 1$, and L is an integer;

determining, according to the aggregation level L, a first control channel candidate at the aggregation level L, where the first control channel candidate corresponds to L first physical resource elements, and corresponds to L×q second physical resource elements; and placing, on physical resources to which the first control channel candidate is mapped, control information of the control channel to be transmitted, and transmitting the control information.

An eighth aspect of the present invention provides a method for receiving a control channel, including:

determining m physical resource block pairs used for transmitting a control channel to be transmitted, where the m physical resource block pairs include m×n first physical resource elements, the number of resource elements occupied by each physical resource block pair is equal to the number of resource elements occupied by n first physical resource elements, and each of the first physical resource elements includes q second physical resource elements, where $m \ge 1$, $n \ge 1$, $q \ge 2$, and m, n, and q are all integers;

determining, according to the aggregation level L, M control channel candidates at the aggregation level L, where each of the control channel candidates corresponds to L first physical resource elements, and corresponds to L×q second physical resource elements; and detecting the M control channel candidates.

A ninth aspect of the present invention provides a base station, including:

a processor, configured to: determine m physical resource block pairs used for transmitting a control channel to be transmitted, where the m physical resource block pairs include m×n first physical resource elements, the number of resource elements occupied by each physical resource block pair is equal to the number of resource elements occupied by n first physical resource elements, and each of the first physical resource elements includes q second physical resource elements, where m≥1, n≥1, q≥2, and m, n, and q are all integers; determine an aggregation level L of the control channel to be transmitted, where L≥1, and L is an integer; and determine, according to the aggregation level L, a first control channel candidate at the aggregation level L, where the first control channel candidate corresponds to L first physical resource elements, and corresponds to L×q second physical resource elements; and a transmitter, configured to place, on physical resources to which the first control channel candidate determined by the processor is mapped, control information of the control channel to be transmitted, and transmit the control information.

In a tenth aspect, the present invention provides a user equipment, including:

a processor, configured to: determine m physical resource block pairs used for transmitting a control channel to be transmitted, where the m physical resource block pairs include m×n first physical resource elements, the number of resource elements occupied by each physical resource block pair is equal to the number of resource elements occupied by n first physical resource elements, and each of the first physical resource elements includes q second physical resource elements, where m≥1, n≥1, q≥2, and m, n, and q are all integers; and determine, according to the aggregation level L, M control channel candidates at the aggregation level L, where each of the control channel candidates corresponds to L first physical resource elements, and corresponds to L×q second physical resource elements; and a receiver, configured to detect the M control channel candidates determined by the processor.

An eleventh aspect of the present invention provides a base station, including:

a determining module, configured to: determine m physical resource block pairs used for transmitting a control channel to be transmitted, where the m physical resource block pairs include m×n first physical resource elements, the number of resource elements occupied by each physical resource block pair is equal to the number of resource elements occupied by n first physical resource elements, and each of the first physical resource elements includes q second physical resource elements, where m≥1, n≥1, q≥2, and m, n, and q are all integers; determine an aggregation level L of the control channel to be transmitted, where L≥1, and L is an integer; and determine, according to the aggregation level L, a first control channel candidate at the aggregation level L, where the first control channel candidate corresponds to L first physical resource elements, and corresponds to L×q second physical resource elements; and a transmitting module, configured to place, on physical resources to which the first control channel candidate determined by the determining module is mapped, control information of the control channel to be transmitted, and transmit the control information.

A twelfth aspect of the present invention provides a user equipment, including:

a determining module, configured to: determine m physical resource block pairs used for transmitting a control channel to be transmitted, where the m physical resource block pairs include m×n first physical resource elements, the number of resource elements occupied by each physical resource block pair is equal to the number of resource elements occupied by n first physical resource elements, and each of the first physical resource elements includes q second physical resource elements, where m≥1, n≥1, q≥2, and m, n, and q are all integers; and determine, according to the aggregation level L, M control channel candidates at the aggregation level L, where each of the control channel candidates corresponds to L first physical resource elements, and corresponds to L×q second physical resource elements; and a receiving module, configured to detect the M control channel candidates determined by the determining module.

The technical effects of the present invention are: at an aggregation level L, when any control channel candidate of a distributed control channel to be transmitted is mapped to physical resources, and some eREGs of the control channel candidate are mapped to a physical resource block pair, these eREGs are preferably mapped to physical resources corresponding to fewest localized eCCEs in the physical resource block pair, thereby improving multiplexing efficiency of control channels of different modes.

BRIEF DESCRIPTION OF THE DRAWINGS

To describe the technical solutions in the embodiments of the present invention more clearly, the following briefly introduces the accompanying drawings required for describing the embodiments. Apparently, the accompanying drawings in the following description show merely some embodiments of the present invention, and persons of ordinary skill in the art may still derive other drawings from these accompanying drawings without creative efforts.

FIG. 2(*b*) is a schematic diagram of eCCEs of a distributed E-PDCCH;

FIG. 6 is a schematic diagram of an embodiment of eREG groups to which virtual resource element groups are mapped according to the present invention;

FIG. 7 is a schematic diagram of an embodiment of eREG groups to which a distributed E-PDCCH is mapped according to the present invention;

FIG. 20 is a schematic diagram of an embodiment of an E-PDCCH set including 2 PRB pairs according to the present invention;

FIG. 21 is a schematic diagram of an embodiment of an E-PDCCH set including 4 PRB pairs according to the present invention;

FIG. 22 is a schematic diagram of an embodiment of an E-PDCCH set including 8 PRB pairs according to the present invention;

FIG. 23 is a schematic diagram of another embodiment of an E-PDCCH set including 4 PRB pairs according to the present invention;

FIG. 25 is a schematic diagram of an embodiment of a numbering mode of eCCEs according to the present invention;

FIG. 26 is a schematic diagram of another embodiment of a numbering mode of eCCEs according to the present invention;

DETAILED DESCRIPTION

To make the objectives, technical solutions, and advantages of the embodiments of the present invention more comprehensible, the following clearly describes the technical solutions in the embodiments of the present invention with reference to the accompanying drawings in the embodiments of the present invention. Apparently, the described embodiments are merely a part rather than all of the embodiments of the present invention. All other embodiments obtained by persons of ordinary skill in the art based on the embodiments of the present invention without creative efforts shall fall within the protection scope of the present invention.

Figure 1:
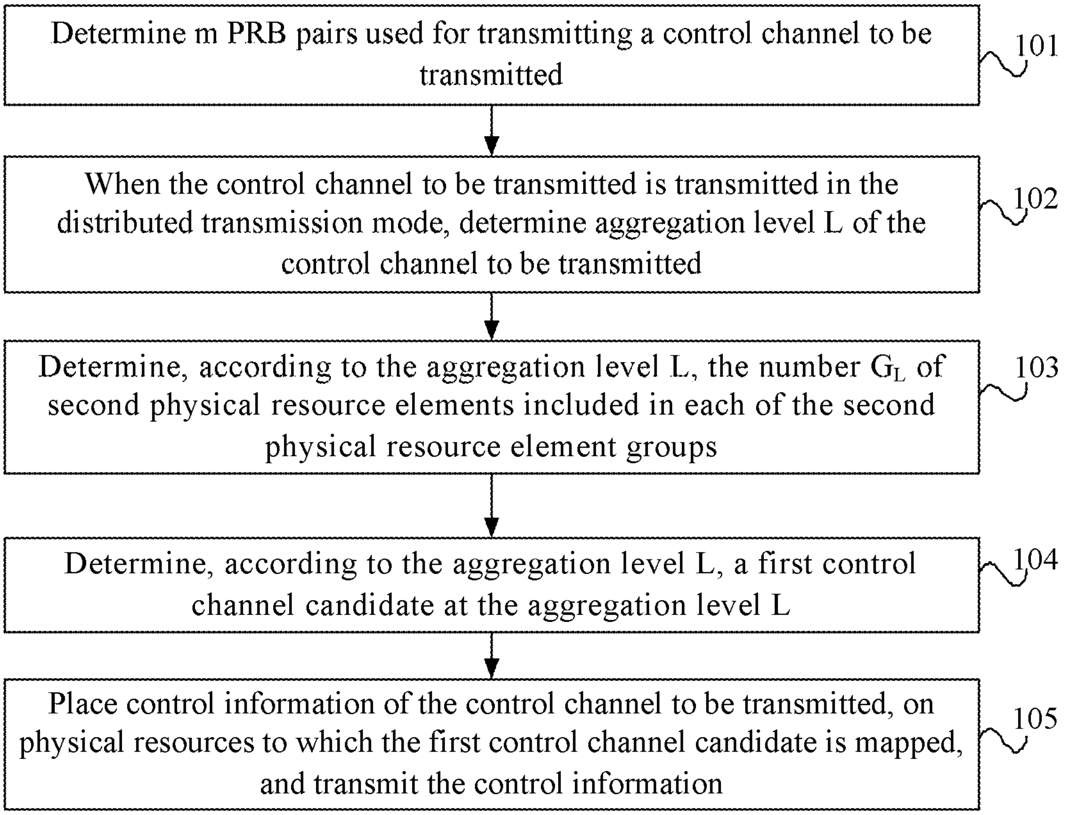
FIG. 1 is a flowchart of an embodiment of a method for transmitting a control channel according to the present invention.

FIG. 1 is a flowchart of an embodiment of a method for transmitting a control channel according to the present invention. As shown in FIG. 1, the method for transmitting a control channel may include:

Step 101: Determine m PRB pairs used for transmitting a control channel to be transmitted.

An $i^{th}$ PRB pair includes $n_i$ first physical resource elements, the $i^{th}$ PRB pair includes $k_i$ second physical resource elements, and the second physical resource elements included in the m PRB pairs form multiple second physical resource element groups, where the first physical resource elements are used for transmitting the control channel to be transmitted by using a localized transmission mode, and the second physical resource elements are used for transmitting the control channel to be transmitted by using a distributed transmission mode, where $m\geq1$, $n_i\geq1$, $k_i\geq1$, $0\leq i\leq m-1$, and m, i, $n_i$, and $k_i$ are all integers.

One of the first physical resource elements includes at least two second physical resource elements, that is, physical resources of the first physical resource element include physical resources of at least two second physical resource elements.

The control channel may be an E-PDCCH or a PDCCH, which is not limited by this embodiment.

Step 102: When the control channel to be transmitted is transmitted by using the distributed transmission mode, determine an aggregation level L of the control channel to be transmitted, where $L\geq1$, and L is an integer.

Step 103: Determine, according to the aggregation level L, the number $G_L$ of second physical resource elements included in each of the second physical resource element groups, where the $G_L$ second physical resource elements included in each of the second physical resource element groups are located in $\lceil G_L/q\rceil$ first physical resource elements in the m PRB pairs, where q indicates the number of second physical resource elements included in one first physical resource element, $\lceil G_L/q\rceil$ indicates roundup of $G_L/q$, $G_L\geq1$, and $G_L$ is an integer.

Step 104: Determine, according to the aggregation level L, a first control channel candidate at the aggregation level L, where the first control channel candidate corresponds to $N_L$ second physical resource element groups, where $N_L\geq1$, and $N_L$ is an integer.

Step 105: Place, on physical resources to which the first control channel candidate is mapped, control information of the control channel to be transmitted, and transmit the control information.

In this embodiment, when $G_L$ is less than or equal to the number of second physical resource elements included in one first physical resource element, the $G_L$ second physical resource elements are located in one first physical resource element in the m PRB pairs.

Specifically, in step 103, the determining, according to the aggregation level L, the number $G_L$ of second physical resource elements included in each of the second physical resource element groups may be: determining the $G_L$ according to a preset mapping relationship between the aggregation level L and the number $G_L$ of second physical resource elements included in each of the second physical resource element groups.

In addition, in this embodiment, higher layer signaling may be transmitted to a receiving device, where the higher layer signaling is used for configuring the number $G_L$ corresponding to the aggregation level L, of second physical resource elements included in each of the second physical resource element groups.

In this embodiment, for different aggregation levels, the number $G_L$ of second physical resource elements included in a second physical resource element group corresponding to at least one aggregation level is greater than or equal to 2; in this case, the number $G_L$ of second physical resource elements included in a second physical resource element group corresponding to at least one aggregation level is greater than or equal to 2, and the $G_L$ second physical resource elements included in each of the second physical resource element groups are located in $\lceil G_L/q \rceil$ first physical resource elements in the m PRB pairs, and therefore, at this aggregation level, each of the second physical resource element groups occupies fewer first physical resource elements, thereby avoiding a case where each second physical resource element in the second physical resource element group occupies one first physical resource element, so that more first physical resource elements may be used in the localized transmission mode; or for at least two aggregation levels in multiple different aggregation levels, a second physical resource element group corresponding to a higher aggregation level in the at least two aggregation levels includes more second physical resource elements; in this case, a control channel at a higher aggregation level occupies more second physical resource elements. With respect to a diversity gain, when the diversity gain is greater than 4, for example, the diversity gain changes from 4 to 8, a performance gain is not great. Furthermore, correlation also exists in a frequency domain, and only a limited diversity gain can be obtained in the frequency domain. Therefore, it is unnecessary to distribute the second physical resource elements occupied by the control channel at the higher aggregation level to a lot of PRB pairs, so long as a certain diversity gain is obtained. For example, the second physical resource elements occupied by the control channel at the higher aggregation level are distributed to 4 channel-independent PRB pairs in the frequency domain. Therefore, in the case where a certain frequency diversity gain is obtained at each aggregation level, some first physical resource elements are reserved for a localized E-PDCCH.

In this embodiment, all second physical resource elements included in one second physical resource element group are located in one PRB pair; or all second physical resource elements included in all the second physical resource element groups are located on physical resources of a part of first physical resource elements in the m PRB pairs; or in one PRB pair, all second physical resource elements included in one second physical resource element group are located on physical resources of a part of first physical resource elements in the one PRB pair; or in one PRB pair, all second physical resource elements included in all second physical resource element groups are located on physical resources of a part of first physical resource elements in the one PRB pair. Therefore, some first physical resource elements may be used for localized E-PDCCH transmission.

In this embodiment, in one PRB pair, all second physical resource element groups are formed by physical resources corresponding to a part of antenna ports in the one PRB pair; or in one PRB pair, all second physical resource elements included in all second physical resource element groups are located in first physical resource elements corresponding to a part of antenna ports in the one PRB pair.

In this embodiment, specifically, the determining, according to the aggregation level L, a first control channel candidate at the aggregation level L may be: determining, according to the aggregation level L, the number M of control channel candidates at the aggregation level L, where M is an integer, and M≥1; mapping the M control channel candidates to physical resources in the m PRB pairs; and selecting one first control channel candidate from the M control channel candidates.

Specifically, the mapping the M control channel candidates to physical resources in the m PRB pairs may be: mapping the M control channel candidates to $M\times H_L$ second physical resource elements in $$\sum_{i=0}^{m-1} k_i$$

second physical resource elements, where $H_L$ indicates the number of second physical resource elements to which each of the control channel candidates at the aggregation level L needs to be mapped, $N_L\times G_L=H_L$, $H_L\geq 1$, and $N_L$ is an integer.

Specifically, the mapping the M control channel candidates to $M\times H_L$ second physical resource elements in $$\sum_{i=0}^{m-1} k_i$$

second physical resource elements may be:

setting virtual resource elements, where each of the virtual resource elements corresponds to one second physical resource element on a physical resource, a virtual resource element set includes $$\sum_{i=0}^{m-1} k_i$$

virtual resource elements, and the M control channel candidates correspond to $M\times H_L$ virtual resource elements;

mapping the M control channel candidates to $M\times H_L$ virtual resource elements in the virtual resource element set; and mapping the $M\times H_L$ virtual resource elements to the $M\times H_L$ second physical resource elements in the $$\sum_{i=0}^{m-1} k_i$$

second physical resource elements.

The mapping the M control channel candidates to $M\times H_L$ virtual resource elements in the virtual resource element set may be: mapping, according to a pre-obtained start position, the M control channel candidates to $M\times H_L$ consecutive virtual resource elements consecutively.

The mapping the $M \times H_L$ virtual resource elements to the $M \times H_L$ second physical resource elements in the $$\sum_{i=0}^{m-1} k_i$$

second physical resource elements may be: interleaving the $$\sum_{i=0}^{m-1} k_i$$

virtual resource elements included in the virtual resource element set through an interleaver, where the number of elements in an interleaving matrix of the interleaver is Q; mapping the interleaved virtual resource element set to $$\sum_{i=0}^{m-1} k_i$$

second physical resource elements included in the m PRB pairs; obtaining, according to mapped positions of the $M \times H_L$ virtual resource elements in the virtual resource element set, mapped positions of the $M \times H_L$ virtual resource elements in the interleaved virtual resource element set; and mapping, according to mapped positions of the interleaved virtual resource element set in the $$\sum_{i=0}^{m-1} k_i$$

second physical resource elements, the $M \times H_L$ virtual resource elements to the $M \times H_L$ second physical resource elements in the $$\sum_{i=0}^{m-1} k_i$$

second physical resource elements.

Specifically, the interleaving the $$\sum_{i=0}^{m-1} k_i$$

virtual resource elements included in the virtual resource element set through an interleaver may be: dividing the virtual resource element set into $R_L$ virtual resource element groups, where the number of virtual resource elements included in each virtual resource element group is $G_L$, where $$R_L = \left\lfloor \frac{\sum_{i=0}^{m-1} k_i}{G_L} \right\rfloor,$$

and $Q \le R_L$; and sequentially writing the $R_L$ virtual resource element groups into the interleaving matrix according to rows, where each virtual resource element group corresponds to one element of the interleaving matrix, and sequentially reading the $R_L$ virtual resource element groups from the interleaving matrix according to columns; or sequentially writing the $R_L$ virtual resource element groups into the interleaving matrix according to columns, where each virtual resource element group corresponds to one element of the interleaving matrix, and sequentially reading the $R_L$ virtual resource element groups from the interleaving matrix according to rows; where the sequentially read $R_L$ virtual resource element groups form the interleaved virtual resource element set.

In an implementation manner of this embodiment, the number of columns in the interleaving matrix is m; and/or the number of rows in the interleaving matrix is $$\left\lceil \frac{\sum_{i=0}^{m-1} k_i}{m \times G_L} \right\rceil, \text{ where } \left\lceil \frac{\sum_{i=0}^{m-1} k_i}{m \times G_L} \right\rceil$$

indicates roundup of $$\frac{\sum_{i=0}^{m-1} k_i}{m \times G_L};$$

and when the number of second physical resource elements included in each PRB pair in the m PRB pairs is equal and is p, the number of rows in the interleaving matrix is $$\left\lceil \frac{p}{G_L} \right\rceil.$$

In another implementation manner of this embodiment, the number of rows in the interleaving matrix is m; and/or the number of columns in the interleaving matrix is $$\left\lceil \frac{\sum_{i=0}^{m-1} k_i}{m \times G_L} \right\rceil, \text{ where } \left\lceil \frac{\sum_{i=0}^{m-1} k_i}{m \times G_L} \right\rceil$$

indicates roundup of $$\frac{\sum_{i=0}^{m-1} k_i}{m \times G_L};$$

and when the number of second physical resource elements included in each PRB pair in the m PRB pairs is equal and is p, the number of columns in the interleaving matrix is $$\left\lceil \frac{p}{G_L} \right\rceil.$$

Specifically, the mapping the interleaved virtual resource element set to $$\sum_{i=0}^{m-1} k_i$$

second physical resource elements included in the m PRB pairs may be: sequentially mapping, according to sequence numbers of resource block pairs, the interleaved virtual resource element set to the m PRB pairs; and in a mapping to second physical resource elements included in one PRB pair, mapping virtual resource element groups in the interleaved virtual resource element set to second physical resource element groups according to a predefined sequence, where each virtual resource element group in the interleaved virtual resource element set is mapped to one second physical resource element group. The sequence numbers of the resource block pairs are sequence numbers of PRB pairs or sequence numbers of virtual resource block pairs; and when the sequence numbers of the resource block pairs are sequence numbers of virtual resource block pairs, a mapping relationship exists between the sequence numbers of the virtual resource block pairs and the sequence numbers of the PRB pairs.

In the foregoing embodiment, at the aggregation level L, when any control channel candidate of a distributed control channel to be transmitted is mapped to physical resources, and some eREGs of the control channel candidate are mapped to a PRB pair, these eREGs are preferably mapped to physical resources corresponding to fewest localized eCCEs in the PRB pair, thereby improving multiplexing efficiency of control channels of different modes.

In the foregoing embodiment and the following embodiment, the first physical resource elements may be physical resources corresponding to eCCEs. For example, the size of a first physical resource element corresponds to the size of an eCCE, that is, a physical resource element included in one of the first physical resource element may contain one eCCE.

In the foregoing embodiment and the following embodiment, the second physical resource elements may be physical resources corresponding to eREGs. For example, the size of a second physical resource element corresponds to the size of an eREG or a second physical resource element itself is an eREG.

In the foregoing embodiment and the following embodiment, the control channel to be transmitted may be an E-PDCCH. One E-PDCCH may include at least one eCCE.

The following describes the method for transmitting a control channel according to the embodiment shown in FIG. 1 by using an example where the first physical resource elements are physical resources corresponding to eCCEs, the second physical resource elements are physical resources corresponding to eREGs, and the control channel to be transmitted is an E-PDCCH.

Step 1: A base station determines m PRB pairs that may be used for transmitting an E-PDCCH to be transmitted, where m≥1, and m is an integer.

In the m PRB pairs that are determined by the base station and may be used for transmitting the E-PDCCH, for a localized E-PDCCH, an $i^{th}$ PRB pair includes physical resources of $n_i$ eCCEs; and for a distributed E-PDCCH, the $i^{th}$ PRB pair includes $k_i$ eREGs. Therefore, the m PRB pairs include $$\sum_{i=0}^{m-1} k_i$$

eREGs, where $n_i \geq 1$, $k_i \geq 1$, $0 \leq i \leq m-1$, and i, $n_i$ and i=0 $k_i$ are all integers. The physical resources of eCCEs include physical resources of at least two eREGs.

Figure 2B:
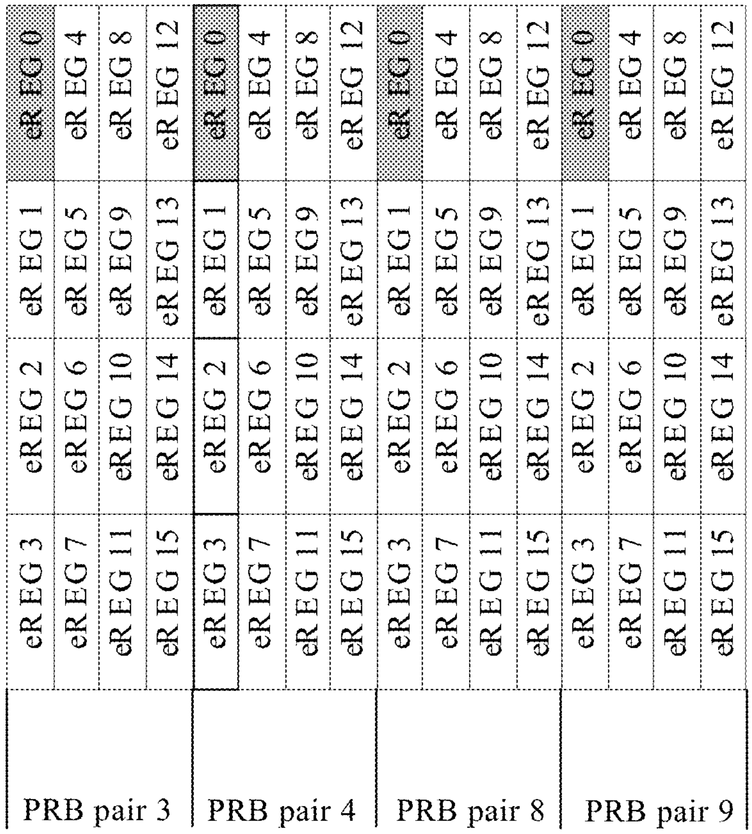
FIG. 2(*a*) is a schematic diagram of eCCEs of a localized E-PDCCH.

For one eCCE, the localized E-PDCCH and the distributed E-PDCCH include the same number of eREGs, but their specific mappings are different. For example, an E-PDCCH at aggregation level 1 occupies one eCCE. If the E-PDCCH is a localized E-PDCCH, the eREGs of the eCCE are located in one PRB pair; if the E-PDCCH is a distributed E-PDCCH, the eCCE is formed by eREGs located in more than one PRB pair, as shown in FIG. 2(*a*) and FIG. 2(*b*). FIG. 2(*a*) is a schematic diagram of eCCEs of a localized E-PDCCH, and FIG. 2(*b*) is a schematic diagram of eCCEs of a distributed E-PDCCH. In FIG. 2(*a*), the shadow shows eREGs corresponding to one eCCE of the localized E-PDCCH; and in FIG. 2(*b*), the shadow shows eREGs corresponding to one eCCE of the distributed E-PDCCH.

Referring to FIG. 2(*a*), for the localized E-PDCCH, in a PRB pair, each localized eCCE is formed by a column of eREGs in FIG. 2(*a*). For example, eCCE0 is formed by 4 eREGs numbered eREG0, eREG1, eREG2, and eREG3 in PRB pair 3. Referring to FIG. 2(*b*), for the distributed E-PDCCH, a distributed E-PDCCH at aggregation level 1 occupies one eCCE, and the eREGs corresponding to the eCCE include eREGs in different PRB pairs, for example, the eCCE may be formed by eREGs having the same number in different PRB pairs. In FIG. 2(*b*), eREG0 of PRB pairs numbered 3, 4, 8, and 9 corresponds to an eCCE of a distributed E-PDCCH.

Figure 3:
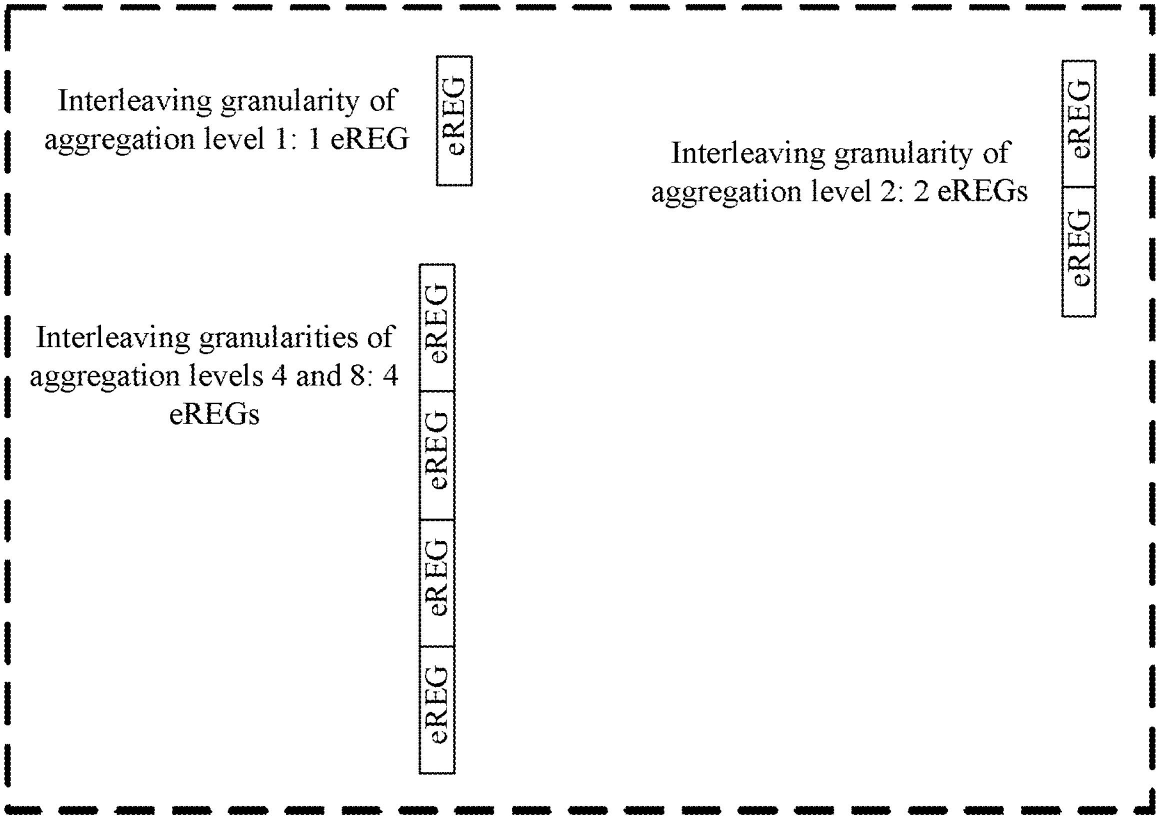
FIG. 3 is a schematic diagram of an embodiment of interleaving granularities of different aggregation levels according to the present invention.

For the E-PDCCH, both the localized and distributed E-PDCCHs define eCCEs and eREGs. One eCCE of the localized E-PDCCH and one eCCE of the distributed E-PDCCH correspond to the same number of eREGs. For the distributed E-PDCCH, mapping granularities or interleaving granularities of different aggregation levels are different, as shown in FIG. 3. FIG. 3 is a schematic diagram of an embodiment of interleaving granularities of different aggregation levels according to the present invention. In FIG. 3, interleaving granularity $G_1$ of aggregation level 1 is 1 eREG interleaving granularity $G_2$ of aggregation level 2 is 2 eREGs, and interleaving granularities $G_4$ and $G_8$ of aggregation levels 4 and 8 are 4 eREGs. In the embodiment of the present invention, for the distributed E-PDCCH, an interleaving unit is defined as an eREG group; for an E-PDCCH at the aggregation level L, an eREG group includes $G_L$ eREGs. In the embodiment of the present invention, for the aggregation level L, the size of an eREG group may be predefined, or may also be notified by the base station to a UE through control signaling.

When $G_L$ is less than or equal to the number of eREGs corresponding to an eCCE, the $G_L$ eREGs are located in one eCCE in the m PRB pairs. When $G_L$ is greater than the number of eREGs corresponding to an eCCE, $G_L$ eREGs are located in $\lceil G_L/q \rceil$ localized eCCEs in the m PRB pairs, where q indicates the number of eREGs included in one eCCE, for example, 4, and $\lceil G_L/q \rceil$ indicates roundup of $G_L/q$.

In the embodiment of the present invention, for different aggregation levels, the numbers of eREGs included in eREG groups corresponding to at least two aggregation levels are different.

In the embodiment of the present invention, the E-PDCCH at the aggregation level L needs to be mapped to $H_L$ eREGs. The $H_L$ eREGs belong to $N_L$ eREG groups, where $N_L=H_L/G_L$, $G_L\geq 1$, $H_L\geq 1$, and $G_L$, $H_L$, and $N_L$ are integers.

Figure 4:
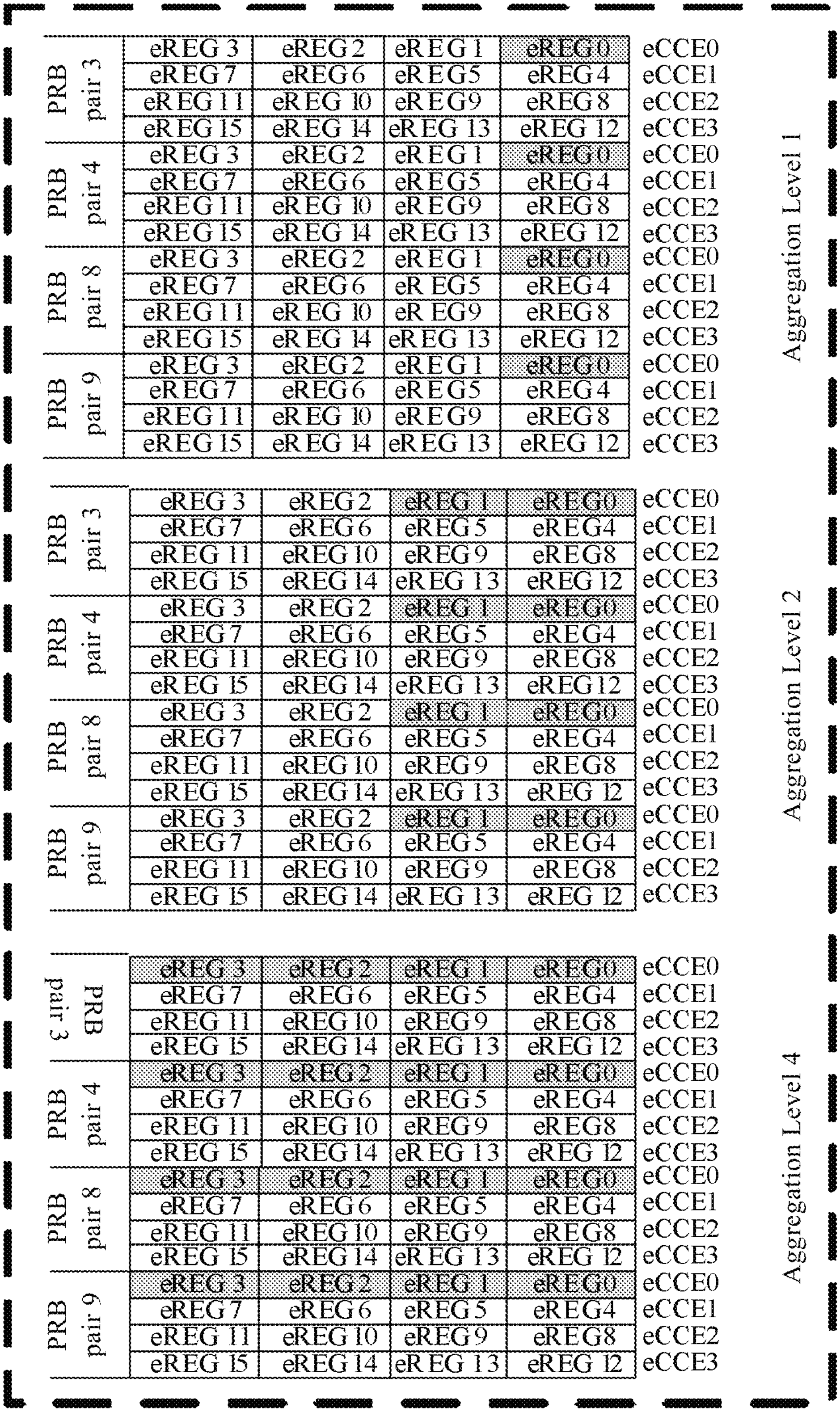
FIG. 4 is a schematic diagram of an embodiment of eREGs to which distributed E-PDCCHs are mapped according to the present invention.

FIG. 4 is a schematic diagram of an embodiment of eREGs to which distributed E-PDCCHs are mapped according to the present invention. In FIG. 4, physical resources of one eCCE of a distributed E-PDCCH at aggregation level 1 include physical resources corresponding to 4 eREGs in 4 PRB pairs; one control channel of a distributed E-PDCCH at aggregation level 2 is formed by 8 eREGs in 4 PRB pairs, but every two eREGs belong to physical resources corresponding to one localized eCCE. In addition, a binding relationship between the eREGs and demodulation reference signal (Demodulation Reference Signal, DMRS for short below) pilots may reuse the relationship between eCCEs and DMRS pilots in the localized E-PDCCH. Specifically, if an eREG is located on physical resources of an eCCE of the localized E-PDCCH, a pilot port of the eREG is the same as a pilot port corresponding to the eCCE of the localized E-PDCCH. For example, in PRB pair 3 in FIG. 4, a distributed E-PDCCH at aggregation level 1 occupies eREG0, which belongs to eCCE0 of the localized E-PDCCH; in this case, eREG0 uses DMRS port 7.

Step 2: The base station determines an aggregation level L of the E-PDCCH to be transmitted, and determines, according to the aggregation level L, the number M of control channel candidates, where $M\geq 1$, $L\geq 1$, and M and L are integers.

Step 3: The base station maps the M control channel candidates to physical resources of the m PRB pairs.

Using an E-PDCCH at the aggregation level 2 in FIG. 4 as an example, an eREG group is defined to include 2 eREGs, and therefore, a distributed E-PDCCH at the aggregation level 2 includes 8 eREGs and 4 eREG groups. At the aggregation level L, there are M control channel candidates of the E-PDCCH. Because one control channel candidate needs to be mapped to $H_L$ eREGs, the base station may map the M control channel candidates to $M\times H_L$ eREGs in $$\sum_{i=0}^{m-1} k_i$$

Specifically, virtual resource elements may be set first, where each of the virtual resource elements corresponds to one eREG on a physical resource. A virtual resource element set includes $$\sum_{i=0}^{m-1} k_i$$

virtual resource elements, and the M control channel candidates correspond to $M\times H_L$ virtual resource elements. Then the M control channel candidates are mapped to $M\times H_L$ virtual resource elements in the virtual resource element set. Finally, the $M\times H_L$ virtual resource elements are mapped to the $M\times H_L$ eREGs in the $$\sum_{i=0}^{m-1} k_i$$

eREGs.

Figure 5:
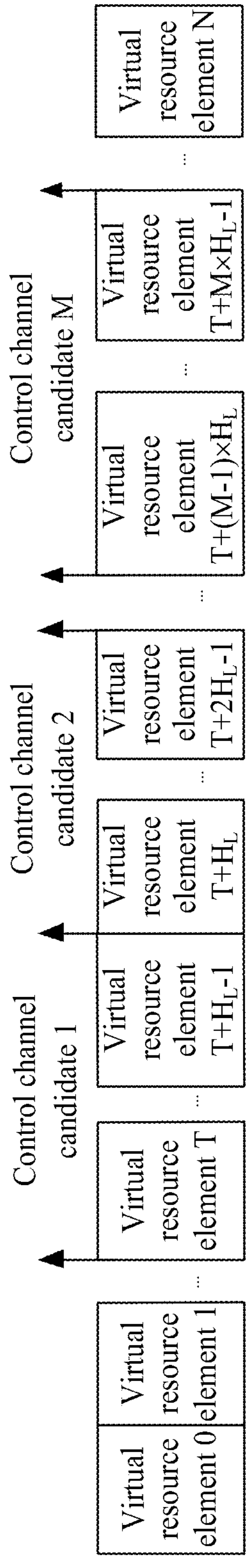
FIG. 5 is a schematic diagram of an embodiment of virtual resource elements to which control channel candidates are mapped according to the present invention.

Specifically, the mapping the M control channel candidates to $M\times H_L$ virtual resource elements in the virtual resource element set may be: mapping, according to a pre-obtained start position, the M control channel candidates to $M\times H_L$ consecutive virtual resource elements consecutively, as shown in FIG. 5. FIG. 5 is a schematic diagram of an embodiment of virtual resource elements to which control channel candidates are mapped according to the present invention. In FIG. 5, assuming that the preset start position is a virtual resource element numbered T, control channel candidate 1 is mapped to a virtual resource element numbered T to a virtual resource element numbered $T+H_L-1$, and control channel candidate 2 is mapped to a virtual resource element numbered $T+H_L$ to a virtual resource element numbered $T+2\times H_L-1$. By analogy, control channel candidate M is mapped to a virtual resource element numbered $T+(M-1)\,H_L$ to a virtual resource element numbered $T+M\times H_L-1$.

Specifically, the mapping the $M\times H_L$ virtual resource elements to the $M\times H_L$ eREGs in the $$\sum_{i=0}^{m-1} k_i$$

eREGs may be: first, interleaving the $$\sum_{i=0}^{m-1} k_i$$

virtual resource elements included in the virtual resource element set through an interleaver, where the number of elements in an interleaving matrix of the interleaver is Q; then, mapping the interleaved virtual resource element set to $$\sum_{i=0}^{m-1} k_i$$

eREGs included in the m PRB pairs; finally, obtaining, according to mapped positions of the $M\times H_L$ virtual resource elements in the virtual resource element set, mapped positions of the $M\times H_L$ virtual resource elements in the interleaved virtual resource element set; and mapping, according to the mapped positions of the $M\times H_L$ virtual resource elements in the interleaved virtual resource element set and mapped positions of the interleaved virtual resource element set in the $$\sum_{i=0}^{m-1} k_i$$

eREGs, the $M\times H_L$ virtual resource elements to the $M\times H_L$ eREGs in the $$\sum_{i=0}^{m-1} k_i$$

Specifically, the interleaving the $$\sum_{i=0}^{m-1} k_i$$

virtual resource elements included in the virtual resource element set through an interleaver may be: first, dividing the virtual resource element set into $R_L$ virtual resource element groups, where the number of virtual resource elements included in each virtual resource element group is $G_L$, where $$R_L = \left\lfloor \frac{\sum_{i=0}^{m-1} k_i}{G_L} \right\rfloor,$$

and $Q \le R_L$, where $$\left\lfloor \frac{\sum_{i=0}^{m-1} k_i}{G_L} \right\rfloor$$

indicates rounddown of $$\frac{\sum_{i=0}^{m-1} k_i}{G_L};$$

then, sequentially writing the $R_L$ virtual resource element groups into the interleaving matrix according to rows, where each virtual resource element group corresponds to one element of the interleaving matrix, and sequentially reading the $R_L$ virtual resource element groups from the interleaving matrix according to columns; or sequentially writing the $R_L$ virtual resource element groups into the interleaving matrix according to columns, where each virtual resource element group corresponds to one element of the interleaving matrix, and sequentially reading the $R_L$ virtual resource element groups from the interleaving matrix according to rows; where the sequentially read $R_L$ virtual resource element groups form the interleaved virtual resource element set.

In an implementation manner of this embodiment, the number of columns in the interleaving matrix is m; and/or the number of rows in the interleaving matrix is $$\left\lceil \frac{\sum_{i=0}^{m-1} k_i}{m \times G_L} \right\rceil, \text{ where } \left\lceil \frac{\sum_{i=0}^{m-1} k_i}{m \times G_L} \right\rceil$$

indicates roundup of $$\frac{\sum_{i=0}^{m-1} k_i}{m \times G_L};$$

and when the number of second eREGs included in each PRB pair in the m PRB pairs is equal and is p, the number of rows in the interleaving matrix is $$\left\lceil \frac{p}{G_L} \right\rceil.$$

In another implementation manner of this embodiment, the number of rows in the interleaving matrix is m; and/or the number of columns in the interleaving matrix is $$\left\lceil \frac{\sum_{i=0}^{m-1} k_i}{m \times G_L} \right\rceil, \text{ where } \left\lceil \frac{\sum_{i=0}^{m-1} k_i}{m \times G_L} \right\rceil$$

indicates roundup of $$\frac{\sum_{i=0}^{m-1} k_i}{m \times G_L};$$

and when the number of eREGs included in each PRB pair in the m PRB pairs is equal and is p, the number of columns in the interleaving matrix is $$\left\lceil \frac{p}{G_L} \right\rceil.$$

The following uses an example to describe the interleaving the $$\sum_{i=0}^{m-1} k_i$$

virtual resource elements included in the virtual resource element set through an interleaver.

It is assumed that the number of elements in the interleaving matrix of the interleaver is Q, where $$Q = R_L = \left\lfloor \frac{\sum_{i=0}^{m-1} k_i}{G_L} \right\rfloor,$$

and it is assumed that the number of columns in the interleaving matrix is the number m of PRB pairs, and that the number of rows is $$\left\lceil \frac{\sum_{i=0}^{m-1} k_i}{m \times G_L} \right\rceil.$$

Using aggregation level 2 as an example, because one virtual resource element corresponds to one eREG on a physical resource, as can be seen from FIG. 4, the number of virtual resource elements included in each virtual resource element group is 2, and the number of PRB pairs is 4. The 4 PRB pairs include 32 virtual resource element groups in total, that is, Q=32, the number of columns of the interleaving matrix is 4, and the number of rows is 8.

Then, the 32 virtual resource element groups are sequentially written into the interleaving matrix according to rows, as shown in Table 1.

TABLE 1

| | | | |
|---|---|---|---|
| Virtual resource element group 0 | Virtual resource element group 1 | Virtual resource element group 2 | Virtual resource element group 3 |
| Virtual resource element group 4 | Virtual resource element group 5 | Virtual resource element group 6 | Virtual resource element group 7 |
| Virtual resource element group 8 | Virtual resource element group 9 | Virtual resource element group 10 | Virtual resource element group 11 |
| Virtual resource element group 12 | Virtual resource element group 13 | Virtual resource element group 14 | Virtual resource element group 15 |
| Virtual resource element group 16 | Virtual resource element group 17 | Virtual resource element group 18 | Virtual resource element group 19 |
| Virtual resource element group 20 | Virtual resource element group 21 | Virtual resource element group 22 | Virtual resource element group 23 |
| Virtual resource element group 24 | Virtual resource element group 25 | Virtual resource element group 26 | Virtual resource element group 27 |
| Virtual resource element group 28 | Virtual resource element group 29 | Virtual resource element group 30 | Virtual resource element group 31 |

The 32 virtual resource element groups are sequentially read from the interleaving matrix according to columns, and the sequentially read 32 virtual resource element groups are: virtual resource element group 0, virtual resource element group 4, virtual resource element group 8, virtual resource element group 12, virtual resource element group 16, virtual resource element group 20, virtual resource element group 24, virtual resource element group 28, virtual resource element group 1, virtual resource element group 5, virtual resource element group 9, virtual resource element group 13, virtual resource element group 17, virtual resource element group 21, virtual resource element group 25, virtual resource element group 29, virtual resource element group 2, virtual resource element group 6, virtual resource element group 10, virtual resource element group 14, virtual resource element group 18, virtual resource element group 22, virtual resource element group 26, virtual resource element group 30, virtual resource element group 3, virtual resource element group 7, virtual resource element group 11, virtual resource element group 15, virtual resource element group 19, virtual resource element group 23, virtual resource element group 27, and virtual resource element group 31. The sequentially read 32 virtual resource element groups form the interleaved virtual resource element set.

Specifically, the mapping the interleaved virtual resource element set to $$\sum_{i=0}^{m-1} k_i$$

eREGs included in the m PRB pairs may be: sequentially mapping, according to sequence numbers of resource block pairs, the interleaved virtual resource element set to the m PRB pairs; and in a mapping to eREGs included in one PRB pair, mapping virtual resource element groups in the interleaved virtual resource element set to eREG groups according to a predefined sequence (for example, in ascending or descending order of numbers of virtual resource element groups), where each virtual resource element group in the interleaved virtual resource element set is mapped to one eREG group.

The sequence numbers of the RB pairs are sequence numbers of PRB pairs or sequence numbers of virtual resource block (Virtual RB, VRB for short below) pairs; and when the sequence numbers of the RB pairs are sequence numbers of VRB pairs, a mapping relationship exists between the sequence numbers of the VRB pairs and the sequence numbers of the PRB pairs.

Still using the 32 virtual resource element groups sequentially read from Table 1 as an example, in a mapping to eREGs included in one PRB pair, a mapping from the virtual resource element groups to the eREG groups is obtained according to a mapping principle of an ascending order of numbers of virtual resource element groups, as shown in FIG. 6. FIG. 6 is a schematic diagram of an embodiment of eREG groups to which virtual resource element groups are mapped according to the present invention.

Figure 8:
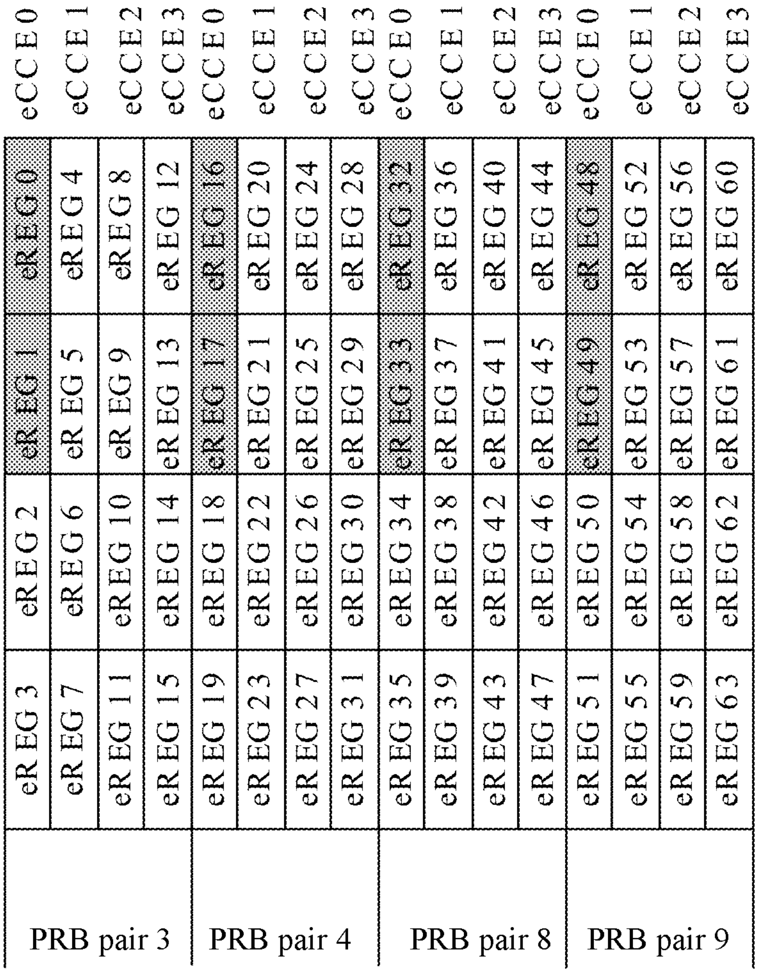
FIG. 8 is a schematic diagram of an embodiment of eREGs to which a distributed E-PDCCH is mapped according to the present invention.

A distributed E-PDCCH at aggregation level 2 has 6 control channel candidates. For a UE, assuming that a start position of a search space is an eREG group numbered 0, 6 control channel candidates occupy eREG groups 0-3, eREG groups 4-7, eREG groups 8-11, eREG groups 12-15, eREG groups 16-19, and eREG groups 20-23 respectively. Assuming that the UE transmits a distributed E-PDCCH to the base station on control channel candidate 1, a schematic diagram of mapping the distributed E-PDCCH to eREG groups is shown in FIG. 7, and a schematic diagram of mapping the distributed E-PDCCH to eREGs is shown in FIG. 8. FIG. 7 is a schematic diagram of an embodiment of eREG groups to which a distributed E-PDCCH is mapped according to the present invention. FIG. 8 is a schematic diagram of an embodiment of eREGs to which a distributed E-PDCCH is mapped according to the present invention.

In 4 PRB pairs, according to a criterion of first performing numbering in a PRB pair and then performing sequential numbering in different PRB pairs, the numbers of eREGs in the 4 PRB pairs are shown in FIG. 8. Therefore, according to FIG. 7 and FIG. 8, it is known that the distributed E-PDCCH at aggregation level 2 is transmitted in eREG groups 0, 1, 2, and 3. Numbers of the eREGs to which the distributed E-PDCCH is mapped are: 0, 1; 16, 17; 32, 33; and 48, 49. The numbers correspond to eREG0 and eREG1 of the first PRB pair (PRB pair 3), eREG0 and eREG1 of the second PRB pair (PRB pair 4), eREG0 and eREG1 of the third PRB pair (PRB pair 8), and eREG0 and eREG1 of the fourth PRB pair (PRB pair 9) respectively.

In addition, if the number of an eREG group occupied by a control channel candidate of the distributed E-PDCCH exceeds the maximum number of the eREG group included in the m PRB pairs, the previous numbers are cycled. Using a distributed E-PDCCH at aggregation level 2 as an example, for a UE, assuming that the start position of an eREG group occupied by a control channel candidate is eREG group 28, the first control channel candidate occupies eREG groups 28-31, the second control channel candidate occupies eREG groups 0-3, and so on.

Step 4: The base station places, on physical resources to which a control channel candidate is mapped, control information of the E-PDCCH to be transmitted, and transmits the control information, where the control channel candidate is any one of the M control channel candidates.

In another embodiment of the present invention, all eREGs included in the eREG group are in a PRB pair; or all eREGs included in all eREG groups are on physical resources of a part of eCCEs in m PRB pairs; or in a PRB pair, all eREGs included in an eREG group are on physical resources of a part of eCCEs in a PRB pair. Specifically, all eREG groups in a PRB pair may be formed by physical resources corresponding to a part of antenna ports in a PRB pair.

Figure 9:
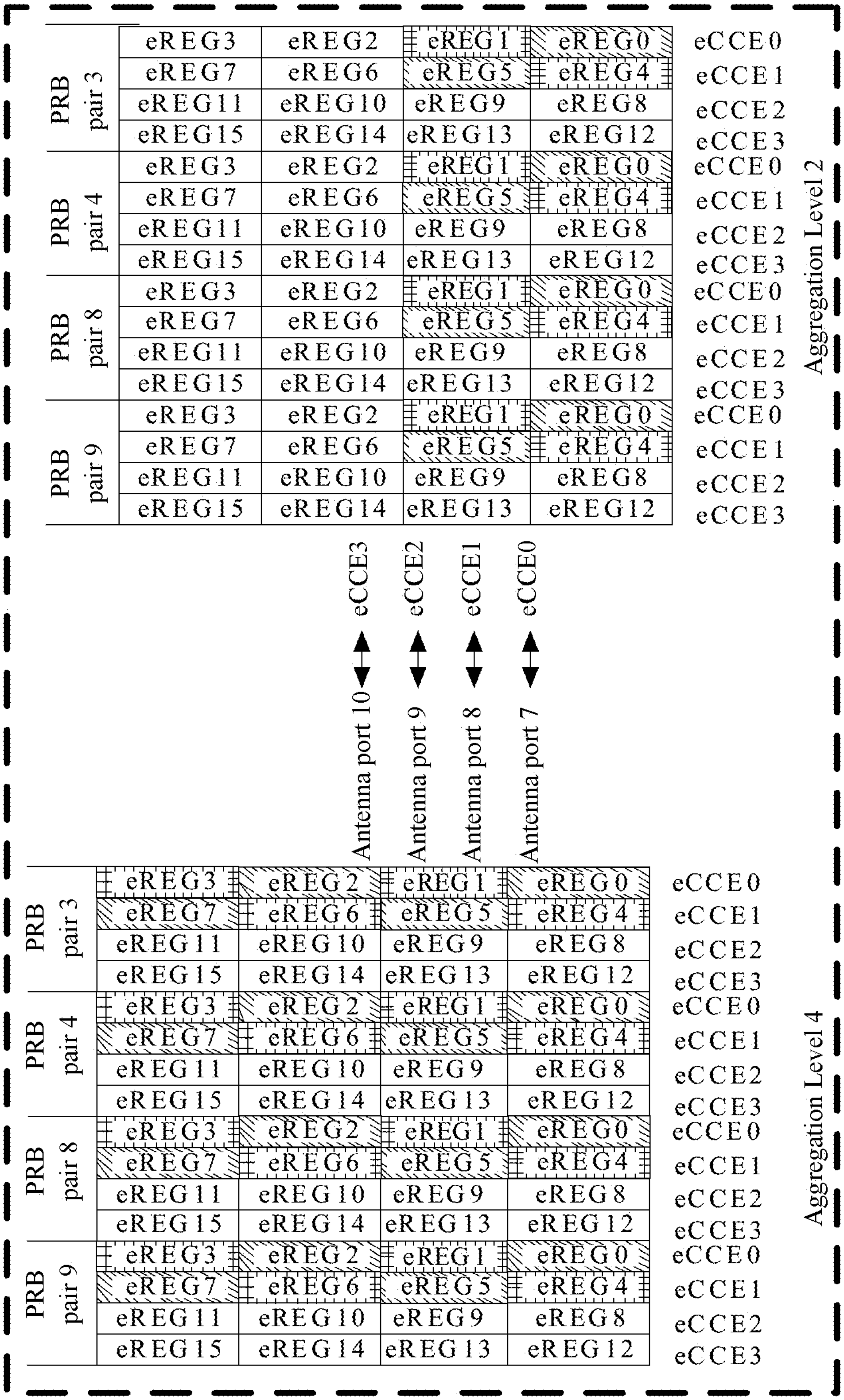
FIG. 9 is a schematic diagram of another embodiment of eREGs to which a distributed E-PDCCH is mapped according to the present invention.

That is, the distributed E-PDCCH to be transmitted is only mapped to physical resources of a part of localized eCCEs in a PRB pair. FIG. 9 is a schematic diagram of another embodiment of eREGs to which a distributed E-PDCCH is mapped according to the present invention. In FIG. 9, in a PRB pair, a distributed E-PDCCH is mapped to only physical resources corresponding to one or two antenna ports, where the mapping relationship between the antenna port and the physical resource is a mapping relationship between the antenna port and the physical resource in a localized E-PDCCH. In FIG. 9, for an E-PDCCH at aggregation level 2, in PRB pair 3, two eREGs of an eREG group are located on physical resources of two eCCEs respectively. By using different DMRS ports, a space diversity gain may be obtained, and fewest eCCEs may be occupied.

It may be known that the combination of eCCEs shown in FIG. 9 is used only for ease of description. The combination of eCCEs occupied by different eREGs belonging to an E-PDCCH in same PRB pairs may be any combination of available eCCEs. In addition, the distributed E-PDCCH is mapped to only a part of localized eCCEs. For example, in a PRB pair, only eCCEs numbered 0 and 1 may be occupied by the distributed E-PDCCH. In a PRB pair, the number of the eCCE that may be occupied by the distributed E-PDCCH may be notified by the base station to the UE, or may also be predefined by the two parties. In FIG. 9, the diagonal shadow and box shadow respectively indicate physical resources corresponding to the eREGs occupied by a distributed E-PDCCH.

Figure 10:
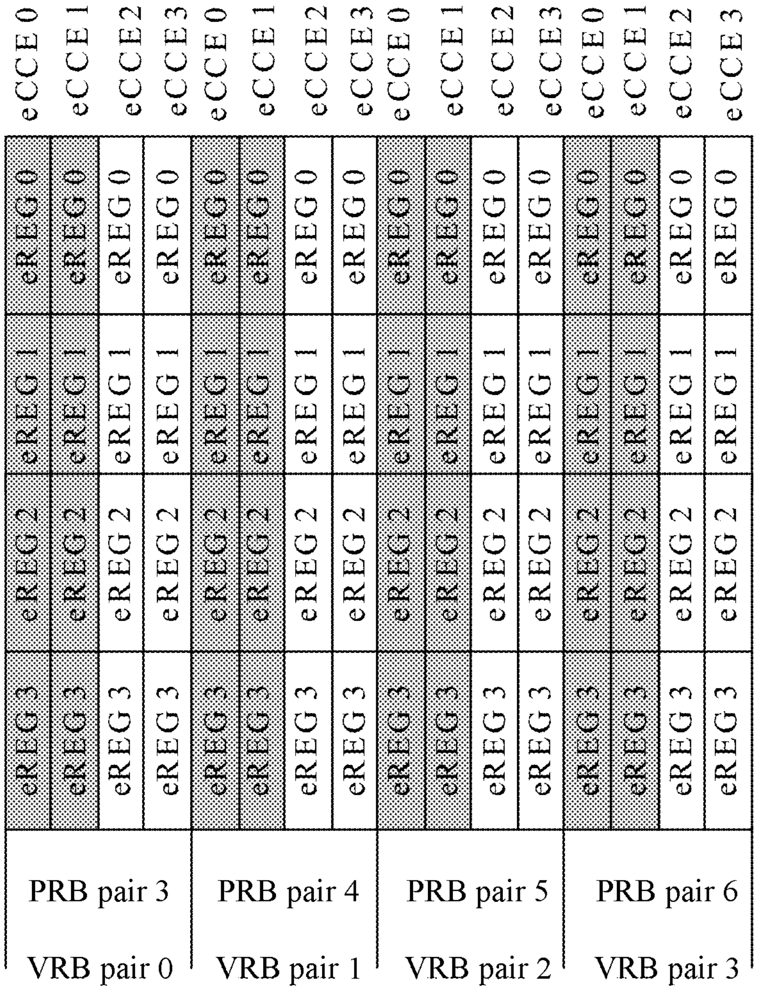
FIG. 10 is a schematic diagram of an embodiment of eREGs that may be occupied by a distributed E-PDCCH according to the present invention.

The following describes the search space in this embodiment by using an example. It is assumed that in a PRB pair, only eREGs included in the localized eCCEs numbered 0 and 1 may be occupied by the distributed E-PDCCH (where the eCCE numbered 0 corresponds to antenna port 7, and the eCCE numbered 1 corresponds to antenna port 8). A localized eCCE corresponds to 4 eREGs. In a PRB pair, eCCEs in a localized E-PDCCH at an aggregation level L are numbered. In an eCCE, eREG groups are numbered, herein assuming that an eREG group includes 1 eREG FIG. 10 is a schematic diagram of an embodiment of eREGs that may be occupied by a distributed E-PDCCH according to the present invention. In FIG. 10, the base station configures a=4 PRB pairs for the UE to transmit a distributed E-PDCCH. The 4 PRB pairs respectively correspond to VRB pairs 0-3. In a PRB pair, there are b=4 eCCEs, but only two may be used to transmit the distributed E-PDCCH, and the two eCCEs are numbered 0 and 1 respectively. An eCCE corresponds to c=4 eREGs, and the 4 eREGs are numbered 0-3 respectively, and eREGs 0-3 belong to eREG groups 0-3 respectively. In addition, physical resource elements occupied by different eCCEs in a PRB pair are predefined; and physical resource elements occupied by different eREGs and different eREG groups in an eCCE in a PRB pair are predefined. When an eREG group includes 1 eREG, numbers of eREG groups in an eCCE are 0-3, and when an eREG group includes 2 eREGs, numbers of eREG groups in an eCCE are 0-1, and so on. FIG. 10 uses an example where an eREG group includes 1 eREG and numbers of eREG groups in an eCCE are 0-3. The shadow part in FIG. 10 indicates eREGs that the distributed E-PDCCH is allowed to use.

It is assumed that in m PRB pairs that are configured by the base station and are used for transmitting the distributed E-PDCCH, for the aggregation level L, an index of an eREG group may be expressed as (i, j, k), where, i indicates sequence numbers of RB pairs (for example, PRB pairs or VRB pairs), and the sequence numbers of the VRB pairs are used in this example; j indicates sequence numbers of eCCEs in an RB pair (for example, an PRB pair or a VRB pair); and k indicates a sequence number of an eREG group in an eCCE of an RB pair (for example, a PRB pair or a VRB pair).

Figure 11:
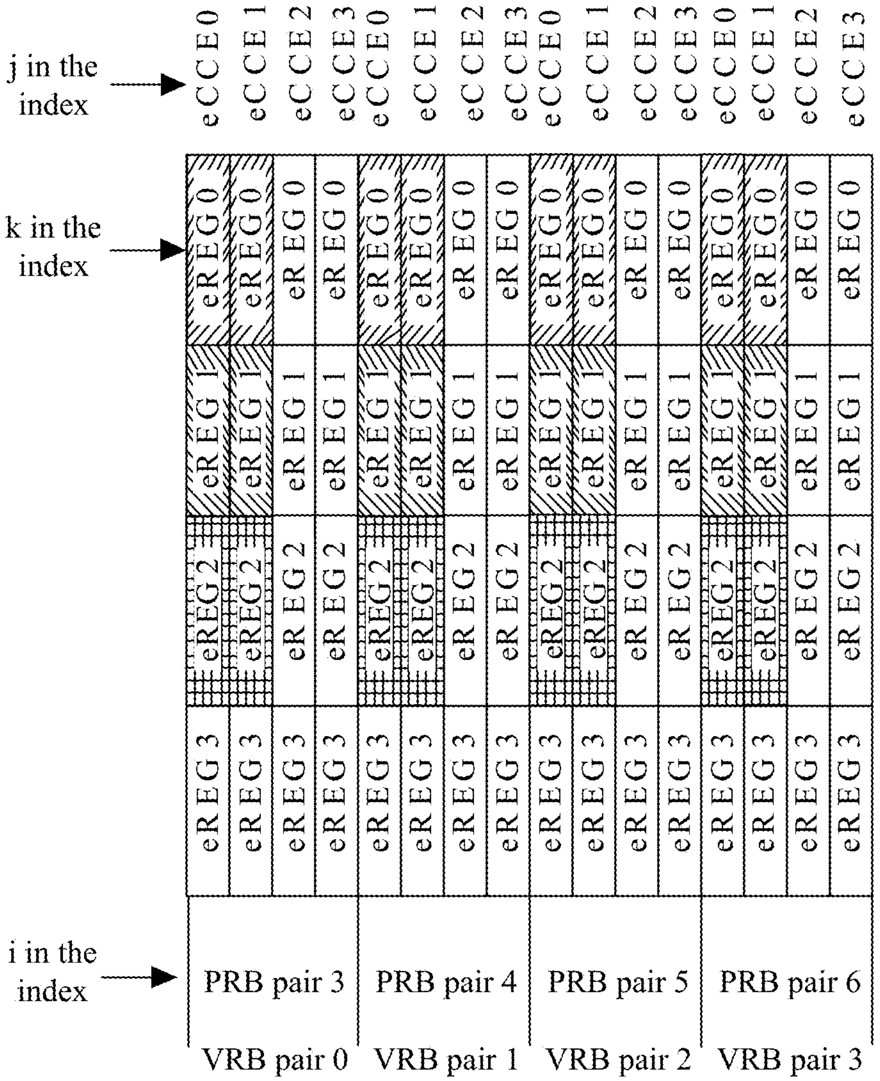
FIG. 11 is a schematic diagram of another embodiment of eREGs to which a distributed E-PDCCH is mapped according to the present invention.

The mapping rule of M control channel candidates at the aggregation level L is: starting from a preset start position, mapping the M control channel candidates according to the sequence of first j, then i, and finally k. For example, for aggregation level 2, an eREG group includes 1 eREG Because an E-PDCCH at aggregation level 2 occupies 8 REGs, an E-PDCCH at aggregation level 2 occupies 8 eREG groups. In this case, an index of the eREG group is also an index of the eREG It is assumed that there are M=3 control channel candidates at aggregation level 2, and that the start position is (i=0, j=0, k=0). Therefore, an index of the first eREG group or eREG in 8 eREG groups or eREGs of the first control channel candidate is (0, 0, 0); according to the sequence of first j, then i, and finally k, an index of the second eREG group or eREG is (0, 1, 0); an index of the third eREG group or eREG is (1, 0, 0); by analogy, an index of the eighth eREG group or eREG is (3, 1, 0). After the index of the eighth eREG group or eREG of the first control channel candidate is obtained, the second control channel candidate is mapped according to the sequence of first j, then i, and finally k, and the index (0, 0, 1) of the first eREG group or eREG of the second control channel candidate is obtained, and so on, as shown in FIG. 11. FIG. 11 is a schematic diagram of another embodiment of eREGs to which a distributed E-PDCCH is mapped according to the present invention. In FIG. 11, indicates eREGs to which the first control channel candidate is mapped; indicates eREGs to which the second control channel candidate is mapped; and indicates eREGs to which the third control channel candidate is mapped.

Figure 12:
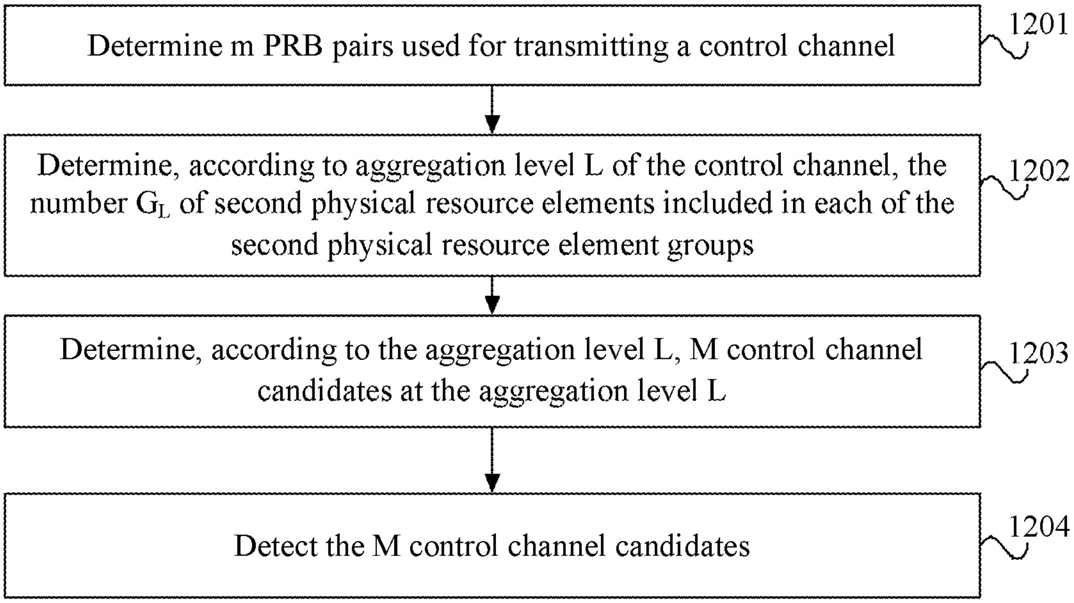
FIG. 12 is a flowchart of an embodiment of a method for receiving a control channel according to the present invention.

FIG. 12 is a flowchart of an embodiment of a method for receiving a control channel according to the present invention. As shown in FIG. 12, the method for receiving a control channel may include:

Step 1201: Determine m PRB pairs used for transmitting a control channel.

An $i^{th}$ PRB pair includes $n_i$ first physical resource elements, the $i^{th}$ physical resource block pair includes $k_i$ second physical resource elements, and the second physical resource elements included in the m PRB pairs form multiple second physical resource element groups, where the first physical resource elements are used for transmitting the control channel to be transmitted by using a localized transmission mode, and the second physical resource elements are used for transmitting the control channel to be transmitted by using a distributed transmission mode, where $m \geq 1$, $n_i \geq 1$, $k_i \geq 1$, $0 \leq i \leq m-1$, and m, i, $n_i$, and $k_i$ are all integers.

One of the first physical resource elements includes at least two second physical resource elements, that is, physical resources of the first physical resource element include physical resources of at least two second physical resource elements.

The control channel may be an E-PDCCH or a PDCCH, which is not limited by this embodiment.

Step 1202: Determine, according to an aggregation level L of the control channel, the number $G_L$ of second physical resource elements included in each of the second physical resource element groups, where the $G_L$ second physical resource elements included in each of the second physical resource element groups are located in $\lceil G_L/q \rceil$ first physical resource elements in the m PRB pairs, where q indicates the number of second physical resource elements included in one first physical resource element, $\lceil G_L/q \rceil$ indicates roundup of $G_L/q$, $G_L \geq 1$, $L \geq 1$, and $G_L$ and L are both integers.

Step 1203: Determine, according to the aggregation level L, M control channel candidates at the aggregation level L.

Each control channel candidate corresponds to $N_L$ second physical resource elements, where $M \geq 1$, $N_L \geq 1$, and M and $N_L$ are both integers.

Step 1204: Detect the M control channel candidates.

In this embodiment, when $G_L$ is less than or equal to the number of second physical resource elements included in one first physical resource element, the $G_L$ second physical resource elements are located in one first physical resource element in the m PRB pairs.

Specifically, in step 1202, the determining, according to an aggregation level L of the control channel, the number $G_L$ of second physical resource elements included in each of the second physical resource element groups may be: obtaining the number $G_L$ configured by higher layer signaling and corresponding to the aggregation level L, of second physical resource elements included in each of the second physical resource element groups; or determining the $G_L$ according to a preset mapping relationship between the aggregation level L and the number $G_L$ of second physical resource elements included in each of the second physical resource element groups.

In this embodiment, for different aggregation levels, the number $G_L$ of second physical resource elements included in a second physical resource element group corresponding to at least one aggregation level is greater than or equal to 2; in this case, the number $G_L$ of second physical resource elements included in a second physical resource element group corresponding to at least one aggregation level is greater than or equal to 2, and the $G_L$ second physical resource elements included in each of the second physical resource element groups are located in $\lceil G_L/q \rceil$ first physical resource elements in the m PRB pairs, and therefore, at this aggregation level, each of the second physical resource element groups occupies fewer first physical resource elements, thereby avoiding a case where each second physical resource element in the second physical resource element group occupies one first physical resource element, so that more first physical resource elements may be used in the localized transmission mode; or for at least two aggregation levels in multiple different aggregation levels, a second physical resource element group corresponding to a higher aggregation level in the at least two aggregation levels includes more second physical resource elements; in this case, a control channel at a higher aggregation level occupies more second physical resource elements. With respect to a diversity gain, when the diversity gain is greater than 4, for example, the diversity gain changes from 4 to 8, a performance gain is not great. Furthermore, correlation also exists in a frequency domain, and only a limited diversity gain can be obtained in the frequency domain. Therefore, it is unnecessary to distribute the second physical resource elements occupied by the control channel at the higher aggregation level to a lot of PRB pairs, so long as a certain diversity gain is obtained. For example, the second physical resource elements occupied by the control channel at the higher aggregation level are distributed to 4 channel-independent PRB pairs in 4 frequency domains. Therefore, in the case where a certain frequency diversity gain is obtained at each aggregation level, some first physical resource elements are reserved for a localized E-PDCCH.

In this embodiment, all second physical resource elements included in one second physical resource element group are located in one PRB pair; or all second physical resource elements included in all the second physical resource element groups are located on physical resources of a part of first physical resource elements in the m PRB pairs; or in one PRB pair, all second physical resource elements included in one second physical resource element group are located on physical resources of a part of first physical resource elements in the one PRB pair; or in one PRB pair, all second physical resource elements included in all second physical resource element groups are located on physical resources of a part of first physical resource elements in the one PRB pair. Therefore, some first physical resource elements may be used for localized E-PDCCH transmission.

In this embodiment, in one PRB pair, all second physical resource element groups are formed by physical resources corresponding to a part of antenna ports in the one PRB pair; or in one PRB pair, all second physical resource elements included in all second physical resource element groups are located in first physical resource elements corresponding to a part of antenna ports in the one PRB pair.

Specifically, in step 1204, the detecting the M control channel candidates may be: detecting physical resources to which the M control channel candidates are mapped, and when a correct control channel is detected, parsing the correct control channel to obtain control information borne in the correct control channel, or when no correct control channel is detected, continuing to perform the step of determining the number M of control channel candidates at other aggregation levels than the aggregation level L and subsequent steps, until a correct control channel is detected or until all control channel candidates corresponding to all aggregation levels are traversed.

Specifically, the determining, according to the aggregation level L, M control channel candidates at the aggregation level L may be: determining, according to the aggregation level L, the number M of control channel candidates at the aggregation level L, where M is an integer, and $M \geq 1$; and determining a mapping from the M control channel candidates to physical resources in the m PRB pairs.

In this embodiment, specifically, the determining a mapping from the M control channel candidates to physical resources in the m PRB pairs may be: determining that the M control channel candidates are mapped to $M\times H_L$ second physical resource elements in $$\sum_{i=0}^{m-1} k_i$$

second physical resource elements, where $H_L$ indicates the number of second physical resource elements to which each of the control channel candidates at the aggregation level L needs to be mapped, $N_L\times G_L=H_L$, $H_L\geq 1$, and $N_L$ is an integer.

Specifically, the determining that the M control channel candidates are mapped to $M\times H_L$ second physical resource elements in $$\sum_{i=0}^{m-1} k_i$$

second physical resource elements may be: determining that the M control channel candidates are mapped to $M\times H_L$ virtual resource elements in a virtual resource element set, where each virtual resource element corresponds to one second physical resource element on a physical resource, and a virtual resource element set includes $$\sum_{i=0}^{m-1} k_i$$

virtual resource elements; and determining that the $M\times H_L$ virtual resource elements are mapped to the $M\times H_L$ second physical resource elements in the $$\sum_{i=0}^{m-1} k_i$$

second physical resource elements.

The determining that the M control channel candidates are mapped to $M\times H_L$ virtual resource elements in a virtual resource element set may be: determining that the M control channel candidates are mapped to $M\times H_L$ consecutive virtual resource elements starting from a pre-obtained start position.

The determining that the $M\times H_L$ virtual resource elements are mapped to the $M\times H_L$ second physical resource elements in the $$\sum_{i=0}^{m-1} k_i$$

second physical resource elements may be: interleaving the $$\sum_{i=0}^{m-1} k_i$$

virtual resource elements included in the virtual resource element set through an interleaver, where the number of elements in an interleaving matrix of the interleaver is Q; determining that the interleaved virtual resource element set is mapped to $$\sum_{i=0}^{m-1} k_i$$

second physical resource elements included in the m physical resource block pairs; then, obtaining, according to mapped positions of the $M\times H_L$ virtual resource elements in the virtual resource element set, mapped positions of the $M\times H_L$ virtual resource elements in the interleaved virtual resource element set; and finally, determining, according to the mapped positions of the $M\times H_L$ virtual resource elements in the interleaved virtual resource element set and mapped positions of the interleaved virtual resource element set in the $$\sum_{i=0}^{m-1} k_i$$

second physical resource elements, that the $M\times H_L$ virtual resource elements are mapped to the $M\times H_L$ second physical resource elements in the $$\sum_{i=0}^{m-1} k_i$$

second physical resource elements.

The interleaving the $$\sum_{i=0}^{m-1} k_i$$

virtual resource elements included in the virtual resource element set through an interleaver may be: dividing the virtual resource element set into $R_L$ virtual resource element groups, where the number of virtual resource elements included in each virtual resource element group is $G_L$, where $$R_L = \left\lfloor \frac{\sum_{i=0}^{m-1} k_i}{G_L} \right\rfloor,$$

and $Q\leq R_L$; and sequentially writing the $R_L$ virtual resource element groups into the interleaving matrix according to rows, where each virtual resource element group corresponds to one element of the interleaving matrix, and sequentially reading the $R_L$ virtual resource element groups from the interleaving matrix according to columns; or sequentially writing the $R_L$ virtual resource element groups into the interleaving matrix according to columns, where each virtual resource element group corresponds to one element of the interleaving matrix, and sequentially reading the $R_L$ virtual resource element groups from the interleaving matrix according to rows; where the sequentially read $R_L$ virtual resource element groups form the interleaved virtual resource element set.

In an implementation manner of this embodiment, the number of columns in the interleaving matrix is m; and/or the number of rows in the interleaving matrix is $$\left\lceil \frac{\sum_{i=0}^{m-1} k_i}{m \times G_L} \right\rceil, \text{ where } \left\lceil \frac{\sum_{i=0}^{m-1} k_i}{m \times G_L} \right\rceil$$

indicates roundup of $$\frac{\sum_{i=0}^{m-1} k_i}{m \times G_L};$$

and when the number of second physical resource elements included in each PRB pair in the m PRB pairs is equal and is p, the number of rows in the interleaving matrix is $$\frac{p}{G_L}.$$

In another implementation manner of this embodiment, the number of rows in the interleaving matrix is m; and/or the number of columns in the interleaving matrix is $$\left\lceil \frac{\sum_{i=0}^{m-1} k_i}{m \times G_L} \right\rceil, \text{ where } \left\lceil \frac{\sum_{i=0}^{m-1} k_i}{m \times G_L} \right\rceil$$

indicates roundup of $$\frac{\sum_{i=0}^{m-1} k_i}{m \times G_L};$$

and when the number of second physical resource elements included in each PRB pair in the m PRB pairs is equal and is p, the number of columns in the interleaving matrix is $$\left\lceil \frac{p}{G_L} \right\rceil.$$

Specifically, the determining that the interleaved virtual resource element set is mapped to $$\sum_{i=0}^{m-1} k_i$$

second physical resource elements included in the m PRB pairs may be: determining, according to sequence numbers of RB pairs, that the interleaved virtual resource element set is sequentially mapped to the m PRB pairs; and in a mapping to second physical resource elements included in one PRB pair, determining, by a UE, that virtual resource element groups in the interleaved virtual resource element set are mapped to second physical resource element groups according to a predefined sequence, where each virtual resource element group in the interleaved virtual resource element set is mapped to one second physical resource element group.

The sequence numbers of the RB pairs are sequence numbers of PRB pairs or sequence numbers of VRB pairs; and when the sequence numbers of the RB pairs are sequence numbers of VRB pairs, a mapping relationship exists between the sequence numbers of the VRB pairs and the sequence numbers of the PRB pairs.

In the foregoing embodiment, at the aggregation level L, when any control channel candidate of a distributed control channel to be transmitted is mapped to physical resources, and some eREGs of the control channel candidate are mapped to a PRB pair, these eREGs are preferably mapped to physical resources corresponding to fewest localized eCCEs in the PRB pair, thereby improving multiplexing efficiency of control channels of different modes.

Figure 13:
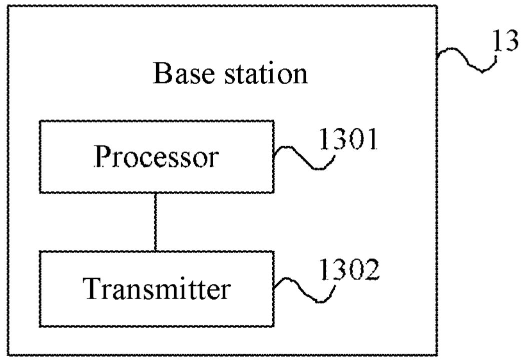
FIG. 13 is a schematic structural diagram of an embodiment of a base station according to the present invention.

FIG. 13 is a schematic structural diagram of an embodiment of a base station according to the present invention. A base station 13 in this embodiment may implement the procedure of the embodiment shown in FIG. 1 of the present invention. As shown in FIG. 13, the base station 13 may include: a processor 1301 and a transmitter 1302.

The processor 1301 is configured to: determine m PRB pairs used for transmitting a control channel to be transmitted, where an $i^{th}$ PRB pair includes $n_i$ first physical resource elements, the $i^{th}$ PRB pair includes $k_i$ second physical resource elements, and the second physical resource elements included in the m PRB pairs form multiple second physical resource element groups, where the first physical resource elements are used for transmitting the control channel to be transmitted by using a localized transmission mode, the second physical resource elements are used for transmitting the control channel to be transmitted by using a distributed transmission mode, and one of the first physical resource elements includes at least two second physical resource elements, where $m \geq 1$, $n_i \geq 1$, $k_i \geq 1$, $0 \leq i \leq m-1$, and m, i, $n_i$, and $k_i$ are all integers; when the control channel to be transmitted is transmitted by using the distributed transmission mode, determine an aggregation level L of the control channel to be transmitted, where $L \geq 1$, and L is an integer; determine, according to the aggregation level L, the number $G_L$ of second physical resource elements included in each of the second physical resource element groups, where the $G_L$ second physical resource elements included in each of the second physical resource element groups are located in $\lceil G_L/q \rceil$ first physical resource elements in the m PRB pairs, where q indicates the number of second physical resource elements included in one first physical resource element, $\lceil G_L/q \rceil$ indicates roundup of $G_L/q$, $G_L \geq 1$, and $G_L$ is an integer; and determine, according to the aggregation level L, a first control channel candidate at the aggregation level L, where the first control channel candidate corresponds to $N_L$ second physical resource element groups, where $N_L \geq 1$ and $N_L$ is an integer.

The transmitter 1302 is configured to place, on physical resources to which the first control channel candidate is mapped, control information of the control channel to be transmitted, and transmit the control information.

The control channel may be an E-PDCCH or a PDCCH, which is not limited by this embodiment.

In this embodiment, when $G_L$ is less than or equal to the number of second physical resource elements included in one first physical resource element, the $G_L$ second physical resource elements are located in one first physical resource element in the m PRB pairs.

In this embodiment, the processor 1301 being configured to determine, according to the aggregation level L, the number $G_L$ of second physical resource elements included in each of the second physical resource element groups may be: the processor 1301 being configured to determine the $G_L$ according to a preset mapping relationship between the aggregation level L and the number $G_L$ of second physical resource elements included in each of the second physical resource element groups.

Further, in this embodiment, the transmitter 1302 is further configured to transmit higher layer signaling to a receiving device, where the higher layer signaling is used for configuring the number $G_L$ corresponding to the aggregation level L, of second physical resource elements included in each of the second physical resource element groups.

In this embodiment, for different aggregation levels, the number $G_L$ of second physical resource elements included in a second physical resource element group corresponding to at least one aggregation level is greater than or equal to 2; in this case, the number $G_L$ of second physical resource elements included in a second physical resource element group corresponding to at least one aggregation level is greater than or equal to 2, and the $G_L$ second physical resource elements included in each of the second physical resource element groups are located in $\lceil G_L/q \rceil$ first physical resource elements in the m PRB pairs, and therefore, at this aggregation level, each of the second physical resource element groups occupies fewer first physical resource elements, thereby avoiding a case where each second physical resource element in the second physical resource element group occupies one first physical resource element, so that more first physical resource elements may be used in the localized transmission mode; or for at least two aggregation levels in multiple different aggregation levels, a second physical resource element group corresponding to a higher aggregation level in the at least two aggregation levels includes more second physical resource elements; in this case, a control channel at a higher aggregation level occupies more second physical resource elements. With respect to a diversity gain, when the diversity gain is greater than 4, for example, the diversity gain changes from 4 to 8, a performance gain is not great. Furthermore, correlation also exists in a frequency domain, and only a limited diversity gain can be obtained in the frequency domain. Therefore, it is unnecessary to distribute the second physical resource elements occupied by the control channel at the higher aggregation level to a lot of PRB pairs, so long as a certain diversity gain is obtained. For example, the second physical resource elements occupied by the control channel at the higher aggregation level are distributed to 4 channel-independent PRB pairs in 4 frequency domains. Therefore, in the case where a certain frequency diversity gain is obtained at each aggregation level, some first physical resource elements are reserved for a localized E-PDCCH.

In this embodiment, all second physical resource elements included in one second physical resource element group are located in one PRB pair; or all second physical resource elements included in all the second physical resource element groups are located on physical resources of a part of first physical resource elements in the m physical resource block pairs; or in one PRB pair, all second physical resource elements included in one second physical resource element group are located on physical resources of a part of first physical resource elements in the one PRB pair; or in one PRB pair, all second physical resource elements included in all second physical resource element groups are located on physical resources of a part of first physical resource elements in the one PRB pair. Therefore, some first physical resource elements may be used for localized E-PDCCH transmission.

In this embodiment, in one PRB pair, all second physical resource element groups are formed by physical resources corresponding to a part of antenna ports in the one PRB pair; or in one PRB pair, all second physical resource elements included in all second physical resource element groups are located in first physical resource elements corresponding to a part of antenna ports in the one PRB pair.

In this embodiment, the processor 1301 being configured to determine, according to the aggregation level L, a first control channel candidate at the aggregation level L may be: the processor 1301 being configured to determine, according to the aggregation level L, the number M of control channel candidates at the aggregation level L, where M is an integer, and $M \geq 1$; map the M control channel candidates to physical resources in the m PRB pairs; and select one first control channel candidate from the M control channel candidates.

In this embodiment, the processor 1301 being configured to map the M control channel candidates to physical resources in the m PRB pairs may be: the processor 1301 being configured to map the M control channel candidates to $M \times H_L$ second physical resource elements in $$\sum_{i=0}^{m-1} k_i$$

second physical resource elements, where $H_L$ indicates the number of second physical resource elements to which each of the control channel candidates at the aggregation level L needs to be mapped, $N_L \times G_L = H_L$, $H_L \geq 1$, and $N_L$ is an integer.

Specifically, the processor 1301 being configured to map the M control channel candidates to $M \times H_L$ second physical resource elements in $$\sum_{i=0}^{m-1} k_i$$

second physical resource elements may be: the processor 1301 being configured to: set virtual resource elements, where each of the virtual resource elements corresponds to one second physical resource element on a physical resource, a virtual resource element set includes $$\sum_{i=0}^{m-1} k_i$$

virtual resource elements, and the M control channel candidates correspond to $M \times H_L$ virtual resource elements; map the M control channel candidates to $M \times H_L$ virtual resource elements in the virtual resource element set; and map the $M \times H_L$ virtual resource elements to the $M \times H_L$ second physical resource elements in the $$\sum_{i=0}^{m-1} k_i$$

second physical resource elements.

The processor 1301 being configured to map the M control channel candidates to $M \times H_L$ virtual resource elements in the virtual resource element set may be: the processor 1301 being configured to map, according to a pre-obtained start position, the M control channel candidates to $M \times H_L$ consecutive virtual resource elements consecutively.

Specifically, the processor 1301 being configured to map the $M \times H_L$ virtual resource elements to the $M \times H_L$ second physical resource elements in the $$\sum_{i=0}^{m-1} k_i$$

second physical resource elements may be: the processor 1301 being configured to: interleave the $$\sum_{i=0}^{m-1} k_i$$

virtual resource elements included in the virtual resource element set through an interleaver, where the number of elements in an interleaving matrix of the interleaver is Q; map the interleaved virtual resource element set to $$\sum_{i=0}^{m-1} k_i$$

second physical resource elements included in the m PRB pairs; obtain, according to mapped positions of the $M \times H_L$ virtual resource elements in the virtual resource element set, mapped positions of the $M \times H_L$ virtual resource elements in the interleaved virtual resource element set; and map, according to mapped positions of the interleaved virtual resource element set in the $$\sum_{i=0}^{m-1} k_i$$

second physical resource elements, the $M \times H_L$ virtual resource elements to the $M \times H_L$ second physical resource elements in the $$\sum_{i=0}^{m-1} k_i$$

second physical resource elements.

Specifically, the processor 1301 being configured to interleave the $$\sum_{i=0}^{m-1} k_i$$

virtual resource elements included in the virtual resource element set through an interleaver may be: the processor 1301 being configured to: divide the virtual resource element set into $R_L$ virtual resource element groups, where the number of virtual resource elements included in each virtual resource element group is $G_L$, where $$R_L = \left\lfloor \frac{\sum_{i=0}^{m-1} k_i}{G_L} \right\rfloor,$$

and $Q \le R_L$; and sequentially write the $R_L$ virtual resource element groups into the interleaving matrix according to rows, where each virtual resource element group corresponds to one element of the interleaving matrix, and sequentially read the $R_L$ virtual resource element groups from the interleaving matrix according to columns; or sequentially write the $R_L$ virtual resource element groups into the interleaving matrix according to columns, where each virtual resource element group corresponds to one element of the interleaving matrix, and sequentially read the $R_L$ virtual resource element groups from the interleaving matrix according to rows; where the sequentially read $R_L$ virtual resource element groups form the interleaved virtual resource element set.

In an implementation manner of this embodiment, the number of columns in the interleaving matrix is m; and/or the number of rows in the interleaving matrix is $$R_L = \left\lceil \frac{\sum_{i=0}^{m-1} k_i}{m \times G_L} \right\rceil, \text{ where } \left\lceil \frac{\sum_{i=0}^{m-1} k_i}{m \times G_L} \right\rceil$$

indicates roundup of $$\frac{\sum_{i=0}^{m-1} k_i}{m \times G_L};$$

and when the number of second physical resource elements included in each PRB pair in the m PRB pairs is equal and is p, the number of rows in the interleaving matrix is $$\left\lceil \frac{p}{G_L} \right\rceil.$$

In another implementation manner of this embodiment, the number of rows in the interleaving matrix is m; and/or the number of columns in the interleaving matrix is $$\left\lceil \frac{\sum_{i=0}^{m-1} k_i}{m \times G_L} \right\rceil, \text{ where } \left\lceil \frac{\sum_{i=0}^{m-1} k_i}{m \times G_L} \right\rceil$$

indicates roundup of $$\frac{\sum_{i=0}^{m-1} k_i}{m \times G_L};$$

and when the number of second physical resource elements included in each PRB pair in the m PRB pairs is equal and is p, the number of columns in the interleaving matrix is $$\left\lceil \frac{p}{G_L} \right\rceil.$$

In this embodiment, the processor 1301 being configured to map the interleaved virtual resource element set to $$\sum_{i=0}^{m-1} k_i$$

second physical resource elements included in the m PRB pairs may be: the processor 1301 being configured to: sequentially map, according to sequence numbers of RB pairs, the interleaved virtual resource element set to the m PRB pairs; and in a mapping to second physical resource elements included in one PRB pair, map virtual resource element groups in the interleaved virtual resource element set to second physical resource element groups according to a predefined sequence, where each virtual resource element group in the interleaved virtual resource element set is mapped to one second physical resource element group. The sequence numbers of the RB pairs are sequence numbers of PRB pairs or sequence numbers of virtual resource block pairs; and when the sequence numbers of the RB pairs are sequence numbers of virtual resource block pairs, a mapping relationship exists between the sequence numbers of the virtual resource block pairs and the sequence numbers of the PRB pairs.

In the foregoing embodiment, at the aggregation level L, when any control channel candidate of a distributed control channel to be transmitted is mapped to physical resources, and some eREGs of the control channel candidate are mapped to a PRB pair, these eREGs are preferably mapped to physical resources corresponding to fewest localized eCCEs in the PRB pair, thereby improving multiplexing efficiency of control channels of different modes.

Figure 14:
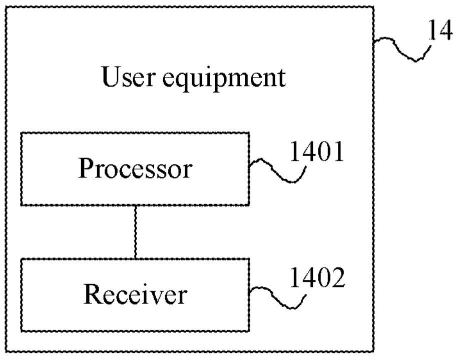
FIG. 14 is a schematic structural diagram of an embodiment of a user equipment according to the present invention.

FIG. 14 is a schematic structural diagram of an embodiment of a user equipment according to the present invention. A user equipment 14 in this embodiment may implement the procedure of the embodiment shown in FIG. 12 of the present invention. As shown in FIG. 14, the user equipment 14 may include: a processor 1401 and a receiver 1402.

The processor 1401 is configured to: determine m PRB pairs used for transmitting a control channel, where an $i^{th}$ PRB pair includes $n_i$ first physical resource elements, the $i^{th}$ PRB pair includes $k_i$ second physical resource elements, and the second physical resource elements included in the m PRB pairs form multiple second physical resource element groups, where the first physical resource elements are used for transmitting the control channel to be transmitted by using a localized transmission mode, the second physical resource elements are used for transmitting the control channel to be transmitted by using a distributed transmission mode, and one of the first physical resource elements includes at least two second physical resource elements, where $m \geq 1$, $n_i \geq 1$, $k_i \geq 1$, $0 \leq i \leq m-1$, and m, i, $n_i$, and $k_i$ are all integers; determine, according to an aggregation level L of the control channel, the number $G_L$ of second physical resource elements included in each of the second physical resource element groups, where the $G_L$ second physical resource elements included in each of the second physical resource element groups are located in $\lceil G_L/q \rceil$ first physical resource elements in the m PRB pairs, where q indicates the number of second physical resource elements included in one first physical resource element, $\lceil G_L/q \rceil$ indicates roundup of $G_L/q$, $G_L \geq 1$, $L \geq 1$, and $G_L$ and L are both integers; and determine, according to the aggregation level L, M control channel candidates at the aggregation level L, where each of the control channel candidates corresponds to $N_L$ second physical resource element groups, where $M \geq 1$, $N_L \geq 1$, and M and $N_L$ are both integers.

The receiver 1402 is configured to detect the M control channel candidates.

The control channel may be an E-PDCCH or a PDCCH, which is not limited by this embodiment.

In this embodiment, when $G_L$ is less than or equal to the number of second physical resource elements included in one first physical resource element, the $G_L$ second physical resource elements are located in one first physical resource element in the m PRB pairs.

Specifically, the processor 1401 being configured to determine, according to an aggregation level L of the control channel, the number $G_L$ of second physical resource elements included in each of the second physical resource element groups may be: the processor 1401 being configured to: obtain the number $G_L$ configured by higher layer signaling and corresponding to the aggregation level L, of second physical resource elements included in each of the second physical resource element groups; or determine the $G_L$ according to a preset mapping relationship between the aggregation level L and the number $G_L$ of second physical resource elements included in each of the second physical resource element groups.

In this embodiment, for different aggregation levels, the number $G_L$ of second physical resource elements included in a second physical resource element group corresponding to at least one aggregation level is greater than or equal to 2; in this case, the number $G_L$ of second physical resource elements included in a second physical resource element group corresponding to at least one aggregation level is greater than or equal to 2, and the $G_L$ second physical resource elements included in each of the second physical resource element groups are located in $\lceil G_L/q \rceil$ first physical resource elements in the m PRB pairs, and therefore, at this aggregation level, each of the second physical resource element groups occupies fewer first physical resource elements, thereby avoiding a case where each second physical resource element in the second physical resource element group occupies one first physical resource element, so that more first physical resource elements may be used in the localized transmission mode; or for at least two aggregation levels in multiple different aggregation levels, a second physical resource element group corresponding to a higher aggregation level in the at least two aggregation levels includes more second physical resource elements; in this case, a control channel at a higher aggregation level occupies more second physical resource elements. With respect to a diversity gain, when the diversity gain is greater than 4, for example, the diversity gain changes from 4 to 8, a performance gain is not great. Furthermore, correlation also exists in a frequency domain, and only a limited diversity gain can be obtained in the frequency domain. Therefore, it is unnecessary to distribute the second physical resource elements occupied by the control channel at the higher aggregation level to a lot of PRB pairs, so long as a certain diversity gain is obtained. For example, the second physical resource elements occupied by the control channel at the higher aggregation level are distributed to 4 channel-independent PRB pairs in 4 frequency domains. Therefore, in the case where a certain frequency diversity gain is obtained at each aggregation level, some first physical resource elements are reserved for a localized E-PDCCH.

In this embodiment, all second physical resource elements included in one second physical resource element group are located in one PRB pair; or all second physical resource elements included in all the second physical resource element groups are located on physical resources of a part of first physical resource elements in the m PRB pairs; or in one PRB pair, all second physical resource elements included in one second physical resource element group are located on physical resources of a part of first physical resource elements in the one PRB pair; or in one PRB pair, all second physical resource elements included in all second physical resource element groups are located on physical resources of a part of first physical resource elements in the one PRB pair. Therefore, some first physical resource elements may be used for localized E-PDCCH transmission.

In this embodiment, in one PRB pair, all second physical resource element groups are formed by physical resources corresponding to a part of antenna ports in the one PRB pair; or in one PRB pair, all second physical resource elements included in all second physical resource element groups are located in first physical resource elements corresponding to a part of antenna ports in the one PRB pair.

Specifically, the receiver 1402 being configured to detect the M control channel candidates may be: the receiver 1402 being configured to detect physical resources to which the M control channel candidates are mapped, and when a correct control channel is detected, parse the correct control channel to obtain control information borne in the correct control channel, or when no correct control channel is detected, continue to perform the step of determining the number M of control channel candidates at other aggregation levels than the aggregation level L and subsequent steps, until a correct control channel is detected or until all control channel candidates corresponding to all aggregation levels are traversed.

Specifically, the processor 1401 being configured to determine, according to the aggregation level L, M control channel candidates at the aggregation level L may be: the processor 1401 being configured to: determine, according to the aggregation level L, the number M of control channel candidates at the aggregation level L, where M is an integer, and M≥1; and determine a mapping from the M control channel candidates to physical resources in the m PRB pairs.

Specifically, the processor 1401 being configured to determine a mapping from the M control channel candidates to physical resources in the m PRB pairs may be: the processor 1401 being configured to determine that the M control channel candidates are mapped to $M \times H_L$ second physical resource elements in $$\sum_{i=0}^{m-1} k_i$$

second physical resource elements, where 1=0 $H_L$ indicates the number of second physical resource elements to which each of the control channel candidates at the aggregation level L needs to be mapped, $N_L \times G_L = H_L$, $H_L \geq 1$, and $N_L$ is an integer.

Specifically, the processor 1401 being configured to determine that the M control channel candidates are mapped to $M \times H_L$ second physical resource elements in $$\sum_{i=0}^{m-1} k_i$$

second physical resource elements may be: the processor 1401 being configured to: determine that the M control channel candidates are mapped to $M \times H_L$ virtual resource elements in a virtual resource element set, where each virtual resource element corresponds to one second physical resource element on a physical resource, and a virtual resource element set includes $$\sum_{i=0}^{m-1} k_i$$

virtual resource elements; and determine that the $M \times H_L$ virtual resource elements are mapped to the $M \times H_L$ second physical resource elements in the $$\sum_{i=0}^{m-1} k_i$$

second physical resource elements.

Specifically, the processor 1401 being configured to determine that the M control channel candidates are mapped to $M \times H_L$ virtual resource elements in a virtual resource element set may be: the processor 1401 being configured to determine that the M control channel candidates are mapped to $M \times H_L$ consecutive virtual resource elements starting from a pre-obtained start position.

The processor 1401 being configured to determine that the $M \times H_L$ virtual resource elements are mapped to the $M \times H_L$ second physical resource elements in the $$\sum_{i=0}^{m-1} k_i$$

second physical resource elements may be: the processor 1401 being configured to: interleave the $$\sum_{i=0}^{m-1} k_i$$

virtual resource elements included in the virtual resource element set through an interleaver, where the number of elements in an interleaving matrix of the interleaver is Q; determine that the interleaved virtual resource element set is mapped to $$\sum_{i=0}^{m-1} k_i$$

second physical resource elements included in the m physical resource block pairs; then, obtain, according to mapped positions of the $M \times H_L$ virtual resource elements in the virtual resource element set, mapped positions of the $M \times H_L$ virtual resource elements in the interleaved virtual resource element set; and finally, determine, according to the mapped positions of the $M \times H_L$ virtual resource elements in the interleaved virtual resource element set and mapped positions of the interleaved virtual resource element set in the $$\sum_{i=0}^{m-1} k_i$$

second physical resource elements, that the $M \times H_L$ virtual resource elements are mapped to the $M \times H_L$ second physical resource elements in the $$\sum_{i=0}^{m-1} k_i$$

second physical resource elements.

Specifically, the processor 1401 being configured to interleave the $$\sum_{i=0}^{m-1} k_i$$

virtual resource elements included in the virtual resource element set through an interleaver may be: the processor 1401 being configured to: divide the virtual resource element set into $R_L$ virtual resource element groups, where the number of virtual resource elements included in each virtual resource element group is $G_L$, where $$R_L = \left\lfloor \frac{\sum_{i=0}^{m-1} k_i}{G_L} \right\rfloor,$$

and $Q \le R_L$; and sequentially write the $R_L$ virtual resource element groups into the interleaving matrix according to rows, where each virtual resource element group corresponds to one element of the interleaving matrix, and sequentially read the $R_L$ virtual resource element groups from the interleaving matrix according to columns; or sequentially write the $R_L$ virtual resource element groups into the interleaving matrix according to columns, where each virtual resource element group corresponds to one element of the interleaving matrix, and sequentially read the $R_L$ virtual resource element groups from the interleaving matrix according to rows; where the sequentially read $R_L$ virtual resource element groups form the interleaved virtual resource element set.

In an implementation manner of this embodiment, the number of columns in the interleaving matrix is m; and/or the number of rows in the interleaving matrix is $$\left\lceil \frac{\sum_{i=0}^{m-1} k_i}{m \times G_L} \right\rceil, \text{ where } \left\lceil \frac{\sum_{i=0}^{m-1} k_i}{m \times G_L} \right\rceil$$

indicates roundup of $$\frac{\sum_{i=0}^{m-1} k_i}{m \times G_L};$$

and when the number of second physical resource elements included in each PRB pair in the m PRB pairs is equal and is p, the number of rows in the interleaving matrix is $$\frac{p}{G_L}.$$

In another implementation manner of this embodiment, the number of rows in the interleaving matrix is m; and/or the number of columns in the interleaving matrix is $$\left\lceil \frac{\sum_{i=0}^{m-1} k_i}{m \times G_L} \right\rceil, \text{ where } \left\lceil \frac{\sum_{i=0}^{m-1} k_i}{m \times G_L} \right\rceil$$

indicates roundup of $$\frac{\sum_{i=0}^{m-1} k_i}{m \times G_L};$$

and when the number of second physical resource elements included in each PRB pair in the m PRB pairs is equal and is p, the number of columns in the interleaving matrix is $$\left\lceil \frac{p}{G_L} \right\rceil.$$

In this embodiment, specifically, the processor 1401 being configured to determine that the interleaved virtual resource element set is mapped to $$\sum_{i=0}^{m-1} k_i$$

second physical resource elements included in the m PRB pairs may be: the processor 1401 being configured to: determine, according to sequence numbers of RB pairs, that the interleaved virtual resource element set is sequentially mapped to the m PRB pairs; and in a mapping to second physical resource elements included in one PRB pair, determine that virtual resource element groups in the interleaved virtual resource element set are mapped to second physical resource element groups according to a predefined sequence, where each virtual resource element group in the interleaved virtual resource element set is mapped to one second physical resource element group.

The sequence numbers of the RB pairs are sequence numbers of PRB pairs or sequence numbers of VRB pairs; and when the sequence numbers of the RB pairs are sequence numbers of VRB pairs, a mapping relationship exists between the sequence numbers of the VRB pairs and the sequence numbers of the PRB pairs.

In the foregoing embodiment, at the aggregation level L, when any control channel candidate of a distributed control channel to be transmitted is mapped to physical resources, and some eREGs of the control channel candidate are mapped to a PRB pair, these eREGs are preferably mapped to physical resources corresponding to fewest localized eCCEs in the PRB pair, thereby improving multiplexing efficiency of control channels of different modes.

Figure 15:
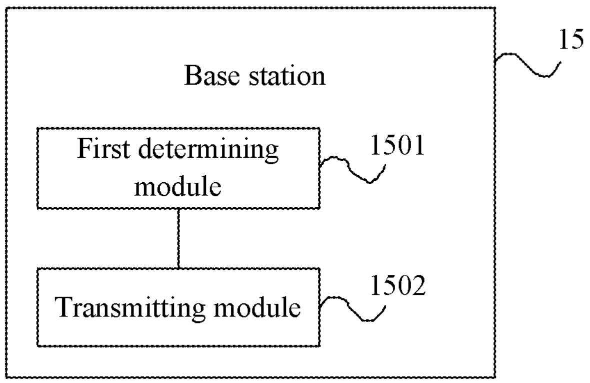
FIG. 15 is a schematic structural diagram of another embodiment of a base station according to the present invention.

FIG. 15 is a schematic structural diagram of another embodiment of a base station according to the present invention. A base station 15 in this embodiment may implement the procedure of the embodiment shown in FIG. 1 of the present invention. As shown in FIG. 15, the base station 15 may include: a first determining module 1501 and a transmitting module 1502.

The first determining module 1501 is configured to: determine m PRB pairs used for transmitting a control channel to be transmitted, where an $i^{th}$ PRB pair includes $n_i$ first physical resource elements, the $i^{th}$ PRB pair includes $k_i$ second physical resource elements, and the second physical resource elements included in the m PRB pairs form multiple second physical resource element groups, where the first physical resource elements are used for transmitting the control channel to be transmitted by using a localized transmission mode, the second physical resource elements are used for transmitting the control channel to be transmitted by using a distributed transmission mode, and one of the first physical resource elements includes at least two second physical resource elements, where $m \geq 1$, $n_i \geq 1$, $k_i \geq 1$, $0 \leq i \leq m-1$, and m, i, $n_i$, and $k_i$ are all integers; when the control channel to be transmitted is transmitted by using the distributed transmission mode, determine an aggregation level L of the control channel to be transmitted, where $L \geq 1$, and L is an integer; determine, according to the aggregation level L, the number $G_L$ of second physical resource elements included in each of the second physical resource element groups, where the $G_L$ second physical resource elements included in each of the second physical resource element groups are located in $\lceil G_L/q \rceil$ first physical resource elements in the m PRB pairs, where q indicates the number of second physical resource elements included in one first physical resource element, $\lceil G_L/q \rceil$ indicates roundup of $G_L/q$, $G_L \geq 1$, and $G_L$ is an integer; determine, according to the aggregation level L, a first control channel candidate at the aggregation level L, where the first control channel candidate corresponds to $N_L$ second physical resource element groups, where $N_L \geq 1$ and $N_L$ is an integer; and transfer, to the transmitting module 1502, physical resources to which the first control channel candidate is mapped.

The transmitting module 1502 is configured to: receive, from the first determining module 1501, the physical resources to which the first control channel candidate is mapped; and place, on the physical resources to which the first control channel candidate is mapped, control information of the control channel to be transmitted, and transmit the control information.

The control channel may be an E-PDCCH or a PDCCH, which is not limited by this embodiment.

In this embodiment, when $G_L$ is less than or equal to the number of second physical resource elements included in one first physical resource element, the $G_L$ second physical resource elements are located in one first physical resource element in the m PRB pairs.

In this embodiment, the first determining module 1501 being configured to determine, according to the aggregation level L, the number $G_L$ of second physical resource elements included in each of the second physical resource element groups may be: the first determining module 1501 being configured to determine the $G_L$ according to a preset mapping relationship between the aggregation level L and the number $G_L$ of second physical resource elements included in each of the second physical resource element groups.

Further, in this embodiment, the transmitting module 1502 is further configured to transmit higher layer signaling to a receiving device, where the higher layer signaling is used for configuring the number $G_L$ corresponding to the aggregation level L, of second physical resource elements included in each of the second physical resource element groups.

In this embodiment, for different aggregation levels, the number $G_L$ of second physical resource elements included in a second physical resource element group corresponding to at least one aggregation level is greater than or equal to 2; in this case, the number $G_L$ of second physical resource elements included in a second physical resource element group corresponding to at least one aggregation level is greater than or equal to 2, and the $G_L$ second physical resource elements included in each of the second physical resource element groups are located in $\lceil G_L/q \rceil$ first physical resource elements in the m PRB pairs, and therefore, at this aggregation level, each of the second physical resource element groups occupies fewer first physical resource elements, thereby avoiding a case where each second physical resource element in the second physical resource element group occupies one first physical resource element, so that more first physical resource elements may be used in the localized transmission mode; or for at least two aggregation levels in multiple different aggregation levels, a second physical resource element group corresponding to a higher aggregation level in the at least two aggregation levels includes more second physical resource elements; in this case, a control channel at a higher aggregation level occupies more second physical resource elements. With respect to a diversity gain, when the diversity gain is greater than 4, for example, the diversity gain changes from 4 to 8, a performance gain is not great. Furthermore, correlation also exists in a frequency domain, and only a limited diversity gain can be obtained in the frequency domain. Therefore, it is unnecessary to distribute the second physical resource elements occupied by the control channel at the higher aggregation level to a lot of PRB pairs, so long as a certain diversity gain is obtained. For example, the second physical resource elements occupied by the control channel at the higher aggregation level are distributed to 4 channel-independent PRB pairs in 4 frequency domains. Therefore, in the case where a certain frequency diversity gain is obtained at each aggregation level, some first physical resource elements are reserved for a localized E-PDCCH.

In this embodiment, all second physical resource elements included in one second physical resource element group are located in one PRB pair; or all second physical resource elements included in all the second physical resource element groups are located on physical resources of a part of first physical resource elements in the m PRB pairs; or in one PRB pair, all second physical resource elements included in one second physical resource element group are located on physical resources of a part of first physical resource elements in the one PRB pair; or in one PRB pair, all second physical resource elements included in all second physical resource element groups are located on physical resources of a part of first physical resource elements in the one PRB pair. Therefore, some first physical resource elements may be used for localized E-PDCCH transmission.

In this embodiment, in one PRB pair, all second physical resource element groups are formed by physical resources corresponding to a part of antenna ports in the one PRB pair; or in one PRB pair, all second physical resource elements included in all second physical resource element groups are located in first physical resource elements corresponding to a part of antenna ports in the one PRB pair.

In this embodiment, the first determining module 1501 being configured to determine, according to the aggregation level L, a first control channel candidate at the aggregation level L may be: the first determining module 1501 being configured to determine, according to the aggregation level L, the number M of control channel candidates at the aggregation level L, where M is an integer, and M≥1, map the M control channel candidates to physical resources in the m PRB pairs, and select one first control channel candidate from the M control channel candidates.

In this embodiment, the first determining module 1501 being configured to map the M control channel candidates to physical resources in the m PRB pairs may be: the first determining module 1501 being configured to map the M control channel candidates to $M \times H_L$ second physical resource elements in $$\sum_{i=0}^{m-1} k_i$$

second physical resource elements, where $H_L$ indicates the number of second physical resource elements to which each of the control channel candidates at the aggregation level L needs to be mapped, $N_L \times G_L = H_L$, $H_L \geq 1$, and $N_L$ is an integer.

Specifically, the first determining module 1501 being configured to map the M control channel candidates to $M \times H_L$ second physical resource elements in $$\sum_{i=0}^{m-1} k_i$$

second physical resource elements may be: the first determining module 1501 being configured to: set virtual resource elements, where each of the virtual resource elements corresponds to one second physical resource element on a physical resource, a virtual resource element set includes $$\sum_{i=0}^{m-1} k_i$$

virtual resource elements, and the M control channel candidates correspond to $M \times H_L$ virtual resource elements; map the M control channel candidates to $M \times H_L$ virtual resource elements in the virtual resource element set; and map the $M \times H_L$ virtual resource elements to the $M \times H_L$ second physical resource elements in the $$\sum_{i=0}^{m-1} k_i$$

second physical resource elements.

The first determining module 1501 being configured to map the M control channel candidates to $M \times H_L$ virtual resource elements in the virtual resource element set may be: the first determining module 1501 being configured to map, according to a pre-obtained start position, the M control channel candidates to $M \times H_L$ consecutive virtual resource elements consecutively.

Specifically, the first determining module 1501 being configured to map the $M \times H_L$ virtual resource elements to the $M \times H_L$ second physical resource elements in the $$\sum_{i=0}^{m-1} k_i$$

second physical resource elements may be: the first determining module 1501 being configured to: interleave the $$\sum_{i=0}^{m-1} k_i$$

virtual resource elements included in the virtual resource element set through an interleaver, where the number of elements in an interleaving matrix of the interleaver is Q; map the interleaved virtual resource element set to $$\sum_{i=0}^{m-1} k_i$$

second physical resource elements included in the m PRB pairs; obtain, according to mapped positions of the $M \times H_L$ virtual resource elements in the virtual resource element set, mapped positions of the $M \times H_L$ virtual resource elements in the interleaved virtual resource element set; and map, according to mapped positions of the interleaved virtual resource element set in the $$\sum_{i=0}^{m-1} k_i$$

second physical resource elements, the $M \times H_L$ virtual resource elements to the $M \times H_L$ second physical resource elements in the $$\sum_{i=0}^{m-1} k_i$$

second physical resource elements.

Specifically, the first determining module 1501 being configured to interleave the $$\sum_{i=0}^{m-1} k_i$$

virtual resource elements included in the virtual resource element set through an interleaver may be: the first determining module 1501 being configured to: divide the virtual resource element set into $R_L$ virtual resource element groups, where the number of virtual resource elements included in each virtual resource element group is $G_L$, where $$R_L = \left\lfloor \frac{\sum_{i=0}^{m-1} k_i}{G_L} \right\rfloor,$$

and $Q \le R_L$; and sequentially write the $R_L$ virtual resource element groups into the interleaving matrix according to rows, where each virtual resource element group corresponds to one element of the interleaving matrix, and sequentially read the $R_L$ virtual resource element groups from the interleaving matrix according to columns; or sequentially write the $R_L$ virtual resource element groups into the interleaving matrix according to columns, where each virtual resource element group corresponds to one element of the interleaving matrix, and sequentially read the $R_L$ virtual resource element groups from the interleaving matrix according to rows; where the sequentially read $R_L$ virtual resource element groups form the interleaved virtual resource element set.

In an implementation manner of this embodiment, the number of columns in the interleaving matrix is m; and/or the number of rows in the interleaving matrix is $$\left\lceil \frac{\sum_{i=0}^{m-1} k_i}{m \times G_L} \right\rceil, \text{ where } \left\lceil \frac{\sum_{i=0}^{m-1} k_i}{m \times G_L} \right\rceil$$

indicates roundup of $$\frac{\sum_{i=0}^{m-1} k_i}{m \times G_L};$$

and when the number of second physical resource elements included in each PRB pair in the m PRB pairs is equal and is p, the number of rows in the interleaving matrix is $$\left\lceil \frac{p}{G_L} \right\rceil.$$

In another implementation manner of this embodiment, the number of rows in the interleaving matrix is m; and/or the number of columns in the interleaving matrix is $$\left\lceil \frac{\sum_{i=0}^{m-1} k_i}{m \times G_L} \right\rceil, \text{ where } \left\lceil \frac{\sum_{i=0}^{m-1} k_i}{m \times G_L} \right\rceil$$

indicates roundup of $$\frac{\sum_{i=0}^{m-1} k_i}{m \times G_L};$$

and when the number of second physical resource elements included in each PRB pair in the m PRB pairs is equal and is p, the number of columns in the interleaving matrix is $$\left\lceil \frac{p}{G_L} \right\rceil.$$

In this embodiment, the first determining module 1501 being configured to map the interleaved virtual resource element set to $$\sum_{i=0}^{m-1} k_i$$

second physical resource elements included in the m PRB pairs may be: the first determining module 1501 being configured to: sequentially map, according to sequence numbers of RB pairs, the interleaved virtual resource element set to the m PRB pairs; and in a mapping to second physical resource elements included in one PRB pair, map virtual resource element groups in the interleaved virtual resource element set to second physical resource element groups according to a predefined sequence, where each virtual resource element group in the interleaved virtual resource element set is mapped to one second physical resource element group. The sequence numbers of the RB pairs are sequence numbers of PRB pairs or sequence numbers of virtual resource block pairs; and when the sequence numbers of the RB pairs are sequence numbers of virtual resource block pairs, a mapping relationship exists between the sequence numbers of the virtual resource block pairs and the sequence numbers of the PRB pairs.

In the above embodiment, at the aggregation level L, when any control channel candidate of a distributed control channel to be transmitted is mapped to physical resources, and some eREGs of the control channel candidate are mapped to a PRB pair, these eREGs are preferably mapped to physical resources corresponding to fewest localized eCCEs in the PRB pair, thereby improving multiplexing efficiency of control channels of different modes.

Figure 16:
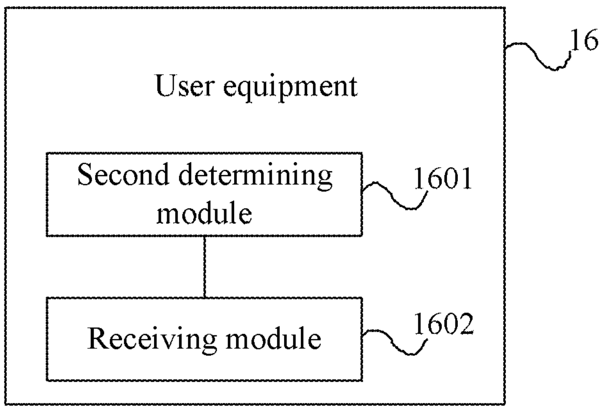
FIG. 16 is a schematic structural diagram of another embodiment of a user equipment according to the present invention.

FIG. 16 is a schematic structural diagram of another embodiment of a user equipment according to the present invention. A user equipment 16 in this embodiment may implement the procedure of the embodiment shown in FIG. 12 of the present invention. As shown in FIG. 16, the user equipment 16 may include: a second determining module 1601 and a receiving module 1602.

The second determining module 1601 is configured to: determine m PRB pairs used for transmitting a control channel, where an $i^{th}$ PRB pair includes $n_i$ first physical resource elements, the $i^{th}$ PRB pair includes $k_i$ second physical resource elements, and the second physical resource elements included in the m PRB pairs form multiple second physical resource element groups, where the first physical resource elements are used for transmitting the control channel to be transmitted by using a localized transmission mode, the second physical resource elements are used for transmitting the control channel to be transmitted by using a distributed transmission mode, and one of the first physical resource elements includes at least two second physical resource elements, where $m \geq 1$, $n_i \geq 1$, $k_i \geq 1$, $0 \leq i \leq m-1$, and m, i, $n_i$, and $k_i$ are all integers; determine, according to an aggregation level L of the control channel, the number $G_L$ of second physical resource elements included in each of the second physical resource element groups, where the $G_L$ second physical resource elements included in each of the second physical resource element groups are located in $\lceil G_L/q \rceil$ first physical resource elements in the m PRB pairs, where q indicates the number of second physical resource elements included in one first physical resource element, $\lceil G_L/q \rceil$ indicates roundup of $G_L/q$, $G_L \geq 1$, $L \geq 1$, and $G_L$ and L are both integers; and determine, according to the aggregation level L, M control channel candidates at the aggregation level L, where each of the control channel candidates corresponds to $N_L$ second physical resource element groups, where $M \geq 1$, $N_L \geq 1$, and M and $N_L$ are both integers.

The receiving module 1602 is configured to detect the M control channel candidates determined by the determining module 1601.

The control channel may be an E-PDCCH or a PDCCH, which is not limited by this embodiment.

In this embodiment, when $G_L$ is less than or equal to the number of second physical resource elements included in one first physical resource element, the $G_L$ second physical resource elements are located in one first physical resource element in the m PRB pairs.

Specifically, the second determining module 1601 being configured to determine, according to an aggregation level L of the control channel, the number $G_L$ of second physical resource elements included in each of the second physical resource element groups may be: the second determining module 1601 being configured to: obtain the number $G_L$ configured by higher layer signaling and corresponding to the aggregation level L, of second physical resource elements included in each of the second physical resource element groups; or determine the $G_L$ according to a preset mapping relationship between the aggregation level L and the number $G_L$ of second physical resource elements included in each of the second physical resource element groups.

In this embodiment, for different aggregation levels, the number $G_L$ of second physical resource elements included in a second physical resource element group corresponding to at least one aggregation level is greater than or equal to 2; in this case, the number $G_L$ of second physical resource elements included in a second physical resource element group corresponding to at least one aggregation level is greater than or equal to 2, and the $G_L$ second physical resource elements included in each of the second physical resource element groups are located in $\lceil G_L/q \rceil$ first physical resource elements in the m PRB pairs, and therefore, at this aggregation level, each of the second physical resource element groups occupies fewer first physical resource elements, thereby avoiding a case where each second physical resource element in the second physical resource element group occupies one first physical resource element, so that more first physical resource elements may be used in the localized transmission mode; or for at least two aggregation levels in multiple different aggregation levels, a second physical resource element group corresponding to a higher aggregation level in the at least two aggregation levels includes more second physical resource elements; in this case, a control channel at a higher aggregation level occupies more second physical resource elements. With respect to a diversity gain, when the diversity gain is greater than 4, for example, the diversity gain changes from 4 to 8, a performance gain is not great. Furthermore, correlation also exists in a frequency domain, and only a limited diversity gain can be obtained in the frequency domain. Therefore, it is unnecessary to distribute the second physical resource elements occupied by the control channel at the higher aggregation level to a lot of PRB pairs, so long as a certain diversity gain is obtained. For example, the second physical resource elements occupied by the control channel at the higher aggregation level are distributed to 4 channel-independent PRB pairs in 4 frequency domains. Therefore, in the case where a certain frequency diversity gain is obtained at each aggregation level, some first physical resource elements are reserved for a localized E-PDCCH.

In this embodiment, all second physical resource elements included in one second physical resource element group are located in one PRB pair; or all second physical resource elements included in all the second physical resource element groups are located on physical resources of a part of first physical resource elements in the m physical resource block pairs; or in one PRB pair, all second physical resource elements included in one second physical resource element group are located on physical resources of a part of first physical resource elements in the one PRB pair; or in one PRB pair, all second physical resource elements included in all second physical resource element groups are located on physical resources of a part of first physical resource elements in the one PRB pair. Therefore, some first physical resource elements may be used for localized E-PDCCH transmission.

In this embodiment, in one PRB pair, all second physical resource element groups are formed by physical resources corresponding to a part of antenna ports in the one PRB pair; or in one PRB pair, all second physical resource elements included in all second physical resource element groups are located in first physical resource elements corresponding to a part of antenna ports in the one PRB pair.

Specifically, the receiving module 1602 being configured to detect the M control channel candidates determined by the second determining module 1601 may be: the receiving module 1602 being configured to detect physical resources to which the M control channel candidates are mapped, and when a correct control channel is detected, parse the correct control channel to obtain control information borne in the correct control channel, or when no correct control channel is detected, continue to perform the step of determining the number M of control channel candidates at other aggregation levels than the aggregation level L and subsequent steps, until a correct control channel is detected or until all control channel candidates corresponding to all aggregation levels are traversed.

Specifically, the second determining module 1601 being configured to determine, according to the aggregation level L, M control channel candidates at the aggregation level L may be: the second determining module 1601 being configured to: determine, according to the aggregation level L, the number M of control channel candidates at the aggregation level L, where M is an integer, and M≥1; and determine a mapping from the M control channel candidates to physical resources in the m PRB pairs.

Specifically, the second determining module 1601 being configured to determine a mapping from the M control channel candidates to physical resources in the m PRB pairs may be: the second determining module 1601 being configured to determine that the M control channel candidates are mapped to $M \times H_L$ second physical resource elements in $$\sum_{i=0}^{m-1} k_i$$

second physical resource elements, where $H_L$ indicates the number of second physical resource elements to which each of the control channel candidates at the aggregation level L needs to be mapped, $N_L \times G_L = H_L$, $H_L \geq 1$, and $N_L$ is an integer.

Specifically, the second determining module 1601 being configured to determine that the M control channel candidates are mapped to $M \times H_L$ second physical resource elements in $$\sum_{i=0}^{m-1} k_i$$

second physical resource elements may be: the second determining module 1601 being configured to: determine that the M control channel candidates are mapped to $M \times H_L$ virtual resource elements in a virtual resource element set, where each virtual resource element corresponds to one second physical resource element on a physical resource, and a virtual resource element set includes $$\sum_{i=0}^{m-1} k_i$$

virtual resource elements; and determine that the M×HL virtual resource elements are mapped to the $M \times H_L$ second physical resource elements in the $$\sum_{i=0}^{m-1} k_i$$

second physical resource elements.

Specifically, The second determining module 1601 being configured to determine that the M control channel candidates are mapped to M×HL virtual resource elements in a virtual resource element set may be: the second determining module 1601 being configured to determine that the M control channel candidates are mapped to $M \times H_L$ consecutive virtual resource elements starting from a pre-obtained start position.

The second determining module 1601 being configured to determine that the $M \times H_L$ virtual resource elements are mapped to the $M \times H_L$ second physical resource elements in the $$\sum_{i=0}^{m-1} k_i$$

second physical resource elements may be: the second determining module 1601 being configured to: interleave the $$\sum_{i=0}^{m-1} k_i$$

virtual resource elements included in the virtual resource element set through an interleaver, where the number of elements in an interleaving matrix of the interleaver is Q; determine that the interleaved virtual resource element set is mapped to $$\sum_{i=0}^{m-1} k_i$$

second physical resource elements included in the m physical resource block pairs; then, obtain, according to mapped positions of the $M \times H_L$ virtual resource elements in the virtual resource element set, mapped positions of the $M \times H_L$ virtual resource elements in the interleaved virtual resource element set; and finally, determine, according to the mapped positions of the $M \times H_L$ virtual resource elements in the interleaved virtual resource element set and mapped positions of the interleaved virtual resource element set in the $$\sum_{i=0}^{m-1} k_i$$

second physical resource elements, that the $M\times H_L$ virtual resource elements are mapped to the $M\times H_L$ second physical resource elements in the $$\sum_{i=0}^{m-1} k_i$$

second physical resource elements.

Specifically, the second determining module 1601 being configured to interleave the $$\sum_{i=0}^{m-1} k_i$$

virtual resource elements included in the virtual resource element set through an interleaver may be: the second determining module 1601 being configured to: divide the virtual resource element set into $R_L$ virtual resource element groups, where the number of virtual resource elements included in each virtual resource element group is $G_L$, where $$R_L = \left\lfloor \frac{\sum_{i=0}^{m-1} k_i}{G_L} \right\rfloor,$$

and $Q\leq R_L$; and sequentially write the $R_L$ virtual resource element groups into the interleaving matrix according to rows, where each virtual resource element group corresponds to one element of the interleaving matrix, and sequentially read the $R_L$ virtual resource element groups from the interleaving matrix according to columns; or sequentially write the $R_L$ virtual resource element groups into the interleaving matrix according to columns, where each virtual resource element group corresponds to one element of the interleaving matrix, and sequentially read the $R_L$ virtual resource element groups from the interleaving matrix according to rows; where the sequentially read $R_L$ virtual resource element groups form the interleaved virtual resource element set.

In an implementation manner of this embodiment, the number of columns in the interleaving matrix is m; and/or the number of rows in the interleaving matrix is $$\left\lceil \frac{\sum_{i=0}^{m-1} k_i}{m\times G_L} \right\rceil, \text{ where } \left\lceil \frac{\sum_{i=0}^{m-1} k_i}{m\times G_L} \right\rceil$$

indicates roundup of $$\frac{\sum_{i=0}^{m-1} k_i}{m\times G_L};$$

and when the number of second physical resource elements included in each PRB pair in the m PRB pairs is equal and is p, the number of rows in the interleaving matrix is $$\frac{p}{G_L}.$$

In another implementation manner of this embodiment, the number of rows in the interleaving matrix is m; and/or the number of columns in the interleaving matrix is $$\left\lceil \frac{\sum_{i=0}^{m-1} k_i}{m\times G_L} \right\rceil, \text{ where } \left\lceil \frac{\sum_{i=0}^{m-1} k_i}{m\times G_L} \right\rceil$$

indicates roundup of $$\frac{\sum_{i=0}^{m-1} k_i}{m\times G_L};$$

and when the number of second physical resource elements included in each PRB pair in the m PRB pairs is equal and is p, the number of columns in the interleaving matrix is $$\left\lceil \frac{p}{G_L} \right\rceil.$$

In this embodiment, specifically, the second determining module 1601 being configured to determine that the interleaved virtual resource element set is mapped to $$\sum_{i=0}^{m-1} k_i$$

second physical resource elements included in the m PRB pairs may be: the second determining module 1601 being configured to: determine, according to sequence numbers of RB pairs, that the interleaved virtual resource element set is sequentially mapped to the m PRB pairs; and in a mapping to second physical resource elements included in one PRB pair, determine that virtual resource element groups in the interleaved virtual resource element set are mapped to second physical resource element groups according to a predefined sequence, where each virtual resource element group in the interleaved virtual resource element set is mapped to one second physical resource element group.

The sequence numbers of the RB pairs are sequence numbers of PRB pairs or sequence numbers of VRB pairs; and when the sequence numbers of the RB pairs are sequence numbers of VRB pairs, a mapping relationship exists between the sequence numbers of the VRB pairs and the sequence numbers of the PRB pairs.

In the foregoing embodiment, at the aggregation level L, when any control channel candidate of a distributed control channel to be transmitted is mapped to physical resources, and some eREGs of the control channel candidate are mapped to a PRB pair, these eREGs are preferably mapped to physical resources corresponding to fewest localized eCCEs in the PRB pair, thereby improving multiplexing efficiency of control channels of different modes.

Figure 17:
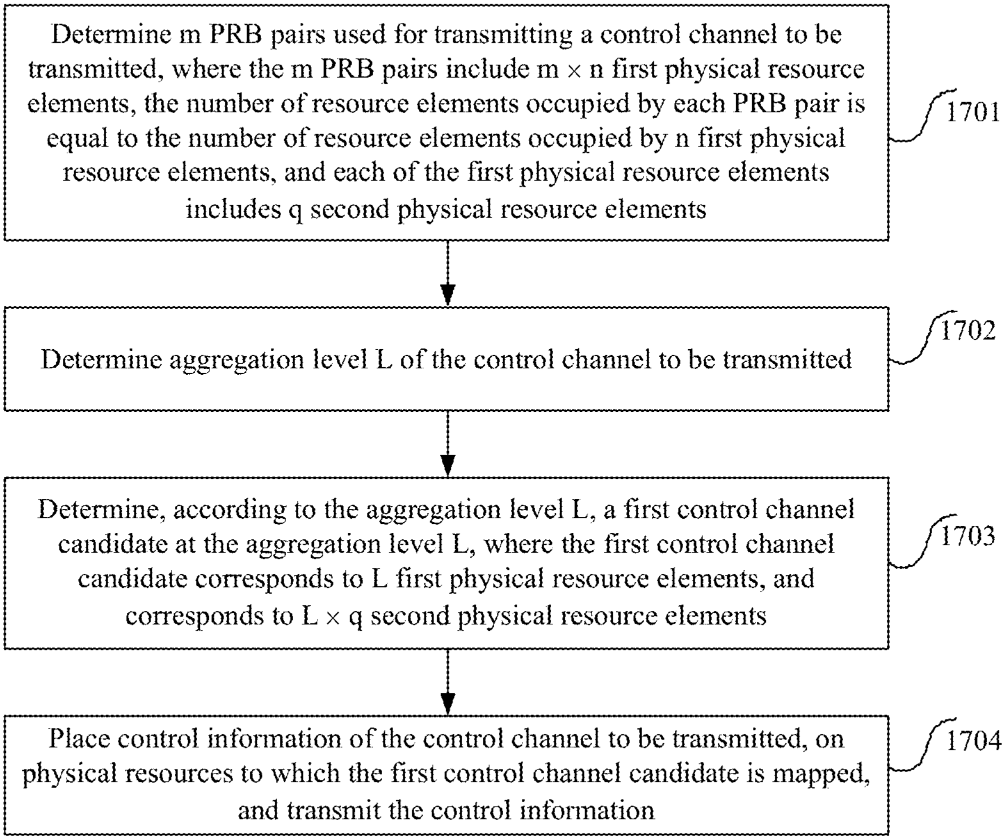
FIG. 17 is a flowchart of another embodiment of a method for transmitting a control channel according to the present invention.

FIG. 17 is a flowchart of another embodiment of a method for transmitting a control channel according to the present invention. As shown in FIG. 17, the method for transmitting a control channel may include:

Step 1701: Determine m PRB pairs used for transmitting a control channel to be transmitted, where the m PRB pairs include m×n first physical resource elements, the number of resource elements occupied by each PRB pair is equal to the number of resource elements occupied by n first physical resource elements, and each of the first physical resource elements includes q second physical resource elements, where m≥1, n≥1, q≥2, and m, n, and q are all integers.

Step 1702: Determine an aggregation level L of the control channel to be transmitted, where L≥1, and L is an integer.

Step 1703: Determine, according to the aggregation level L, a first control channel candidate at the aggregation level L, where the first control channel candidate corresponds to L first physical resource elements, and corresponds to L×q second physical resource elements.

Step 1704: Place, on physical resources to which the first control channel candidate is mapped, control information of the control channel to be transmitted, and transmit the control information.

In this embodiment, when the first physical resource elements are used for transmitting the control channel to be transmitted by using a localized transmission mode, the first physical resource elements are localized first physical resource elements; when the first physical resource elements are used for transmitting the control channel to be transmitted by using a distributed transmission mode, the first physical resource elements are distributed first physical resource elements;

relative positions of resource elements occupied by one localized first physical resource element in one PRB pair correspond to relative positions of resource elements occupied by one distributed first physical resource element in one PRB pair; and resource elements occupied by one localized first physical resource element are localized in one PRB pair, and resource elements occupied by one distributed first physical resource element are distributed in at least two PRB pairs.

In this embodiment, a mapping relationship exists between numbers of second physical resource elements included in one localized first physical resource element in one PRB pair and numbers of second physical resource elements included in one distributed first physical resource element in the one PRB pair; and second physical resource elements included in one localized first physical resource element are located in one PRB pair, and second physical resource elements included in one distributed first physical resource element are located in at least two PRB pairs.

More specifically, numbers of second physical resource elements included in one localized first physical resource element in one PRB pair and numbers of second physical resource elements included in one distributed first physical resource element in the one PRB pair are the same.

In an implementation manner of this embodiment, numbers of m×n distributed first physical resource elements in the m PRB pairs are respectively x, x+1, . . . , x+m×n−1, and numbers of n localized first physical resource elements in each of the PRB pairs are respectively z, z+1, . . . , z+n−1; and numbers of m distributed first physical resource elements formed by localized first physical resource elements having the same numbers in the m PRB pairs are y, y+1, . . . , y+m−1;

where, values of y are x, x+m, x+2 m, . . . , x+(n−1)×m.

In another implementation manner of this embodiment, each of the PRB pairs includes n sub-blocks, and each sub-block includes q second physical resource elements; the m PRB pairs include n sub-block groups, each sub-block group includes m sub-blocks, which are located in different PRB pairs, and numbers of the m×n first physical resource elements included in the m PRB pairs are respectively x, x+1, . . . , x+m×n−1; each sub-block group includes m×q second physical resource elements; and numbers of m first physical resource elements in each of the sub-block groups are y, y+1, . . . , y+m−1; and values of y are x, x+m, x+2 m, . . . , x+(n−1)×m.

In one sub-block, the number of PRB pairs to which each first physical resource element is mapped is uniformly A; and/or when a first physical resource element is mapped to A PRB pairs, the first physical resource element occupies the same number of second physical resource elements in each PRB pair in the A PRB pairs; and/or in the m PRB pairs, any sub-block in any PRB pair corresponds to one localized first physical resource element.

In this embodiment, the first control channel candidate at the aggregation level L consecutively occupies L distributed first physical resource elements, where a start number of the L distributed first physical resource elements is z and satisfies (z) mod (L)=0, where mod indicates a modulo operation.

At the aggregation level L, when the number of control channel candidates is M, any control channel candidate consecutively occupies L distributed first physical resource elements, and the M control channel candidates occupy M×L consecutive distributed first physical resource elements.

Given indexes of q second physical resource elements included in one distributed first physical resource element, the q second physical resource elements are cyclically mapped to PRB pairs at an interval of f−1 PRB pairs starting from any PRB pair in the m PRB pairs, where f=⌈m/q⌉, and ⌈m/q⌉ indicates roundup of m/q.

In the foregoing embodiment, at the aggregation level L, when any control channel candidate of a distributed control channel to be transmitted is mapped to physical resources, and some eREGs of the control channel candidate are mapped to a PRB pair, these eREGs are preferably mapped to physical resources corresponding to fewest localized eCCEs in the PRB pair, thereby improving multiplexing efficiency of control channels of different modes.

Figures 18, 19:
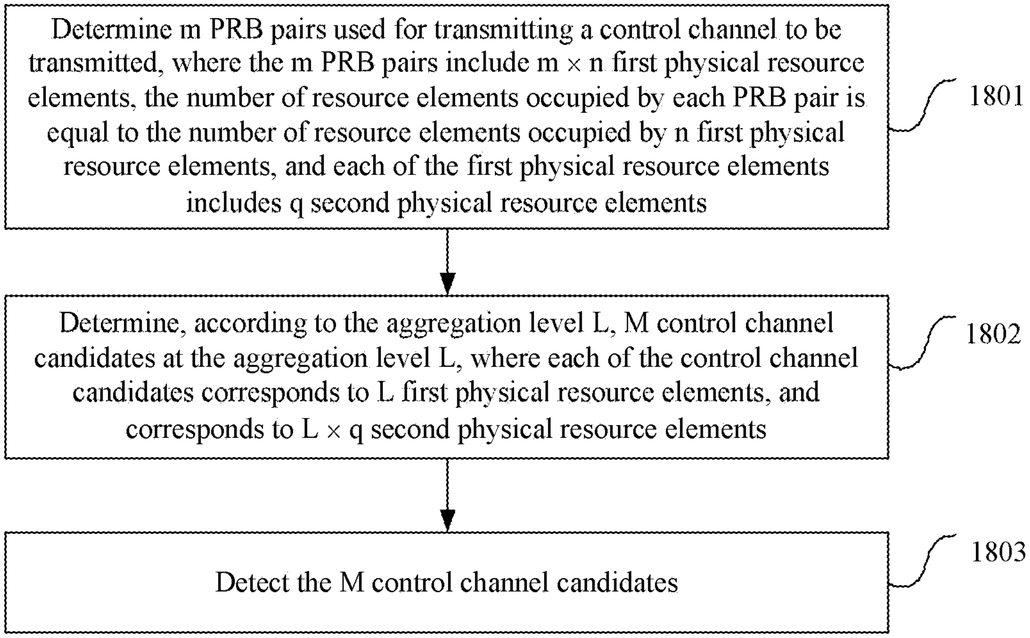
FIG. 18 is a flowchart of another embodiment of a method for receiving a control channel according to the present invention.
FIG. 19 is a schematic diagram of an embodiment of a mapping of eREGs in a normal subframe according to the present invention.

FIG. 18 is a flowchart of another embodiment of a method for receiving a control channel according to the present invention. As shown in FIG. 18, the method for receiving a control channel may include:

Step 1801: Determine m PRB pairs used for transmitting a control channel to be transmitted, where the m PRB pairs include m×n first physical resource elements, the number of resource elements occupied by each PRB pair is equal to the number of resource elements occupied by n first physical resource elements, and each of the first physical resource elements includes q second physical resource elements, where m≥1, n≥1, q≥2, and m, n, and q are all integers.

Step 1802: Determine, according to an aggregation level L, M control channel candidates at the aggregation level L, where each of the control channel candidates corresponds to L first physical resource elements, and corresponds to L×q second physical resource elements.

Step 1803: Detect the M control channel candidates.

In this embodiment, when the first physical resource elements are used for transmitting the control channel to be transmitted by using a localized transmission mode, the first physical resource elements are localized first physical resource elements; when the first physical resource elements are used for transmitting the control channel to be transmitted by using a distributed transmission mode, the first physical resource elements are distributed first physical resource elements;

relative positions of resource elements occupied by one localized first physical resource element in one PRB pair correspond to relative positions of resource elements occupied by one distributed first physical resource element in one PRB pair; and resource elements occupied by one localized first physical resource element are localized in one PRB pair, and resource elements occupied by one distributed first physical resource element are distributed in at least two PRB pairs.

In this embodiment, a mapping relationship exists between numbers of second physical resource elements included in one localized first physical resource element in one PRB pair and numbers of second physical resource elements included in one distributed first physical resource element in the one PRB pair; and second physical resource elements included in one localized first physical resource element are located in one PRB pair, and second physical resource elements included in one distributed first physical resource element are located in at least two PRB pairs.

More specifically, numbers of second physical resource elements included in one localized first physical resource element in one PRB pair and numbers of second physical resource elements included in one distributed first physical resource element in the one PRB pair are the same.

In an implementation manner of this embodiment, numbers of m×n distributed first physical resource elements in the m PRB pairs are respectively x, x+1, . . . , x+m×n−1, and numbers of n localized first physical resource elements in each of the PRB pairs are respectively z, z+1, . . . , z+n−1; and numbers of m distributed first physical resource elements formed by localized first physical resource elements having the same numbers in the m PRB pairs are y, y+1, . . . , y+m−1;

where, values of y are x, x+m, x+2 m, . . . , x+(n−1)×m.

In another implementation manner of this embodiment, each of the PRB pairs includes n sub-blocks, and each sub-block includes q second physical resource elements; the m PRB pairs include n sub-block groups, each sub-block group includes m sub-blocks, which are located in different PRB pairs, and numbers of the m×n first physical resource elements included in the m PRB pairs are respectively x, x+1, . . . , x+m×n−1; each sub-block group includes m×q second physical resource elements; and numbers of m first physical resource elements in each of the sub-block groups are y, y+1, . . . , y+m−1; and values of y are x, x+m, x+2 m, . . . , x+(n−1)×m.

In one sub-block, the number of PRB pairs to which each first physical resource element is mapped is uniformly A; and/or when a first physical resource element is mapped to A PRB pairs, the first physical resource element occupies the same number of second physical resource elements in each PRB pair in the A PRB pairs; and/or in the m PRB pairs, any sub-block in any PRB pair corresponds to one localized first physical resource element.

In this embodiment, the first control channel candidate at the aggregation level L consecutively occupies L distributed first physical resource elements, where a start number of the L distributed first physical resource elements is z and satisfies (z) mod (L)=0, where mod indicates a modulo operation.

At the aggregation level L, when the number of control channel candidates is M, any control channel candidate consecutively occupies L distributed first physical resource elements, and the M control channel candidates occupy M×L consecutive distributed first physical resource elements.

Given indexes of q second physical resource elements included in one distributed first physical resource element, the q second physical resource elements are cyclically mapped to PRB pairs at an interval of f−1 PRB pairs starting from any PRB pair in the m PRB pairs, where $f=\lceil m/q \rceil$, and $\lceil m/q \rceil$ indicates roundup of m/q.

In the foregoing embodiment, at the aggregation level L, when any control channel candidate of a distributed control channel to be transmitted is mapped to physical resources, and some eREGs of the control channel candidate are mapped to a PRB pair, these eREGs are preferably mapped to physical resources corresponding to fewest localized eCCEs in the PRB pair, thereby improving multiplexing efficiency of control channels of different modes.

In the foregoing embodiment and the following embodiment, the first physical resource elements may be physical resources corresponding to eCCEs. For example, the size of a first physical resource element corresponds to the size of an eCCE, that is, a physical resource element included in one of the first physical resource element may contain one eCCE.

In the foregoing embodiment and the following embodiment, the second physical resource elements may be physical resources corresponding to eREGs. For example, the size of a second physical resource element corresponds to the size of an eREG, or a second physical resource element itself is an eREG In the foregoing embodiment and the following embodiment, the control channel to be transmitted may be an E-PDCCH. One E-PDCCH may include at least one eCCE.

At least one E-PDCCH set may be defined, and furthermore, in an E-PDCCH set, a group of m PRB pairs is defined. The value range of m is 1, 2, 4, 8, or 16.

Furthermore, for localized and distributed E-PDCCHs, an eCCE is formed by q eREGs, where q=4 for a normal subframe (namely, a subframe including a normal cyclic prefix). In a PRB pair, there are 16 eREGs. Because for a localized E-PDCCH, REs corresponding to an eCCE are located in a PRB pair, for the localized E-PDCCH, REs occupied by a PRB pair are equivalent to REs occupied by 4 eCCEs.

With respect to the distributed E-PDCCH, an embodiment of the present invention describes the definition of a distributed eCCE in the case where the number m of PRB pairs in a set is 2, 4, 8, or 16, and the rule of mapping a distributed E-PDCCH to eREGs at different aggregation levels.

FIG. 19 is a schematic diagram of an embodiment of a mapping of eREGs in a normal subframe according to the present invention. In FIG. 19, each column indicates an OFDM symbol, and there are 14 OFDM symbols in total, whose indexes are 0-13; each row indicates a subcarrier in a frequency domain, and there are 12 subcarriers in total, whose indexes are 0-11. In FIG. 19, an RE numbered x indicates that the RE belongs to an eREG numbered x. 4 eREGs form an eCCE. Therefore, in a composition mode, eREGs indexed 0, 4, 8, and 12 form an eCCE (eCCE0); eREGs indexed 1, 5, 9, and 13 form an eCCE (eCCE1); eREGs indexed 2, 6, 10, and 14 form an eCCE (eCCE2); and eREGs indexed 3, 7, 11, and 15 form an eCCE (eCCE3). The details are shown in Table 2.

TABLE 2

| eCCE Index | eREG Index | | | |
|---|---|---|---|---|
| eCCE0 | eREG0 | eREG4 | eREG8 | eREG12 |
| eCCE1 | eREG1 | eREG5 | eREG9 | eREG13 |

TABLE 2-continued

| eCCE Index | eREG Index | | | |
|---|---|---|---|---|
| eCCE2 | eREG2 | eREG6 | eREG10 | eREG14 |
| eCCE3 | eREG3 | eREG7 | eREG11 | eREG15 |

For the localized E-PDCCH, 4 eREGs of a PRB pair form an eCCE; for the distributed E-PDCCH, 4 eREGs of an eCCE are distributed in at least two PRB pairs.

For the distributed E-PDCCH, assuming that there are m PRB pairs in an E-PDCCH set, the m PRB pairs are numbered PRB1, PRB2, . . . , PRBm in ascending or descending order of sequence numbers of PRB pairs. For example, an E-PDCCH set includes 4 PRB pairs, whose indexes are #1, #8, #10, and #15 respectively in system bandwidth. Therefore, the PRB pair indexed #1 may be described as PRB1; the PRB pair indexed #8 may be described as PRB2; the PRB pair indexed #10 may be described as PRB3; and the PRB pair indexed #15 may be described as PRB4.

FIG. 20 is a schematic diagram of an embodiment of an E-PDCCH set including 2 PRB pairs according to the present invention, namely, a schematic diagram when m=2. In FIG. 20, AL (Aggregation Level) indicates an aggregation level. If a distributed eCCE is formed by q eREGs, numbers of the q eREGs are $[a_1, a_2, \ldots, a_q]$. The E-PDCCH set includes m PRB pairs. Given indexes of eREGs of a distributed eCCE, the eREGs are cyclically mapped to PRB pairs at an interval of f−1 PRB pairs starting from a PRB pair, where $f=\lceil m/q \rceil$, and $\lceil m/q \rceil$ indicates roundup of m/q.

For example, in FIG. 20, m=2; when AL=1, an eCCE is formed by eREGs indexed 0, 4, 8, and 12, where the eREG indexed 0 is located in the first PRB pair, and the eREG indexed 4 is located in the second PRB pair. Because there are only two PRB pairs, the eREG indexed 8 is cyclically mapped to the first PRB pair, and the eREG indexed 12 is located in the second PRB pair. In FIG. 20, when AL=1, m=2 PRB pairs include 8 eCCEs, where the eREGs occupied by the 8 eCCEs are all mapped according to the foregoing rule, which is not further described herein.

When AL=2, a potential E-PDCCH candidate occupies 8 eREGs, that is, eREGs in each row in FIG. 20 are eREGs occupied by a potential E-PDCCH candidate. That is, a potential E-PDCCH candidate occupies 2 distributed eCCEs. eREGs corresponding to a distributed eCCE are eREG0 of PRB pair 1, eREG4 of PRB pair 2, eREG8 of PRB pair 1, and eREG12 of PRB pair 2. eREGs corresponding to another distributed eCCE are eREG4 of PRB pair 1, eREG8 of PRB pair 2, eREG12 of PRB pair 1, and eREG0 of PRB pair 2. According to FIG. 20 and Table 2, eREGs occupied by the potential E-PDCCH candidate, in each PRB pair, are located in only one localized eCCE, which can ensure that fewest resources of localized eCCEs are occupied.

When AL=4, eREGs occupied by a potential E-PDCCH candidate are formed by eREGs occupied by two potential E-PDCCH candidates at aggregation level 2 in FIG. 20.

When AL=8, there is only one potential E-PDCCH candidate, where the potential candidate corresponds to all eREGs in the two PRB pairs.

FIG. 21 is a schematic diagram of an embodiment of an E-PDCCH set including 4 PRB pairs according to the present invention, namely, a schematic diagram when m=4. In FIG. 21, eREGs corresponding to one E-PDCCH are located in 4 PRB pairs respectively. For example, indexes of eREGs corresponding to an eCCE of a distributed E-PDCCH are the same as those corresponding to a localized eCCE, as shown in Table 2, but 4 eREGs included in an eCCE of a distributed E-PDCCH are distributed in 4 PRB pairs. For example, for an eCCE formed by eREGs indexed 0, 4, 8, and 12, eREG0 of PRB pair 1, eREG4 of PRB pair 2, eREG8 of PRB pair 3, and eREG12 of PRB pair 4 form an eCCE; eREG4 of PRB pair 1, eREG8 of PRB pair 2, eREG12 of PRB pair 3, and eREG0 of PRB pair 4 form an eCCE; eREG8 of PRB pair 1, eREG12 of PRB pair 2, eREG0 of PRB pair 3, and eREG4 of PRB pair 4 form an eCCE; eREG12 of PRB pair 1, eREG0 of PRB pair 2, eREG4 of PRB pair 3, and eREG8 of PRB pair 4 form an eCCE. Likewise, an eCCE formed by eREGs indexed 1, 5, 9, and 13, an eCCE formed by eREGs indexed 2, 6, 10, and 13, and an eCCE formed by eREGs indexed 3, 7, 11, and 15 may be obtained. In the 4 PRB pairs, there are 16 eCCEs in total.

When AL=2, 8 eREGs occupied by a potential E-PDCCH candidate are located in 4 PRB pairs, where each PRB pair includes 2 eREGs, and the 2 eREGs are located in a localized eCCE. For example, referring to FIG. 21, a potential candidate at aggregation level 2 is formed by two distributed eCCEs, where one distributed eCCE is formed by eREG0 of PRB pair 1, eREG4 of PRB pair 2, eREG8 of PRB pair 3, and eREG12 of PRB pair 4, and another distributed eCCE is formed by eREG4 of PRB pair 1, eREG8 of PRB pair 2, eREG12 of PRB pair 3, and eREG0 of PRB pair 4. Likewise, another potential candidate at aggregation level 2 is formed by two distributed eCCEs, where one distributed eCCE is formed by eREG8 of PRB pair 1, eREG12 of PRB pair 2, eREG0 of PRB pair 3, and eREG4 of PRB pair 4, and another distributed eCCE is formed by eREG12 of PRB pair 1, eREG0 of PRB pair 2, eREG4 of PRB pair 3, and eREG8 of PRB pair 4. Likewise, a combination of potential candidates at aggregation level 2 which are formed by eREGs indexed 1, 5, 9, and 13, a combination of potential candidates at aggregation level 2 which are formed by eREGs indexed 2, 6, 10, and 13, and a combination of potential candidates at aggregation level 2 which are formed by eREGs indexed 3, 7, 11, and 15 may be obtained, which is not further described herein.

When AL=4, 16 eREGs occupied by a potential E-PDCCH candidate are located in 4 PRB pairs, where each PRB pair includes 4 eREGs, and the 4 eREGs are located in a localized eCCE. For example, referring to FIG. 21, a potential candidate at aggregation level 4 is formed by 4 distributed eCCEs, where one distributed eCCE is formed by eREG0 of PRB pair 1, eREG4 of PRB pair 2, eREG8 of PRB pair 3, and eREG12 of PRB pair 4; another distributed eCCE is formed by eREG4 of PRB pair 1, eREG8 of PRB pair 2, eREG12 of PRB pair 3, and eREG0 of PRB pair 4; another distributed eCCE is formed by eREG8 of PRB pair 1, eREG12 of PRB pair 2, eREG0 of PRB pair 3, and eREG4 of PRB pair 4; the last distributed eCCE is formed by eREG12 of PRB pair 1, eREG0 of PRB pair 2, eREG4 of PRB pair 3, and eREG8 of PRB pair 4. A potential E-PDCCH candidate at aggregation level 4 is placed in 4 PRB pairs. In each PRB pair, mapped REs are REs corresponding to one localized eCCE.

When AL=8, eREGs corresponding to a potential E-PDCCH candidate are formed by eREGs corresponding to two potential E-PDCCH candidates at aggregation level 4, which can ensure that fewest resources of localized eCCEs are occupied.

FIG. 22 is a schematic diagram of an embodiment of an E-PDCCH set including 8 PRB pairs according to the present invention, namely, a schematic diagram when m=8. When m=8, eREGs corresponding to a potential E-PDCCH candidate are located in 4 PRB pairs respectively. For example, referring to FIG. 22, indexes of eREGs corresponding to an eCCE of a distributed E-PDCCH are the same as those corresponding to a localized eCCE, as shown in Table 2, but 4 eREGs included in an eCCE of a distributed E-PDCCH are distributed in 4 PRB pairs. Table 3 shows positions of distributed eCCEs formed by eREGs indexed 0, 4, 8, and 12 in PRB pairs.

TABLE 3

| Distributed eCCE | PRB Pair 1 | PRB Pair 2 | PRB Pair 3 | PRB Pair 4 | PRB Pair 5 | PRB Pair 6 | PRB Pair 7 | PRB Pair 8 |
|---|---|---|---|---|---|---|---|---|
| eCCE0 | eREG0 | | eREG4 | | eREG8 | | eREG12 | |
| eCCE1 | eREG4 | | eREG8 | | eREG12 | | eREG0 | |
| eCCE2 | eREG8 | | eREG12 | | eREG0 | | eREG4 | |
| eCCE3 | eREG12 | | eREG0 | | eREG4 | | eREG8 | |
| eCCE4 | | eREG0 | | eREG4 | | eREG8 | | eREG12 |
| eCCE5 | | eREG4 | | eREG8 | | eREG12 | | eREG0 |
| eCCE6 | | eREG8 | | eREG12 | | eREG0 | | eREG4 |
| eCCE7 | | eREG12 | | eREG0 | | eREG4 | | eREG8 |

For example, in the second row of Table 3, eREG0 of an eCCE is eREG0 of PRB pair 1, eREG4 is eREG4 of PRB pair 3, eREG8 is eREG8 of PRB pair 5, and eREG12 is eREG12 of PRB pair 7. In Table 3, an eCCE formed by eREGs indexed 1, 5, 9, and 13 is obtained by replacing eREG0 with eREG1, eREG4 with eREG5, eREG8 with eREG9, and eREG12 with eREG13.

Likewise, an eCCE formed by eREGs indexed 2, 6, 10, and 13, and an eCCE formed by eREGs indexed 3, 7, 11, and 15 may be obtained.

When AL=2, referring to FIG. 22, 8 eREGs corresponding to a potential E-PDCCH candidate are located in 8 PRB pairs, and each PRB pair includes an eREG Indexes of the 8 eREGs include only 4 values, which are one of: 0, 4, 8, 16; 1, 5, 9, 13; 2, 6, 10, 13; and 3, 7, 11, 15. Table 4 shows potential candidates at aggregation level 2 which are formed by eREGs indexed 0, 4, 8, and 12.

TABLE 4

| Aggregation Level 2 | PRB Pair 1 | PRB Pair 2 | PRB Pair 3 | PRB Pair 4 | PRB Pair 5 | PRB Pair 6 | PRB Pair 7 | PRB Pair 8 |
|---|---|---|---|---|---|---|---|---|
| Potential candidate 0 | eREG0 | eREG0 | eREG4 | eREG4 | eREG8 | eREG8 | eREG12 | eREG12 |
| Potential candidate 1 | eREG4 | eREG4 | eREG8 | eREG8 | eREG12 | eREG12 | eREG0 | eREG0 |
| Potential candidate 2 | eREG8 | eREG8 | eCCE12 | eCCE12 | eCCE0 | eCCE0 | eCCE4 | eCCE4 |
| Potential candidate 3 | eREG12 | eREG12 | eCCE0 | eCCE0 | eCCE4 | eCCE4 | eCCE8 | eCCE8 |

In Table 4, potential candidates at aggregation level 2 which are formed by eREGs indexed 1, 5, 9, and 13 are obtained by replacing eREG0 with eREG1, eREG4 with eREG5, eREG8 with eREG9, and eREG12 with eREG13.

Likewise, potential candidates at aggregation level 2 which are formed by eREGs indexed 2, 6, 10, and 13, and potential candidates at aggregation level 2 which are formed by eREGs indexed 3, 7, 11, and 15 may be obtained.

When AL=4, referring to FIG. 22, 16 eREGs corresponding to a potential E-PDCCH candidate are located in 8 PRB pairs, and each PRB pair includes 2 eREGs. Indexes of the 8 eREGs include only 4 values, which are one of: 0, 4, 8, 16; 1, 5, 9, 13; 2, 6, 10, 13; and 3, 7, 11, 15. Table 5 shows potential candidates at aggregation level 4 which are formed by eREGs indexed 0, 4, 8, and 12.

TABLE 5

| Aggregation Level 4 | PRB1 | PRB2 | PRB3 | PRB4 | PRB5 | PRB6 | PRB7 | PRB8 |
|---|---|---|---|---|---|---|---|---|
| Potential | eREG0 | eREG0 | eREG4 | eREG4 | eREG8 | eREG8 | eREG12 | eREG12 |
| candidate 0 | eREG4 | eREG4 | eREG8 | eREG8 | eREG12 | eREG12 | eREG0 | eREG0 |
| | Namely, potential candidate 0 at aggregation level 2 in Table 4 + potential candidate 1 at aggregation level 2 in Table 4 | | | | | | | |

TABLE 5-continued

| Aggregation Level 4 | PRB1 | PRB2 | PRB3 | PRB4 | PRB5 | PRB6 | PRB7 | PRB8 |
|---|---|---|---|---|---|---|---|---|
| Potential candidate 1 | eREG8 eREG12 | eREG8 eREG12 | eCCE12 eCCE0 | eCCE12 eCCE0 | eCCE0 eCCE4 | eCCE0 eCCE4 | eCCE4 eCCE8 | eCCE4 eCCE8 |
| | Namely, potential candidate 2 at aggregation level 2 in Table 4 + potential candidate 3 at aggregation level 2 in Table 4 | | | | | | | |

In Table 5, potential candidates at aggregation level 4 which are formed by eREGs indexed 1, 5, 9, and 13 are obtained by replacing eREG0 with eREG1, eREG4 with eREG5, eREG8 with eREG9, and eREG12 with eREG13. Likewise, potential candidates at aggregation level 4 which are formed by eREGs indexed 2, 6, 10, and 13, and potential candidates at aggregation level 4 which are formed by eREGs indexed 3, 7, 11, and 15 may be obtained.

When AL=8, 16 eREGs corresponding to a potential E-PDCCH candidate are located in 8 PRB pairs, where each PRB pair includes 4 eREGs, and the 4 eREGs belong to a localized eCCE. And indexes of the 8 eREGs include only 4 values. The 4 indexes are one of: 0, 4, 8, 16; 1, 5, 9, 13; 2, 6, 10, 13; and 3, 7, 11, 15.

In another embodiment of the present invention, as shown in FIG. 23, 4 eREGs form an eCCE. For example, in a composition mode, eREGs indexed 0, 4, 8, and 12 form an eCCE (eCCE0); eREGs indexed 1, 5, 9, and 13 form an eCCE (eCCE1); eREGs indexed 2, 6, 10, and 14 form an eCCE (eCCE2); and eREGs indexed 3, 7, 11, and 15 form an eCCE (eCCE3), as shown in Table 2. FIG. 23 is a schematic diagram of another embodiment of an E-PDCCH set including 4 PRB pairs according to the present invention.

For a localized E-PDCCH, 4 eREGs of a PRB pair form an eCCE; for a distributed E-PDCCH, 4 eREGs of an eCCE are located in 4 PRB pairs. FIG. 23 shows numbers of eREGs in a PRB pair, and shows numbers of eCCEs corresponding to eREGs. For example, for the distributed E-PDCCH, an eCCE numbered eCCE1 is formed by eREG4 of PRB pair 1, eREG8 of PRB pair 2, eREG12 of PRB pair 3, and eREG0 of PRB pair 4.

Figure 24:
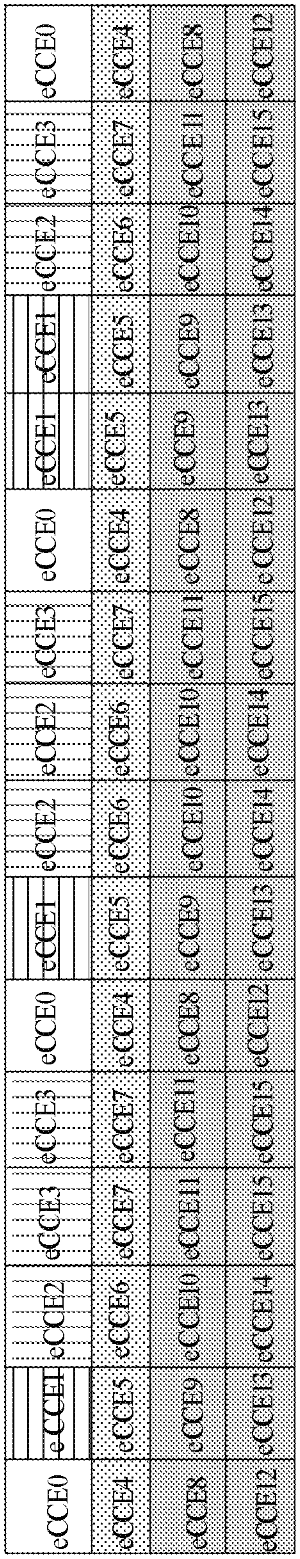
FIG. 24 is a schematic diagram of an embodiment of distributed eCCEs occupied by control channel candidates at different aggregation levels according to the present invention.

When N=4, according to start positions at different aggregation levels, a control channel candidate at the aggregation level L consecutively occupies L distributed eCCEs, where a start number z of the L distributed eCCEs satisfies (z) mod (L)=0, where mod indicates a modulo operation, and L indicates the number of distributed eCCEs occupied by a control channel candidate at the aggregation level L. FIG. 24 is a schematic diagram of an embodiment of distributed eCCEs occupied by control channel candidates at different aggregation levels according to the present invention.

In FIG. 24, it is assumed that aggregation levels 1, 2, 4, and 8 respectively correspond to 6, 6, 2, and 2 candidates. If the start position at aggregation level 1 is eCCE1, 6 eCCEs are consecutively selected as 6 candidates, and the 6 candidates respectively correspond to eCCE1, eCCE2, eCCE3, eCCE4, eCCE5, and eCCE6. If the start position at aggregation level 2 is eCCE2, the 6 candidates respectively correspond to: eCCE2, eCCE3; eCCE4, eCCE5; eCCE6, eCCE7; eCCE8, eCCE9; eCCE10, eCCE11; and eCCE12, eCCE13. If the start position at aggregation level 4 is eCCE4, the 2 candidates respectively correspond to: eCCE4, eCCE5, eCCE6, and eCCE7; and eCCE8, eCCE9, eCCE10, and eCCE11. If the start position at aggregation level 8 is eCCE8, the 2 candidates respectively correspond to eCCE8 to eCCE15, and eCCE0 to eCCE7. Thereby, it can be ensured that fewest resources of localized eCCEs are occupied. In FIG. 24, a position of a control channel candidate is drawn with respect to different aggregation levels. In FIG. 24, the shadow indicates a control channel candidate at aggregation level 1; the shadow indicates a control channel candidate at aggregation level 2; the shadow indicates a control channel candidate at aggregation level 4; and the shadow indicates a control channel candidate at aggregation level 8.

In this case, for a candidate at the aggregation level L, a search space may be indicated by formula (1):

$$L\{(Y_k+m')\bmod \lfloor N_{CCE,k}/L\rfloor\}+i \quad (1)$$

In formula (1), $Y_k$ is a value changing with subframes, and may be obtained by calculation by using a Hash algorithm; and i corresponds to a candidate eCCE at the aggregation level L, where i=0, 1, . . . , L−1. In the case of carrier aggregation, when a control channel includes a carrier indicator field (Carrier Indicator Field, CIF for short below), $m'=p'+M^{(L)}\cdot n_{CI}$, where, $n_{CI}$ indicates a CIF value. If a UE is not configured with multiple carriers, m'=p', where p'=0, 1, . . . , $M^{(L)}-1$, p' indicates the number of a control channel candidate, and $M^{(L)}$ indicates the number of control channel candidates of the E-PDCCH at the aggregation level L. $N_{CCE,k}$ indicates the number of eCCEs in a set.

When m=8, that is, a set includes 8 PRB pairs, eCCEs are numbered in two modes: the eCCEs may be divided into two N=4 PRB pairs, and then are numbered sequentially according to the method in FIG. 24, as shown in FIG. 25. FIG. 25 is a schematic diagram of an embodiment of a numbering mode of eCCEs according to the present invention.

Or in all PRB pairs, firstly eREGs occupied by localized eCCE0 are used for numbering distributed eCCEs, and firstly sequential eCCEs are placed in different PRB pairs preferably, and then eREGs occupied by localized eCCE1 are used for numbering distributed eCCEs; then eREGs occupied by localized eCCE2 are used for numbering distributed eCCEs; and then eREGs occupied by localized eCCE3 are used for numbering distributed eCCEs, as shown in FIG. 26. FIG. 26 is a schematic diagram of another embodiment of a numbering mode of eCCEs according to the present invention.

Likewise, according to the embodiment when m=4, in a PRB pair, in the case where a distributed E-PDCCH occupies same eREGs, it may be ensured that fewest resources of localized eCCEs are occupied.

Figure 27:
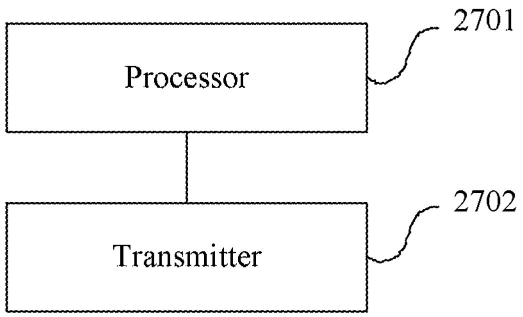
FIG. 27 is a schematic structural diagram of another embodiment of a base station according to the present invention.

FIG. 27 is a schematic structural diagram of another embodiment of a base station according to the present invention. The base station in this embodiment may implement the procedure of the embodiment shown in FIG. 17 of the present invention. As shown in FIG. 27, the base station may include: a processor 2701 and a transmitter 2702.

The processor 2701 is configured to: determine m PRB pairs used for transmitting a control channel to be transmitted, where the m PRB pairs include m×n first physical resource elements, the number of resource elements occupied by each PRB pair is equal to the number of resource elements occupied by n first physical resource elements, and each of the first physical resource elements includes q second physical resource elements, where m≥1, n≥1, q≥2, and m, n, and q are all integers; determine an aggregation level L of the control channel to be transmitted, where L≥1, and L is an integer; and determine, according to the aggregation level L, a first control channel candidate at the aggregation level L, where the first control channel candidate corresponds to L first physical resource elements, and corresponds to L×q second physical resource elements.

The transmitter 2702 is configured to place, on physical resources to which the first control channel candidate determined by the processor 2702 is mapped, control information of the control channel to be transmitted, and transmit the control information.

In this embodiment, when the first physical resource elements are used for transmitting the control channel to be transmitted by using a localized transmission mode, the first physical resource elements are localized first physical resource elements; when the first physical resource elements are used for transmitting the control channel to be transmitted by using a distributed transmission mode, the first physical resource elements are distributed first physical resource elements;

relative positions of resource elements occupied by one localized first physical resource element in one PRB pair correspond to relative positions of resource elements occupied by one distributed first physical resource element in one PRB pair; and resource elements occupied by one localized first physical resource element are localized in one PRB pair, and resource elements occupied by one distributed first physical resource element are distributed in at least two PRB pairs.

In this embodiment, a mapping relationship exists between numbers of second physical resource elements included in one localized first physical resource element in one PRB pair and numbers of second physical resource elements included in one distributed first physical resource element in the one PRB pair; and second physical resource elements included in one localized first physical resource element are located in one PRB pair, and second physical resource elements included in one distributed first physical resource element are located in at least two PRB pairs.

More specifically, numbers of second physical resource elements included in one localized first physical resource element in one PRB pair and numbers of second physical resource elements included in one distributed first physical resource element in the one PRB pair are the same.

In an implementation manner of this embodiment, numbers of m×n distributed first physical resource elements in the m PRB pairs are respectively x, x+1, . . . , x+m×n−1, and numbers of n localized first physical resource elements in each of the PRB pairs are respectively z, z+1, . . . , z+n−1; and numbers of m distributed first physical resource elements formed by localized first physical resource elements having the same numbers in the m PRB pairs are y, y+1, . . . , y+m−1;

where, values of y are x, x+m, x+2 m, . . . , x+(n−1)×m.

In another implementation manner of this embodiment, each of the PRB pairs includes n sub-blocks, and each sub-block includes q second physical resource elements; the m PRB pairs include n sub-block groups, each sub-block group includes m sub-blocks, which are located in different PRB pairs, and numbers of the m×n first physical resource elements included in the m PRB pairs are respectively x, x+1, . . . , x+m×n−1; each sub-block group includes m×q second physical resource elements; and numbers of m first physical resource elements in each of the sub-block groups are y, y+1, . . . , y+m−1; and values of y are x, x+m, x+2 m, . . . , x+(n−1)×m.

In one sub-block, the number of PRB pairs to which each first physical resource element is mapped is uniformly A; and/or when a first physical resource element is mapped to A PRB pairs, the first physical resource element occupies the same number of second physical resource elements in each PRB pair in the A PRB pairs; and/or in the m PRB pairs, any sub-block in any PRB pair corresponds to one localized first physical resource element.

In this embodiment, the first control channel candidate at the aggregation level L consecutively occupies L distributed first physical resource elements, where a start number of the L distributed first physical resource elements is z and satisfies (z) mod (L)=0, where mod indicates a modulo operation.

At the aggregation level L, when the number of control channel candidates is M, any control channel candidate consecutively occupies L distributed first physical resource elements, and the M control channel candidates occupy M×L consecutive distributed first physical resource elements.

Given indexes of q second physical resource elements included in one distributed first physical resource element, the q second physical resource elements are cyclically mapped to PRB pairs at an interval of f−1 PRB pairs starting from any PRB pair in the m PRB pairs, where f=⌈m/q⌉, and ⌈m/q⌉ indicates roundup of m/q.

In the foregoing embodiment, at the aggregation level L, when any control channel candidate of a distributed control channel to be transmitted is mapped to physical resources, and some eREGs of the control channel candidate are mapped to a PRB pair, these eREGs are preferably mapped to physical resources corresponding to fewest localized eCCEs in the PRB pair, thereby improving multiplexing efficiency of control channels of different modes.

Figure 28:
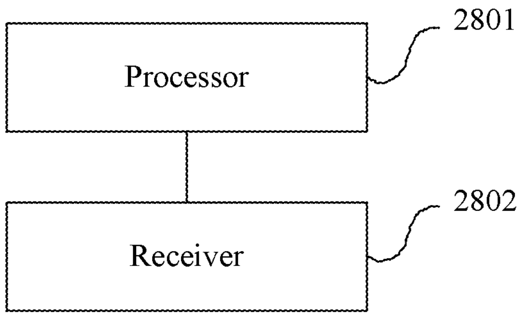
FIG. 28 is a schematic structural diagram of another embodiment of a user equipment according to the present invention.

FIG. 28 is a schematic structural diagram of another embodiment of a user equipment according to the present invention. The user equipment in this embodiment may implement the procedure of the embodiment shown in FIG. 18 of the present invention. As shown in FIG. 28, the user equipment may include: a processor 2801 and a receiver 2802.

The processor 2801 is configured to: determine m PRB pairs used for transmitting a control channel to be transmitted, where the m PRB pairs include m×n first physical resource elements, the number of resource elements occupied by each PRB pair is equal to the number of resource elements occupied by n first physical resource elements, and each of the first physical resource elements includes q second physical resource elements, where m≥1, n≥1, q≥2, and m, n, and q are all integers; and determine, according to an aggregation level L, M control channel candidates at the aggregation level L, where each of the control channel candidates corresponds to L first physical resource elements, and corresponds to L×q second physical resource elements.

The receiver 2802 is configured to detect the M control channel candidates determined by the processor 2801.

In this embodiment, when the first physical resource elements are used for transmitting the control channel to be transmitted by using a localized transmission mode, the first physical resource elements are localized first physical resource elements; when the first physical resource elements are used for transmitting the control channel to be transmitted by using a distributed transmission mode, the first physical resource elements are distributed first physical resource elements;

relative positions of resource elements occupied by one localized first physical resource element in one PRB pair correspond to relative positions of resource elements occupied by one distributed first physical resource element in one PRB pair; and resource elements occupied by one localized first physical resource element are localized in one PRB pair, and resource elements occupied by one distributed first physical resource element are distributed in at least two PRB pairs.

In this embodiment, a mapping relationship exists between numbers of second physical resource elements included in one localized first physical resource element in one PRB pair and numbers of second physical resource elements included in one distributed first physical resource element in the one PRB pair; and second physical resource elements included in one localized first physical resource element are located in one PRB pair, and second physical resource elements included in one distributed first physical resource element are located in at least two PRB pairs.

More specifically, numbers of second physical resource elements included in one localized first physical resource element in one PRB pair and numbers of second physical resource elements included in one distributed first physical resource element in the one PRB pair are the same.

In an implementation manner of this embodiment, numbers of m×n distributed first physical resource elements in the m PRB pairs are respectively x, x+1, . . . , x+m×n−1, and numbers of n localized first physical resource elements in each of the PRB pairs are respectively z, z+1, . . . , z+n−1; and numbers of m distributed first physical resource elements formed by localized first physical resource elements having the same numbers in the m PRB pairs are y, y+1, . . . , y+m−1;

where, values of y are x, x+m, x+2 m, . . . , x+(n−1)×m.

In another implementation manner of this embodiment, each of the PRB pairs includes n sub-blocks, and each sub-block includes q second physical resource elements; the m PRB pairs include n sub-block groups, each sub-block group includes m sub-blocks, which are located in different PRB pairs, and numbers of the m×n first physical resource elements included in the m PRB pairs are respectively x, x+1, . . . , x+m×n−1; each sub-block group includes m×q second physical resource elements; and numbers of m first physical resource elements in each of the sub-block groups are y, y+1, . . . , y+m−1; and values of y are x, x+m, x+2 m, . . . , x+(n−1)×m.

In one sub-block, the number of PRB pairs to which each first physical resource element is mapped is uniformly A; and/or when a first physical resource element is mapped to A PRB pairs, the first physical resource element occupies the same number of second physical resource elements in each PRB pair in the A PRB pairs; and/or in the m PRB pairs, any sub-block in any PRB pair corresponds to one localized first physical resource element.

In this embodiment, the first control channel candidate at the aggregation level L consecutively occupies L distributed first physical resource elements, where a start number of the L distributed first physical resource elements is z and satisfies (z) mod (L)=0, where mod indicates a modulo operation.

At the aggregation level L, when the number of control channel candidates is M, any control channel candidate consecutively occupies L distributed first physical resource elements, and the M control channel candidates occupy M×L consecutive distributed first physical resource elements.

Given indexes of q second physical resource elements included in one distributed first physical resource element, the q second physical resource elements are cyclically mapped to PRB pairs at an interval of f−1 PRB pairs starting from any PRB pair in the m PRB pairs, where f=⌈m/q⌉, and ]m/q[ indicates roundup of m/q.

In the foregoing embodiment, at the aggregation level L, when any control channel candidate of a distributed control channel to be transmitted is mapped to physical resources, and some eREGs of the control channel candidate are mapped to a PRB pair, these eREGs are preferably mapped to physical resources corresponding to fewest localized eCCEs in the PRB pair, thereby improving multiplexing efficiency of control channels of different modes.

Figure 29:
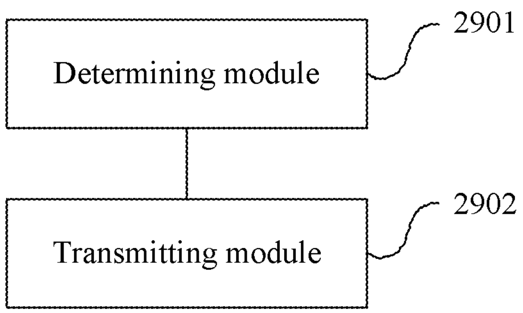
FIG. 29 is a schematic structural diagram of another embodiment of a base station according to the present invention.

FIG. 29 is a schematic structural diagram of another embodiment of a base station according to the present invention. The base station in this embodiment may implement the procedure of the embodiment shown in FIG. 17 of the present invention. As shown in FIG. 29, the base station may include: a determining module 2901 and a transmitting module 2902.

The determining module 2901 is configured to: determine m PRB pairs used for transmitting a control channel to be transmitted, where the m PRB pairs include m×n first physical resource elements, the number of resource elements occupied by each PRB pair is equal to the number of resource elements occupied by n first physical resource elements, and each of the first physical resource elements includes q second physical resource elements, where m≥1, n≥1, q≥2, and m, n, and q are all integers; determine an aggregation level L of the control channel to be transmitted, where L≥1, and L is an integer; and determine, according to the aggregation level L, a first control channel candidate at the aggregation level L, where the first control channel candidate corresponds to L first physical resource elements, and corresponds to L×q second physical resource elements.

The transmitting module 2902 is configured to place, on physical resources to which the first control channel candidate determined by the determining module 2901 is mapped, control information of the control channel to be transmitted, and transmit the control information.

In this embodiment, when the first physical resource elements are used for transmitting the control channel to be transmitted by using a localized transmission mode, the first physical resource elements are localized first physical resource elements; when the first physical resource elements are used for transmitting the control channel to be transmitted by using a distributed transmission mode, the first physical resource elements are distributed first physical resource elements;

relative positions of resource elements occupied by one localized first physical resource element in one PRB pair correspond to relative positions of resource elements occupied by one distributed first physical resource element in one PRB pair; and resource elements occupied by one localized first physical resource element are localized in one PRB pair, and resource elements occupied by one distributed first physical resource element are distributed in at least two PRB pairs.

In this embodiment, a mapping relationship exists between numbers of second physical resource elements included in one localized first physical resource element in one PRB pair and numbers of second physical resource elements included in one distributed first physical resource element in the one PRB pair; and second physical resource elements included in one localized first physical resource element are located in one PRB pair, and second physical resource elements included in one distributed first physical resource element are located in at least two PRB pairs.

More specifically, numbers of second physical resource elements included in one localized first physical resource element in one PRB pair and numbers of second physical resource elements included in one distributed first physical resource element in the one PRB pair are the same.

In an implementation manner of this embodiment, numbers of m×n distributed first physical resource elements in the m PRB pairs are respectively x, x+1, . . . , x+m×n−1, and numbers of n localized first physical resource elements in each of the PRB pairs are respectively z, z+1, . . . , z+n−1; and numbers of m distributed first physical resource elements formed by localized first physical resource elements having the same numbers in the m PRB pairs are y, y+1, . . . , y+m−1; where, values of y are x, x+m, x+2 m, . . . , x+(n−1)×m.

In another implementation manner of this embodiment, each of the PRB pairs includes n sub-blocks, and each sub-block includes q second physical resource elements; the m PRB pairs include n sub-block groups, each sub-block group includes m sub-blocks, which are located in different PRB pairs, and numbers of the m×n first physical resource elements included in the m PRB pairs are respectively x, x+1, . . . , x+m×n−1; each sub-block group includes m×q second physical resource elements; and numbers of m first physical resource elements in each of the sub-block groups are y, y+1, . . . , y+m−1; and values of y are x, x+m, x+2 m, . . . , x+(n−1)×m.

In one sub-block, the number of PRB pairs to which each first physical resource element is mapped is uniformly A; and/or when a first physical resource element is mapped to A PRB pairs, the first physical resource element occupies the same number of second physical resource elements in each PRB pair in the A PRB pairs; and/or in the m PRB pairs, any sub-block in any PRB pair corresponds to one localized first physical resource element.

In this embodiment, the first control channel candidate at the aggregation level L consecutively occupies L distributed first physical resource elements, where a start number of the L distributed first physical resource elements is z and satisfies (z) mod (L)=0, where mod indicates a modulo operation.

At the aggregation level L, when the number of control channel candidates is M, any control channel candidate consecutively occupies L distributed first physical resource elements, and the M control channel candidates occupy M×L consecutive distributed first physical resource elements.

Given indexes of q second physical resource elements included in one distributed first physical resource element, the q second physical resource elements are cyclically mapped to PRB pairs at an interval of f−1 PRB pairs starting from any PRB pair in the m PRB pairs, where $f=\lceil m/q \rceil$, and $\lceil m/q \rceil$ indicates roundup of m/q.

In the foregoing embodiment, at the aggregation level L, when any control channel candidate of a distributed control channel to be transmitted is mapped to physical resources, and some eREGs of the control channel candidate are mapped to a PRB pair, these eREGs are preferably mapped to physical resources corresponding to fewest localized eCCEs in the PRB pair, thereby improving multiplexing efficiency of control channels of different modes.

Figure 30:
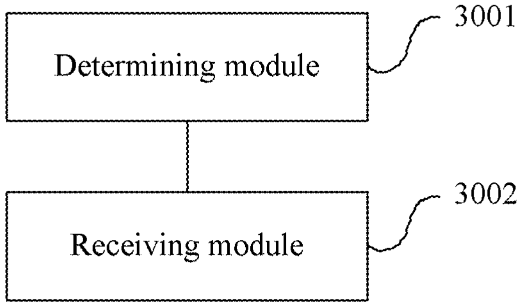
FIG. 30 is a schematic structural diagram of another embodiment of a user equipment according to the present invention.

FIG. 30 is a schematic structural diagram of another embodiment of a user equipment according to the present invention. The user equipment in this embodiment may implement the procedure of the embodiment shown in FIG. 18 of the present invention. As shown in FIG. 30, the user equipment may include: a determining module 3001 and a receiving module 3002.

The determining module 3001 is configured to: determine m PRB pairs used for transmitting a control channel to be transmitted, where the m PRB pairs include m×n first physical resource elements, the number of resource elements occupied by each PRB pair is equal to the number of resource elements occupied by n first physical resource elements, and each of the first physical resource elements includes q second physical resource elements, where m≥1, n≥1, q≥2, and m, n, and q are all integers; and determine, according to an aggregation level L, M control channel candidates at the aggregation level L, where each of the control channel candidates corresponds to L first physical resource elements, and corresponds to L×q second physical resource elements.

The receiving module 3002 is configured to detect the M control channel candidates determined by the determining module 3001.

In this embodiment, when the first physical resource elements are used for transmitting the control channel to be transmitted by using a localized transmission mode, the first physical resource elements are localized first physical resource elements; when the first physical resource elements are used for transmitting the control channel to be transmitted by using a distributed transmission mode, the first physical resource elements are distributed first physical resource elements;

relative positions of resource elements occupied by one localized first physical resource element in one PRB pair correspond to relative positions of resource elements occupied by one distributed first physical resource element in one PRB pair; and resource elements occupied by one localized first physical resource element are localized in one PRB pair, and resource elements occupied by one distributed first physical resource element are distributed in at least two PRB pairs.

In this embodiment, a mapping relationship exists between numbers of second physical resource elements included in one localized first physical resource element in one PRB pair and numbers of second physical resource elements included in one distributed first physical resource element in the one PRB pair; and second physical resource elements included in one localized first physical resource element are located in one PRB pair, and second physical resource elements included in one distributed first physical resource element are located in at least two PRB pairs.

More specifically, numbers of second physical resource elements included in one localized first physical resource element in one PRB pair and numbers of second physical resource elements included in one distributed first physical resource element in the one PRB pair are the same.

In an implementation manner of this embodiment, numbers of m×n distributed first physical resource elements in the m PRB pairs are respectively x, x+1, . . . , x+m×n−1, and numbers of n localized first physical resource elements in each of the PRB pairs are respectively z, z+1, . . . , z+n−1; and numbers of m distributed first physical resource elements formed by localized first physical resource elements having the same numbers in the m PRB pairs are y, y+1, . . . , y+m−1;

where, values of y are x, x+m, x+2 m, . . . , x+(n−1)×m.

In another implementation manner of this embodiment, each of the PRB pairs includes n sub-blocks, and each sub-block includes q second physical resource elements; the m PRB pairs include n sub-block groups, each sub-block group includes m sub-blocks, which are located in different PRB pairs, and numbers of the m×n first physical resource elements included in the m PRB pairs are respectively x, x+1, . . . , x+m×n−1; each sub-block group includes m×q second physical resource elements; and numbers of m first physical resource elements in each of the sub-block groups are y, y+1, . . . , y+m−1; and values of y are x, x+m, x+2 m, . . . , x+(n−1)×m.

In one sub-block, the number of PRB pairs to which each first physical resource element is mapped is uniformly A; and/or when a first physical resource element is mapped to A PRB pairs, the first physical resource element occupies the same number of second physical resource elements in each PRB pair in the A PRB pairs; and/or in the m PRB pairs, any sub-block in any PRB pair corresponds to one localized first physical resource element.

In this embodiment, the first control channel candidate at the aggregation level L consecutively occupies L distributed first physical resource elements, where a start number of the L distributed first physical resource elements is z and satisfies (z) mod (L)=0, where mod indicates a modulo operation.

At the aggregation level L, when the number of control channel candidates is M, any control channel candidate consecutively occupies L distributed first physical resource elements, and the M control channel candidates occupy M×L consecutive distributed first physical resource elements.

Given indexes of q second physical resource elements included in one distributed first physical resource element, the q second physical resource elements are cyclically mapped to PRB pairs at an interval of f−1 PRB pairs starting from any PRB pair in the m PRB pairs, where $f=\lceil m/q \rceil$, and $\lceil m/q \rceil$ indicates roundup of m/q.

In the foregoing embodiment, at the aggregation level L, when any control channel candidate of a distributed control channel to be transmitted is mapped to physical resources, and some eREGs of the control channel candidate are mapped to a PRB pair, these eREGs are preferably mapped to physical resources corresponding to fewest localized eCCEs in the PRB pair, thereby improving multiplexing efficiency of control channels of different modes.

Persons skilled in the art may understand that the accompanying drawings are merely schematic diagrams of exemplary embodiments of the present invention and that the modules or procedures in the accompanying drawings may be probably not necessary for the implementation of the present invention.

It may be clearly understood by persons skilled in the art that, for the purpose of convenient and brief description, for a detailed working process of the foregoing system, apparatus, and module, reference may be made to a corresponding process in the foregoing method embodiments, and details are not described herein again.

In the several embodiments provided in the present application, it should be understood that the disclosed system, apparatus, and method may be implemented in other manners. For example, the described apparatus embodiment is merely exemplary. For example, the module division is merely logical function division and may be other division in actual implementation. For example, a plurality of modules or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

When the methods provided by the embodiments of the present invention are implemented in a form of a software functional unit and sold or used as an independent product, the functions may be stored in a computer-readable storage medium. Based on such an understanding, the technical solutions of the present invention essentially, or the part contributing to the prior art, or a part of the technical solutions may be implemented in a form of a software product. The computer software product is stored in a storage medium and includes several instructions for instructing a computer device (which may be a personal computer, a server, or a network device or the like) to perform all or a part of the steps of the methods described in the embodiments of the present invention. The foregoing storage medium includes: any mediums capable of storing program code, such as a USB flash disk, a removable hard disk, a read-only memory (Read-Only Memory, ROM), a random access memory (Random Access Memory, RAM), a magnetic disk, or an optical disc.

Finally, it should be noted that the foregoing embodiments are merely intended for describing the technical solutions of the present invention rather than limiting the present invention. Although the present invention is described in detail with reference to the foregoing embodiments, persons of ordinary skill in the art should understand that they may still make modifications to the technical solutions described in the foregoing embodiments or make equivalent replacements to some or all the technical features thereof, as long as such modifications or replacements do not cause the essence of corresponding technical solutions to depart from the scope of the technical solutions of the embodiments of the present invention.

What is claimed is:

1. A method for transmitting a control channel, the method comprising:

determining m resource units used for transmitting a control channel to be transmitted, wherein an ith resource unit comprises ni first physical resource elements and ki second physical resource elements, and the second physical resource elements form multiple second physical resource element groups, wherein the first physical resource elements are used for transmitting the control channel to be transmitted in a localized transmission mode, the second physical resource elements are used for transmitting the control channel to be transmitted in a distributed transmission mode, and one of the ni first physical resource elements comprises at least two second physical resource elements, wherein m≥1, ni≥1, ki≥1, 0≤i≤m−1, and m, i, $n_i$, and ki are all integers;

when the control channel to be transmitted is transmitted in the distributed transmission mode, determining an aggregation level L of the control channel to be transmitted, wherein L≥1, and L is an integer;

determining, according to the aggregation level L, a number GL of second physical resource elements comprised in each of the second physical resource element groups, wherein the GL second physical resource elements comprised in each of the second physical resource element groups are located in $\lceil G_L/q \rceil$ first physical resource elements in the m resource units, wherein q indicates a number of second physical resource elements comprised in one of the ni first physical resource elements, $\lceil G_L/q \rceil$ indicates roundup of $G_L/q$, GL≥1, and GL is an integer;

determining, according to the aggregation level L, a first control channel candidate at the aggregation level L, wherein the first control channel candidate corresponds to NL second physical resource element groups, wherein NL≥1, and NL is an integer; and placing control information of the control channel to be transmitted, on physical resources to which the first control channel candidate is mapped, and transmitting the control information.

2. The method according to claim 1, wherein:

when $G_L$ is less than or equal to the number of second physical resource elements comprised in one of the ni first physical resource elements, the GL second physical resource elements are located in one of the ni first physical resource elements in the m resource units.

3. The method according to claim 1, wherein determining, according to the aggregation level L, the number $G_L$ of second physical resource elements comprised in each of the second physical resource element groups comprises:

determining the $G_L$ according to a mapping relationship between the preset aggregation level L and the number $G_L$ of second physical resource elements comprised in each of the second physical resource element groups.

4. The method according to claim 1, further comprising:

transmitting higher layer signaling to a receiving device, wherein the higher layer signaling is used for configuring the number $G_L$ corresponding to the aggregation level L of second physical resource elements comprised in each of the second physical resource element groups.

5. The method according to claim 1, wherein:

for different aggregation levels, the number $G_L$ of second physical resource elements comprised in a second physical resource element group corresponding to at least one aggregation level is greater than or equal to 2; or for at least two aggregation levels in multiple different aggregation levels, a second physical resource element group corresponding to a higher aggregation level in the at least two aggregation levels comprises more second physical resource elements.

6. The method according to claim 1, wherein:

all second physical resource elements comprised in one of the second physical resource element groups are located in one resource unit; or all second physical resource elements comprised in all the second physical resource element groups are located on physical resources of a part of first physical resource elements in the m resource units; or in one resource unit, all second physical resource elements comprised in one second physical resource element group are located on physical resources of a part of first physical resource elements in the one resource unit; or in one resource unit, all second physical resource elements comprised in all second physical resource element groups are located on physical resources of a part of first physical resource elements in the one resource unit.

7. The method according to claim 1, wherein:

in one resource unit, all second physical resource element groups are formed by physical resources corresponding to a part of antenna ports in the one resource unit; or in one resource unit, all second physical resource elements comprised in all second physical resource element groups are located in first physical resource elements corresponding to a part of antenna ports in the one resource unit.

8. The method according to claim 1, wherein determining, according to the aggregation level L, a first control channel candidate at the aggregation level L comprises:

determining, according to the aggregation level L, the number M of control channel candidates at the aggregation level L, wherein M is an integer, and M≥1;

mapping the M control channel candidates to physical resources in the m resource units; and selecting one first control channel candidate from the M control channel candidates.

9. A method for receiving a control channel, the method comprising:

determining m resource units used for transmitting a control channel, wherein an ith resource unit comprises ni first physical resource elements and ki second physical resource elements, and the second physical resource elements form multiple second physical resource element groups, wherein the first physical resource elements are used for transmitting the control channel to be transmitted in a localized transmission mode, the second physical resource elements are used for transmitting the control channel to be transmitted in a distributed transmission mode, and one of the ni first physical resource elements comprises at least two second physical resource elements, wherein m≥1, ni≥1, ki≥ 1, 0≤i≤m−1, and m, i, ni, and ki are all integers;

determining, according to an aggregation level L of the control channel, a number GL of second physical resource elements comprised in each of the second physical resource element groups, wherein the GL second physical resource elements comprised in each of the second physical resource element groups are located in $\lceil G_L/q \rceil$ first physical resource elements in the m resource units, wherein q indicates a number of second physical resource elements comprised in one of the ni first physical resource elements, $\lceil G_L/q \rceil$ indicates roundup of $G_L/q$, GL≥1, L≥1, and GL and L are both integers;

determining, according to the aggregation level L, M control channel candidates at the aggregation level L, wherein each of the control channel candidates corresponds to NL second physical resource element groups, wherein M≥1, $N_L$≥1, and M and $N_L$ are both integers; and detecting the M control channel candidates.

10. The method according to claim 9, wherein:

when $G_L$ is less than or equal to the number of second physical resource elements comprised in one of the ni first physical resource elements, the GL second physical resource elements are located in one of the ni first physical resource elements in the m resource units.

11. The method according to claim 9, wherein determining, according to an aggregation level L of the control channel, the number $G_L$ of second physical resource elements comprised in each of the second physical resource element groups comprises:

obtaining the number $G_L$ configured through higher layer signaling and corresponding to the aggregation level L, of second physical resource elements comprised in each of the second physical resource element groups; or determining the $G_L$ according to a mapping relationship between the preset aggregation level L and the number $G_L$ of second physical resource elements comprised in each of the second physical resource element groups.

12. The method according to claim 9, wherein:

for different aggregation levels, the number $G_L$ of second physical resource elements comprised in a second physical resource element group corresponding to at least one aggregation level is greater than or equal to 2; or for at least two aggregation levels in multiple different aggregation levels, a second physical resource element group corresponding to a higher aggregation level in the at least two aggregation levels comprises more second physical resource elements.

13. The method according to claim 9, wherein:

all second physical resource elements comprised in one of the second physical resource element group are located in one resource unit; or all second physical resource elements comprised in all the second physical resource element groups are located on physical resources of a part of first physical resource elements in the m resource units; or in one resource unit, all second physical resource elements comprised in one second physical resource element group are located on physical resources of a part of first physical resource elements in the one resource unit; or in one resource unit, all second physical resource elements comprised in all second physical resource element groups are located on physical resources of a part of first physical resource elements in the one resource unit.

14. The method according to claim 9, wherein:

in one resource unit, all second physical resource element groups are formed by physical resources corresponding to a part of antenna ports in the one resource unit; or in one resource unit, all second physical resource elements comprised in all second physical resource element groups are located in first physical resource elements corresponding to a part of antenna ports in the one resource unit.

15. The method according to claim 9, wherein detecting the M control channel candidates comprises:

detecting physical resources to which the M control channel candidates are mapped, and when a correct control channel is detected, parsing the correct control channel to obtain control information borne in the correct control channel, or when no correct control channel is detected, continuing to perform the step of determining the number M of control channel candidates at other aggregation levels than the aggregation level L and subsequent steps, until a correct control channel is detected or until all control channel candidates corresponding to all aggregation levels are traversed.

16. The method according to claim 9, wherein determining, according to the aggregation level L, M control channel candidates at the aggregation level L comprises:

determining, according to the aggregation level L, the number M of control channel candidates at the aggregation level L, wherein M is an integer, and M≥1; and determining a mapping from the M control channel candidates to physical resources in the m resource units.

17. A base station, comprising:

a processor, configured to:

determine m resource units used for transmitting a control channel to be transmitted, wherein an ith resource unit comprises ni first physical resource elements and ki second physical resource elements, and the second physical resource elements form multiple second physical resource element groups, wherein the first physical resource elements are used for transmitting the control channel to be transmitted in a localized transmission mode, the second physical resource elements are used for transmitting the control channel to be transmitted in a distributed transmission mode, and one of the ni first physical resource elements comprises at least two second physical resource elements, wherein m≥1, ni≥1, ki≥1, 0≤i≤m−1, and m, i, ni, and ki are all integers, when the control channel to be transmitted is transmitted in the distributed transmission mode, determine an aggregation level L of the control channel to be transmitted, wherein L≥1, and L is an integer, determine, according to the aggregation level L, a number GL of second physical resource elements comprised in each of the second physical resource element groups, wherein the GL second physical resource elements comprised in each of the second physical resource element groups are located in $\lceil G_L/q \rceil$ first physical resource elements in the m resource units, wherein q indicates a number of second physical resource elements comprised in one of the ni first physical resource elements, $\lceil G_L/q \rceil$ indicates roundup of $G_L$ q, GL≥1, and GL is an integer, and determine, according to the aggregation level L, a first control channel candidate at the aggregation level L, wherein the first control channel candidate corresponds to NL second physical resource element groups, wherein NL≥1 and NL is an integer; and a transmitter, configured to place control information of the control channel to be transmitted on physical resources to which the first control channel candidate is mapped, and transmit the control information.

18. The base station according to claim 17, wherein:

when GL is less than or equal to the number of second physical resource elements comprised in one of the ni first physical resource elements, the GL second physical resource elements are located in one of the $n_i$ first physical resource elements in the m resource units.

19. The base station according to claim 17, wherein the processor is further configured to:

determine the $G_L$ according to a mapping relationship between the preset aggregation level L and the number $G_L$ of second physical resource elements comprised in each of the second physical resource element groups.

20. The base station according to claim 17, wherein:

the transmitter is further configured to transmit higher layer signaling to a receiving device, wherein the higher layer signaling is used for configuring the number $G_L$ corresponding to the aggregation level L of second physical resource elements comprised in each of the second physical resource element groups.

21. The base station according to claim 17, wherein:

for different aggregation levels, the number $G_L$ of second physical resource elements comprised in a second physical resource element group corresponding to at least one aggregation level is greater than or equal to 2; or for at least two aggregation levels in multiple different aggregation levels, a second physical resource element group corresponding to a higher aggregation level in the at least two aggregation levels comprises more second physical resource elements.

22. The base station according to claim 17, wherein:

all second physical resource elements comprised in one of the second physical resource element groups are located in one resource unit; or all second physical resource elements comprised in all the second physical resource element groups are located on physical resources of a part of first physical resource elements in the m resource units; or in one resource unit, all second physical resource elements comprised in one second physical resource element group are located on physical resources of a part of first physical resource elements in the one resource unit; or in one resource unit, all second physical resource elements comprised in all second physical resource element groups are located on physical resources of a part of first physical resource elements in the one resource unit.

23. The base station according claim 17, wherein:

in one resource unit, all second physical resource element groups are formed by physical resources corresponding to a part of antenna ports in the one resource unit; or in one resource unit, all second physical resource elements comprised in all second physical resource element groups are located in first physical resource elements corresponding to a part of antenna ports in the one resource unit.

24. The base station according to claim 17, wherein the processor is further configured to:

determine, according to the aggregation level L, the number M of control channel candidates at the aggregation level L, map the M control channel candidates to physical resources in the m resource units, and select one first control channel candidate from the M control channel candidates, wherein M is an integer, and M≥1.

25. A user equipment, comprising:

a processor, configured to:

determine m resource units used for transmitting a control channel, wherein an ith resource unit comprises ni first physical resource elements and ki second physical resource elements, and the second physical resource elements form multiple second physical resource element groups, wherein the first physical resource elements are used for transmitting the control channel to be transmitted in a localized transmission mode, the second physical resource elements are used for transmitting the control channel to be transmitted in a distributed transmission mode, and one of the ni first physical resource elements comprises at least two second physical resource elements, wherein m≥1, ni≥1, ki≥1, 0≤i≤m−1, and m, i, ni, and ki are all integers, determine, according to an aggregation level L of the control channel, a number GL of second physical resource elements comprised in each of the second physical resource element groups, wherein the GL second physical resource elements comprised in each of the second physical resource element groups are located in $\lceil G_L/q \rceil$ first physical resource elements in the m resource units, wherein q indicates a number of second physical resource elements comprised in one of the $n_i$ first physical resource elements, $\lceil G_L/q \rceil$ indicates roundup of $G_L/q$, GL≥1, L≥1, and GL and L are both integers, and determine, according to the aggregation level L, M control channel candidates at the aggregation level L, wherein each of the control channel candidates corresponds to NL second physical resource element groups, wherein M≥1, NL≥1, and M and NL are both integers; and a receiver, configured to detect the M control channel candidates.

26. The user equipment according to claim 25, wherein:

when GL is less than or equal to the number of second physical resource elements comprised in one of the ni first physical resource elements, the GL second physical resource elements are located in one of the ni first physical resource elements in the m resource units.

27. The user equipment according to claim 25, wherein the processor is further configured to:

obtain the number $G_L$ configured through higher layer signaling and corresponding to the aggregation level L, of second physical resource elements comprised in each of the second physical resource element groups; or determine the $G_L$ according to a mapping relationship between the preset aggregation level L and the number $G_L$ of second physical resource elements comprised in each of the second physical resource element groups.

28. The user equipment according to claim 25, wherein:

for different aggregation levels, the number $G_L$ of second physical resource elements comprised in a second physical resource element group corresponding to at least one aggregation level is greater than or equal to 2; or for at least two aggregation levels in multiple different aggregation levels, a second physical resource element group corresponding to a higher aggregation level in the at least two aggregation levels comprises more second physical resource elements.

29. The user equipment according to claim 25, wherein:

all second physical resource elements comprised in one second physical resource element group are located in one resource unit; or all second physical resource elements comprised in all the second physical resource element groups are located on physical resources of a part of first physical resource elements in the m resource units; or in one resource unit, all second physical resource elements comprised in one second physical resource element group are located on physical resources of a part of first physical resource elements in the one resource unit; or in one resource unit, all second physical resource elements comprised in all second physical resource element groups are located on physical resources of a part of first physical resource elements in the one resource unit.

30. The user equipment according to claim 25, wherein:

in one resource unit, all second physical resource element groups are formed by physical resources corresponding to a part of antenna ports in the one resource unit; or in one resource unit, all second physical resource elements comprised in all second physical resource element groups are located in first physical resource elements corresponding to a part of antenna ports in the one resource unit.

31. The user equipment according to claim 25, wherein the receiver is further configured to:

detect physical resources to which the M control channel candidates are mapped, and when a correct control channel is detected, parse the correct control channel to obtain control information borne in the correct control channel, or when no correct control channel is detected, continue to perform the step of determining the number M of control channel candidates at other aggregation levels than the aggregation level L and subsequent steps, until a correct control channel is detected or until all control channel candidates corresponding to all aggregation levels are traversed.

32. The user equipment according to claim 25, wherein the processor is further configured to:

determine, according to the aggregation level L, the number M of control channel candidates at the aggregation level L, wherein M is an integer, and M≥1; and determine a mapping from the M control channel candidates to physical resources in the m resource units.

* * * * *